(12) United States Patent
Eguchi et al.

(10) Patent No.: US 9,083,989 B2
(45) Date of Patent: Jul. 14, 2015

(54) OUTPUT SYSTEM AND DISPLAY SYSTEM

(75) Inventors: Yohichi Eguchi, Osaka (JP); Ryosuke Ohmae, Osaka (JP); Seiji Imanishi, Osaka (JP); Takuya Kinoshita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 129 days.

(21) Appl. No.: 14/115,679

(22) PCT Filed: Apr. 4, 2012

(86) PCT No.: PCT/JP2012/059141
§ 371 (c)(1),
(2), (4) Date: Nov. 5, 2013

(87) PCT Pub. No.: WO2012/153581
PCT Pub. Date: Nov. 15, 2012

(65) Prior Publication Data
US 2014/0090003 A1 Mar. 27, 2014

(30) Foreign Application Priority Data

May 12, 2011 (JP) ................................ 2011-107647
Nov. 21, 2011 (JP) ................................ 2011-254406

(51) Int. Cl.
*H04N 7/16* (2011.01)
*H04N 21/231* (2011.01)
*H04L 29/06* (2006.01)
*H04N 21/436* (2011.01)
*H04N 21/4367* (2011.01)
*H04N 21/44* (2011.01)
*H04N 21/4405* (2011.01)
(Continued)

(52) U.S. Cl.
CPC ...... *H04N 21/23106* (2013.01); *H04L 63/0428* (2013.01); *H04L 65/4076* (2013.01); *H04L 65/4084* (2013.01); *H04L 65/80* (2013.01); *H04N 21/4367* (2013.01); *H04N 21/43615* (2013.01); *H04N 21/43637* (2013.01); *H04N 21/44004* (2013.01); *H04N 21/4405* (2013.01); *H04N 21/4408* (2013.01); *H04N 21/44227* (2013.01); *H04N 21/64322* (2013.01); *H04N 21/835* (2013.01)

(58) Field of Classification Search
CPC ................................. H04N 21/23106
USPC .................................. 725/116, 142
See application file for complete search history.

(56) References Cited

U.S. PATENT DOCUMENTS

2002/0194361 A1 12/2002 Itoh et al.
2006/0258459 A1 11/2006 Davis et al.
(Continued)

FOREIGN PATENT DOCUMENTS

JP 2000-261457 A 9/2000
JP 2002-11922 A 1/2002
(Continued)

*Primary Examiner* — Olugbenga Idowu
(74) *Attorney, Agent, or Firm* — Birch, Stewart, Kolasch & Birch, LLP

(57) ABSTRACT

A system (1) includes a monitor (10) and a STB (20). The STB (20) notifies the monitor (10) of a request for reconnection with the monitor (10) with the use of a new channel in a case where it is determined that overflow has occurred. The monitor (10) determines whether or not underrun has occurred in a receive buffer in which video data supplied from the STB (20) is buffered.

7 Claims, 37 Drawing Sheets

(51) Int. Cl.
*H04N 21/4408* (2011.01)
*H04N 21/643* (2011.01)
*H04N 21/835* (2011.01)
*H04N 21/4363* (2011.01)
*H04N 21/442* (2011.01)

(56) References Cited

U.S. PATENT DOCUMENTS

| | | | |
|---|---|---|---|
| 2008/0013496 A1 | 1/2008 | Dalmases et al. | |
| 2008/0137738 A1* | 6/2008 | Fernandes | 375/240.03 |
| 2009/0161741 A1 | 6/2009 | Ginis et al. | |
| 2009/0168972 A1 | 7/2009 | Cioffi et al. | |
| 2010/0166051 A1 | 7/2010 | Chung et al. | |
| 2010/0217888 A1* | 8/2010 | Ukita et al. | 709/234 |

FOREIGN PATENT DOCUMENTS

| | | |
|---|---|---|
| JP | 2004-229060 A | 8/2004 |
| JP | 2005-192039 A | 7/2005 |
| JP | 2005-341415 A | 12/2005 |
| JP | 2006-148974 A | 6/2006 |
| JP | 2006-165897 A | 6/2006 |
| JP | 2006-229420 A | 8/2006 |
| JP | 2007-214713 A | 8/2007 |
| JP | 2008-502266 A | 1/2008 |
| JP | 2008-79290 A | 4/2008 |
| JP | 2008-539982 A | 11/2008 |
| JP | 2009-536001 A | 10/2009 |
| JP | 2010-141625 A | 6/2010 |
| JP | 2010-154420 A | 7/2010 |
| WO | WO 02/25878 A1 | 3/2002 |
| WO | WO 2010/007749 A1 | 1/2010 |

* cited by examiner

F I G. 1
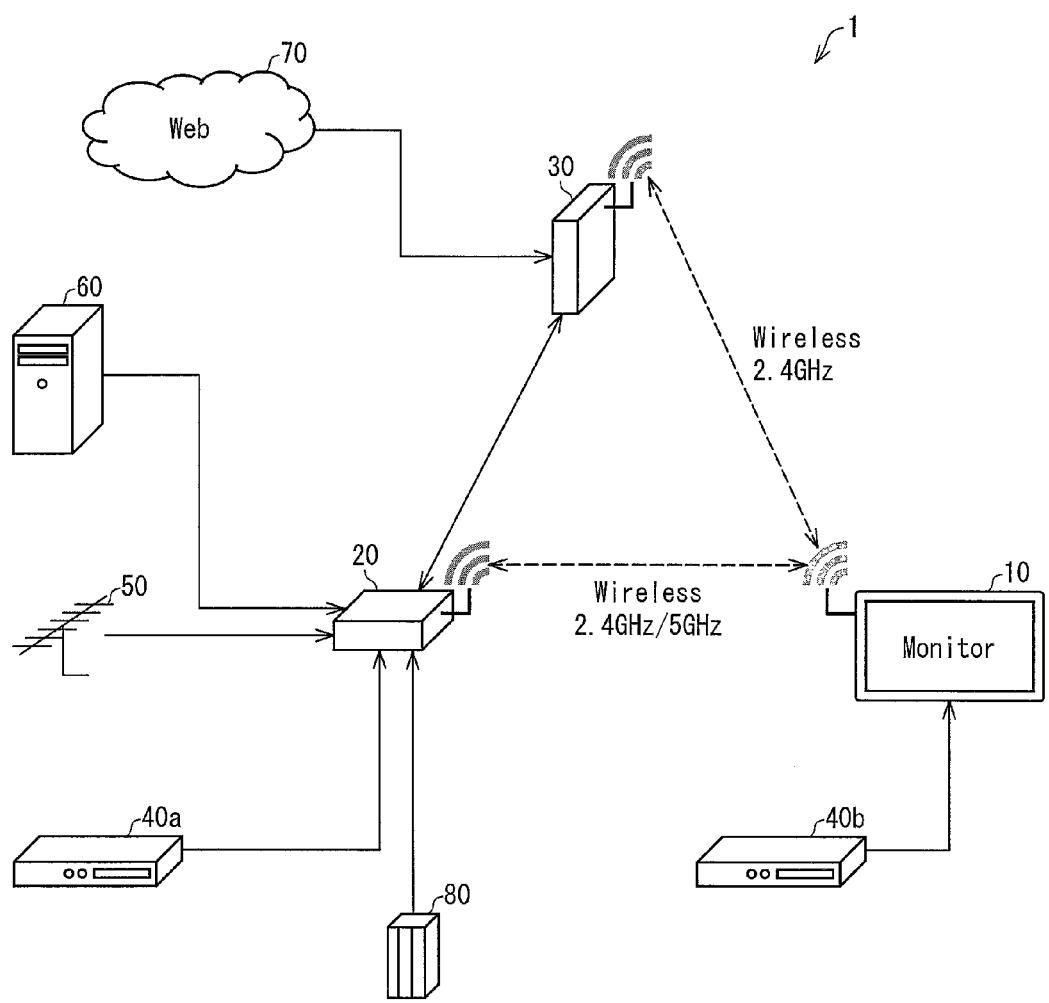

FIG. 6

| Content Source | DRM Encryption Format | Compression Format |
|---|---|---|
| Web 70 | Marlin | H.264 |
| Media Server 60 | DTCP-IP | MPEG2/H.264 |
| BD Recorder 40a | HDCP | H.264 |
| BD Recorder 40b | HDCP | – |
| DTV/BS Broadcasting | DTCP-IP | MPEG2/H.264 |
| USB-HDD 80 | DTCP-IP | MPEG2/H.264 |

F I G. 7
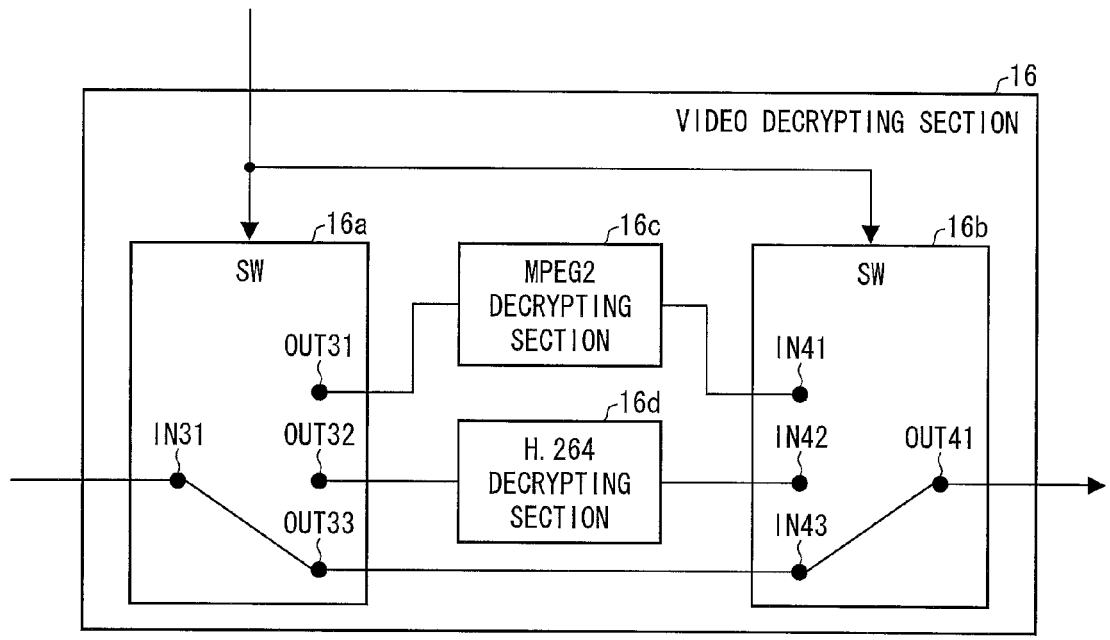

F I G. 9
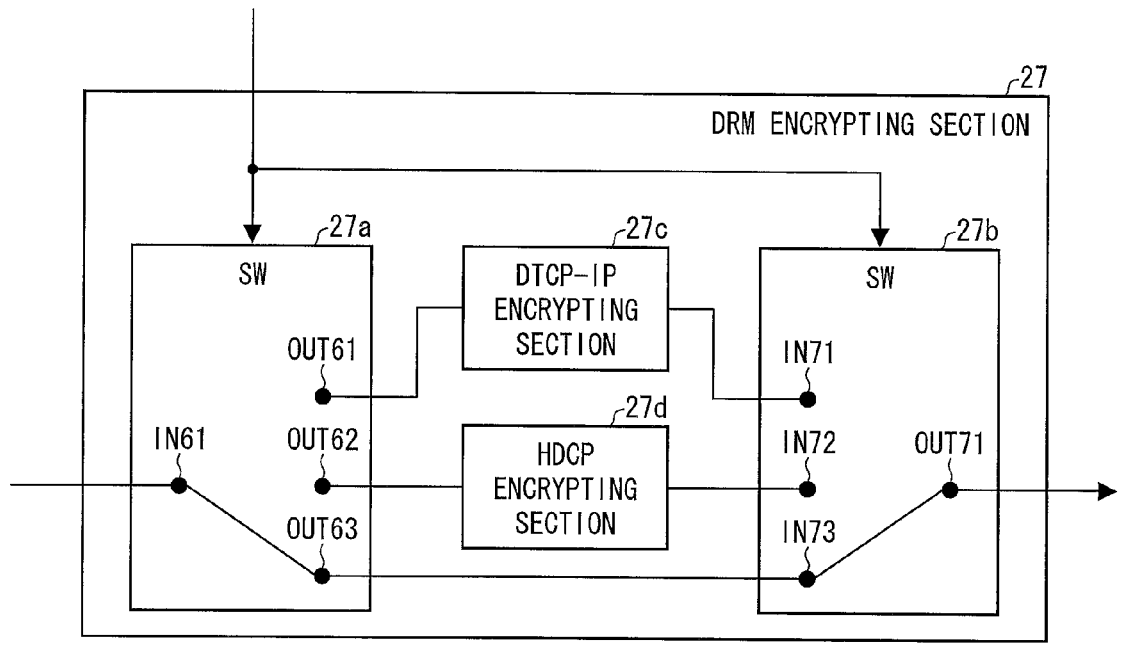

F I G. 1 5
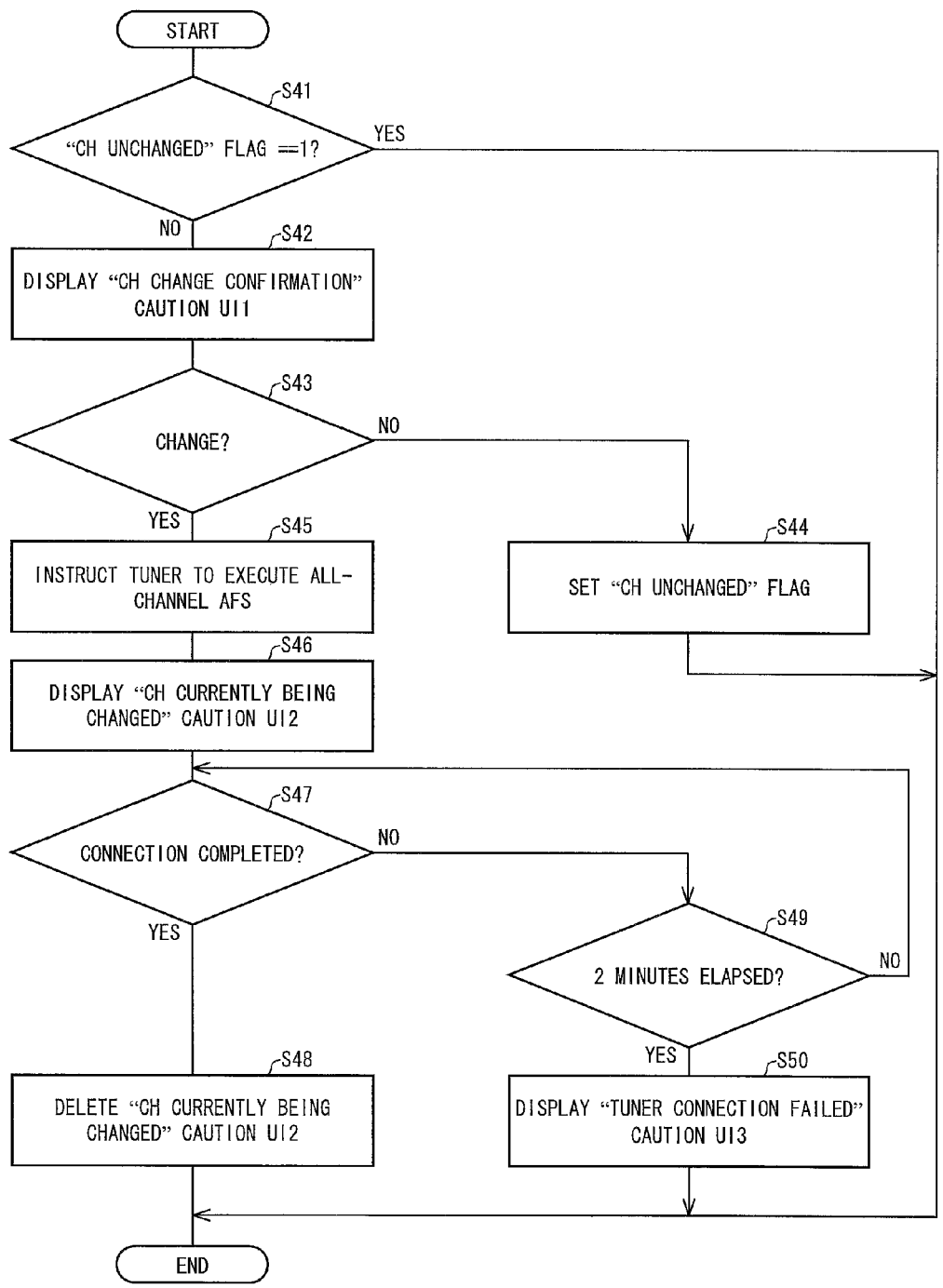

F I G. 1 9

U13

Wireless connection with tuner section is
not restored. Please try the following.

Please move display section to vicinity of
tuner section.

If connection is not restored, please cycle
power of tuner section.

If power lamp of tuner section is blinking,
please take appropriate measure by referring
to "If you think you are in trouble" of
instruction manual.

U14

Wireless connection with tuner section has
been cut.
Please wait until connection is restored.

U15

Because connection channel was disabled,
it has been switched to another one.

Confirm

FIG. 20

| (a) | |
|---|---|
| Channel | Radar wave detected? |
| 52 | Yes |
| 56 | No |
| 60 | No |
| 64 | Yes |
| 100 | Yes |
| 104 | Yes |
| 108 | No |
| 112 | Yes |
| 116 | Yes |
| 120 | No |
| 124 | No |
| 128 | Yes |
| 132 | Yes |
| 136 | Yes |
| 140 | No |

| (b) | |
|---|---|
| Channel | Radar wave detected? |
| 52 | No |
| 56 | No |
| 60 | No |
| 64 | No |
| 100 | No |
| 104 | No |
| 108 | No |
| 112 | No |
| 116 | No |
| 120 | No |
| 124 | No |
| 128 | No |
| 132 | No |
| 136 | No |
| 140 | No |

F I G. 2 2
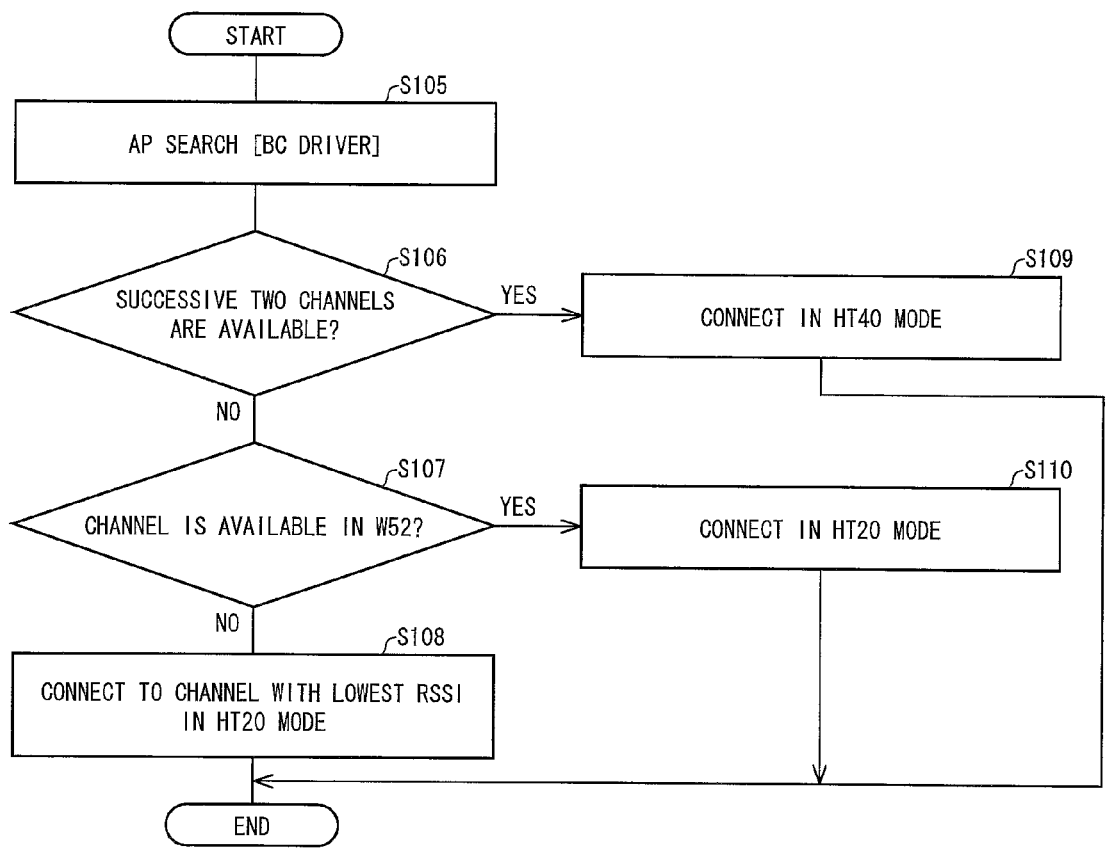

[Setting ... Preparation for viewing ... Various setting ...
Tuner wireless connection setting ... Connection state confirmation]

| Connection state confirmation |
| Connection setting | [Current connection state] |

Connection with tuner section : Connected

Wireless reception strength : ▮▮▮▯▯
Band mode : Automatic 40MHz
Channel : Automatic 36ch-40ch ⇕ Select item (Enter) Execute (Return) Previous screen (Home) Finish (b) SC22

[Setting ... Preparation for viewing ... Various setting ...
Tuner wireless connection setting ... Connection state confirmation]

| Connection state confirmation |
| Connection setting | [Current connection state] |

Connection with tuner section : Connected

Wireless reception strength : ▮▮▮▯▯
Band mode : Manual 40MHz
Channel : Manual 36ch-40ch ⇕ Select item (Enter) Execute (Return) Previous screen (Home) Finish (c) SC23

[Setting ... Preparation for viewing ... Various setting ...
Tuner wireless connection setting ... Connection state confirmation]

| Connection state confirmation |
| Connection setting | [Current connection state] |

Connection with tuner section : Not connected

Wireless reception strength : ——
Band mode : ——
Channel : ——

⇕ Select item (Enter) Execute (Return) Previous screen (Home) Finish

F I G. 2 5
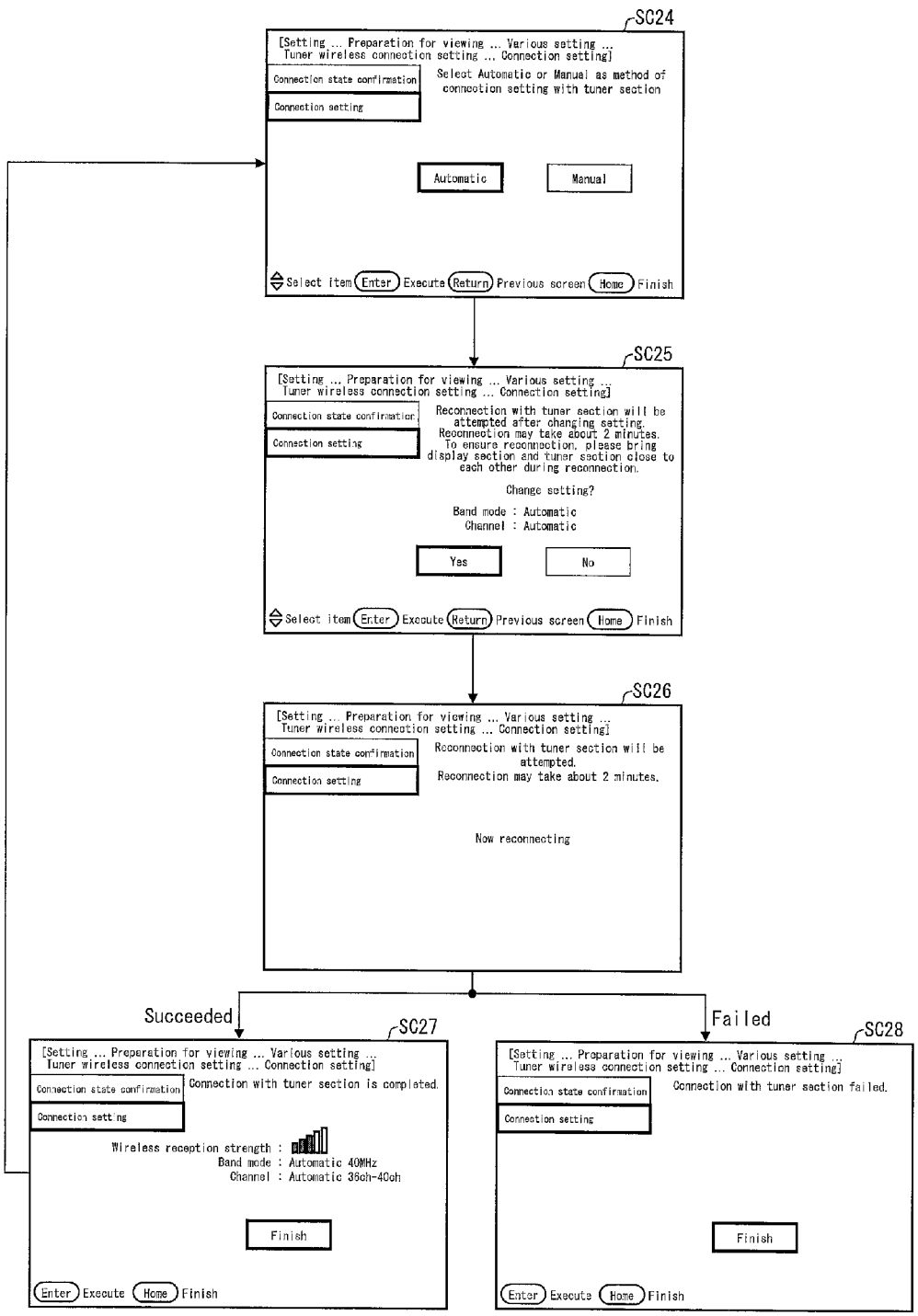

F I G. 2 8
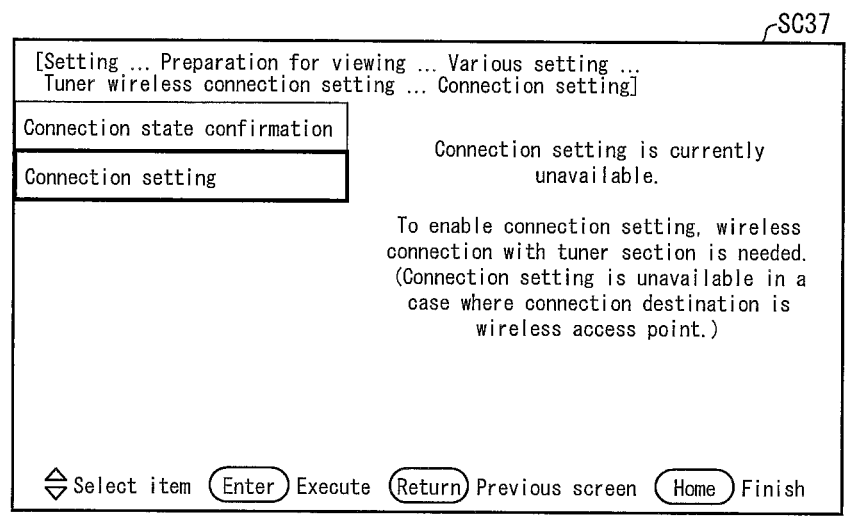

F I G. 3 2
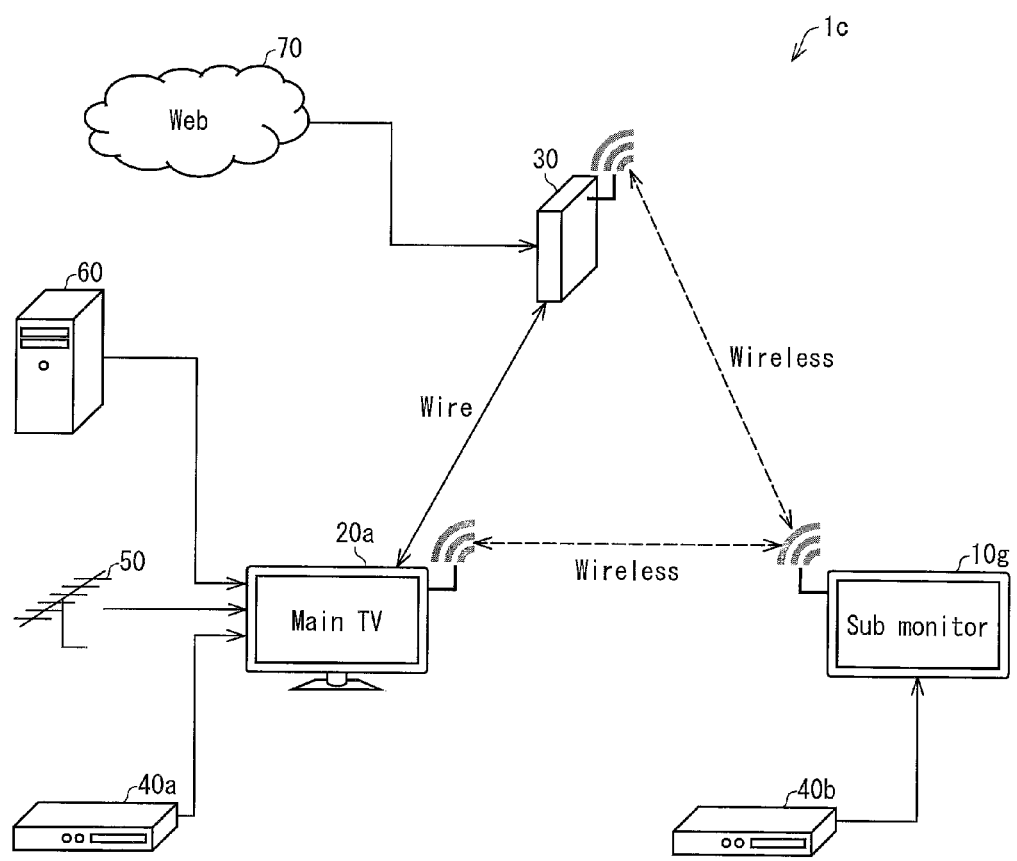

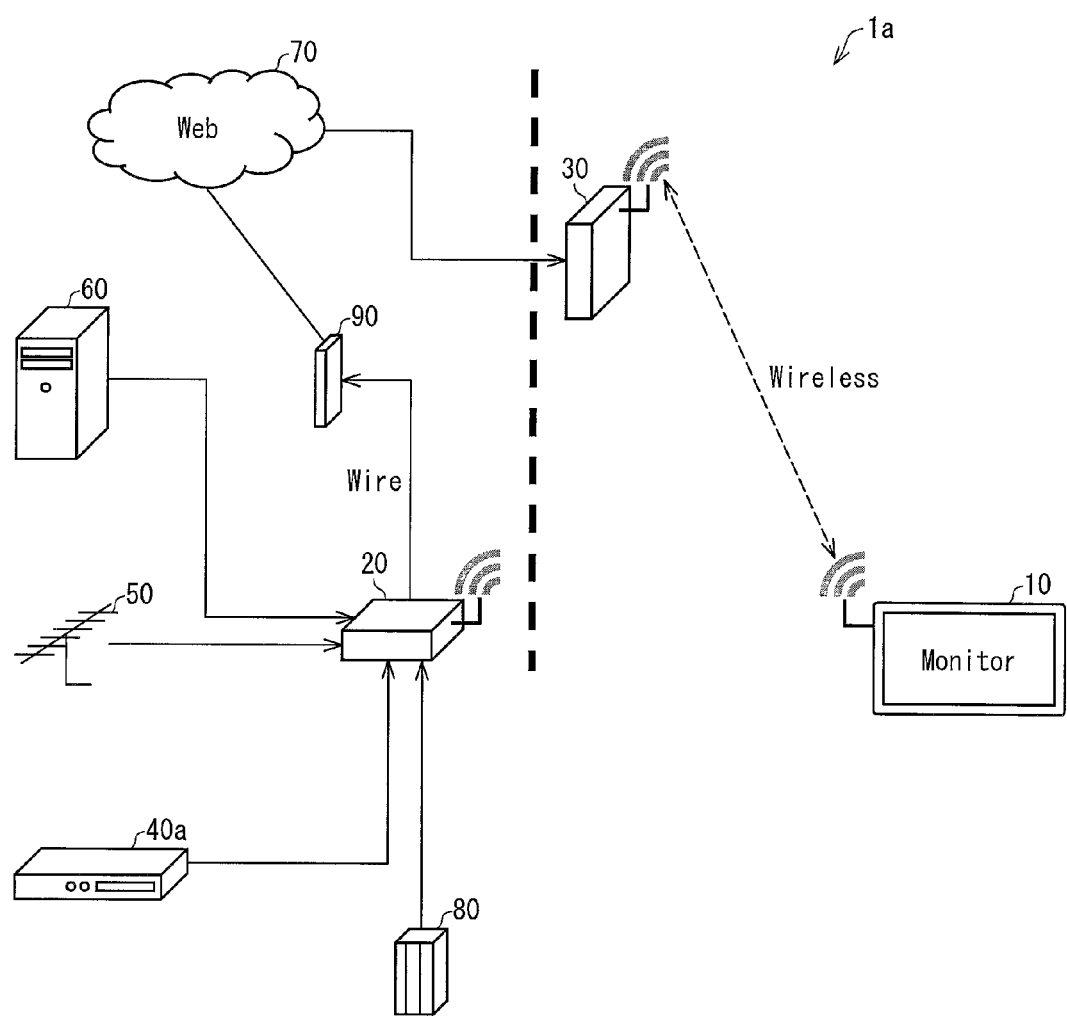
F I G. 3 4

FIG. 37

| Channel | Number of other Aps | Rank |
|---|---|---|
| 36 | 0 | 1 |
| 40 | 0 | 3 |
| 44 | 1 | 2 |
| 48 | 0 | 3 |
| 52 | 2 | 6 |
| 56 | 2 | 5 |
| 60 | 1 | 2 |
| 64 | 0 | 2 |
| 100 | 0 | 2 |
| 104 | 3 | 5 |
| 108 | 1 | 2 |
| 112 | 0 | 1 |
| 116 | 0 | 1 |
| 120 | 0 | 2 |
| 124 | 1 | 3 |
| 128 | 2 | 4 |
| 132 | 0 | 2 |
| 136 | 1 | 2 |
| 140 | 0 | 1 |

OUTPUT SYSTEM AND DISPLAY SYSTEM

TECHNICAL FIELD

The present invention relates, to an output system including (i) a transmitting device which wirelessly transmits content and (ii) an output device which wirelessly receives the content transmitted by the transmitting device and outputs video and/or audio.

BACKGROUND ART

Recent years witnessed practical use of display devices that can be connected to a network.

As one form of such display devices, there is a display device in which a display section and a video receiving section (tuner section) are separately provided and they are connected to each other wirelessly. Since the display section is portable, convenience for a user improves.

Wireless communication such as Wi-Fi sometimes suffers from a decline in throughput due to radio interference etc. even if a reception level is high. If the throughput declines during reproduction of a television video on the above display device, quality of the television video declines or the reproduction stops. Therefore, if the throughput declines, it is necessary to promptly switch a channel used for communication to another one. In other words, in order to reproduce the television video on the above display device without causing a decline in quality, it is important to always monitor a status of communication between the display device and the video receiving section.

Patent Literature 1 and Patent Literature 2 disclose a technique for monitoring a status of communication.

Specifically, Patent Literature 1 discloses a video streaming system including a device for detecting a defect of video streaming performance on the basis of information indicative of overflow, underrun, etc. Patent Literature 2 discloses a technique in which a device in an Internet telephone system checks whether all predetermined communication paths in the system are being used (being in an overflow state) or not and, in a case where all the communication paths are in the overflow state, gives notification of it.

CITATION LIST

Patent Literature 1

Japanese Patent Application Publication, Tokuhyo, No. 2009-536001 A (Publication Date: Oct. 1, 2009)

Patent Literature 2

Japanese Patent Application Publication, Tokukai, No. 2008-79290 A (Publication Date: Apr. 3, 2008)

SUMMARY OF INVENTION

Technical Problem

However, according to the arrangements described in Patent Literatures, each of the systems has only one device for monitoring a status of communication. Accordingly, it is not always possible for the device to quickly detect an abnormal state of communication. That is, there is a problem that in a case where communication turns into an abnormal state in the system, each of the systems cannot quickly execute a process that should be executed in such a case.

As a method for detecting a decline in throughput in the above display device in which a display section and a video receiving section are wirelessly connected to each other, there are, for example, (i) a method (method 1) in which the display section judges that the transmission throughput has declined in a case where it often detects a decode error when decoding a transmitted video and (ii) a method (method 2) in which the throughput is detected by transmitting and receiving predetermined amount of data for measurement of throughput.

However, in a case where the method 1 is employed, since decode errors frequently occur in the display section also in a case where video received by the video receiving section contains much noise, there arises a problem it is mistakenly determined that throughput in communication from the video receiving section to the display section has declined also in such a case.

According to the method 2, in order to correctly measure the throughput, it is assumed that other data than the predetermined amount of data for measurement of throughput is not transmitted. Accordingly, in a case where the method 2 is employed, there arises a problem that shortage of throughput cannot be correctly detected while video content is being transmitted from the video receiving section to the display section.

The present invention was accomplished in view of the above problems, and a main object of the present invention is to provide an output system in which content is wirelessly transmitted from a tuner device (generally, a transmitting device) to a monitor (generally, an output device), which output system makes it possible to (i) detect shortage of throughput in the wireless transmission without causing a decline in detection accuracy even in a case where the content contains much noise and (ii) cause the output device to quickly execute a process that should be executed upon detection of shortage of throughput.

Solution to Problem

In order to attain the above object, an output system of the present invention includes: a transmitting device; and an output device, the transmitting device wirelessly transmitting content to the output device, and the output device receiving and outputting the content, the transmitting device including: a first buffer in which the content that is being transmitted is buffered; determining means for repeatedly determining whether or not buffer overflow has occurred in the first buffer; and notifying means for giving a predetermined notification to the output device in a case where it is determined that the buffer overflow has occurred during the transmission of the content, the output device including: a second buffer in which the content that is being received is buffered; determining means for repeatedly determining whether or not buffer underrun has occurred in the second buffer during the reception of the content; first executing means for executing a predetermined error avoiding process in response to the predetermined notification; and second executing means for executing the predetermined error avoiding process in a case where it is determined that the buffer underrun has occurred.

According to the arrangement, the output system of the present invention is arranged such that the output device executes the predetermined error avoiding process in both of the case where the transmitting device determines that the buffer overflow has occurred and the case where the output device determines that the buffer underrun has occurred. That is, both of the output device and the transmitting device function as a trigger for causing the output device to execute the process.

According to the output system of the present invention, shortage of throughput is detected based on occurrence of buffer overflow and buffer underrun. Accordingly, an amount of noise mixed in content does not affect accuracy of detection of shortage of throughput.

According to the output system of the present invention, it is therefore possible to detect shortage of throughput in wireless transmission without a decline in detection accuracy even in a case where content contains much noise, and the output device can quickly execute a process which should be executed upon detection of shortage of throughput.

Note that the predetermined error avoiding process can be any process, provided that it is a process which should be executed by the output device upon detection of shortage of throughput in wireless transmission. Note also that the predetermined error avoiding process executed by the first executing means and the predetermined error avoiding process executed by the second executing means may be identical to each other or may be different from each other, provided that they are processes which should be executed by the output device upon detection of shortage of throughput in wireless transmission between the transmitting device and the output device.

Advantageous Effects of Invention

According to the output system of the present invention, it is thus possible to produce an effect: it is possible to detect shortage of throughput in wireless transmission without a decline in detection accuracy even in a case where content contains much noise, and the output device can quickly execute a process which should be executed upon detection of shortage of throughput.

BRIEF DESCRIPTION OF DRAWINGS

FIG. 1 is a block diagram schematically illustrating a configuration of a content display system of an embodiment of the present invention.

Figure 3:
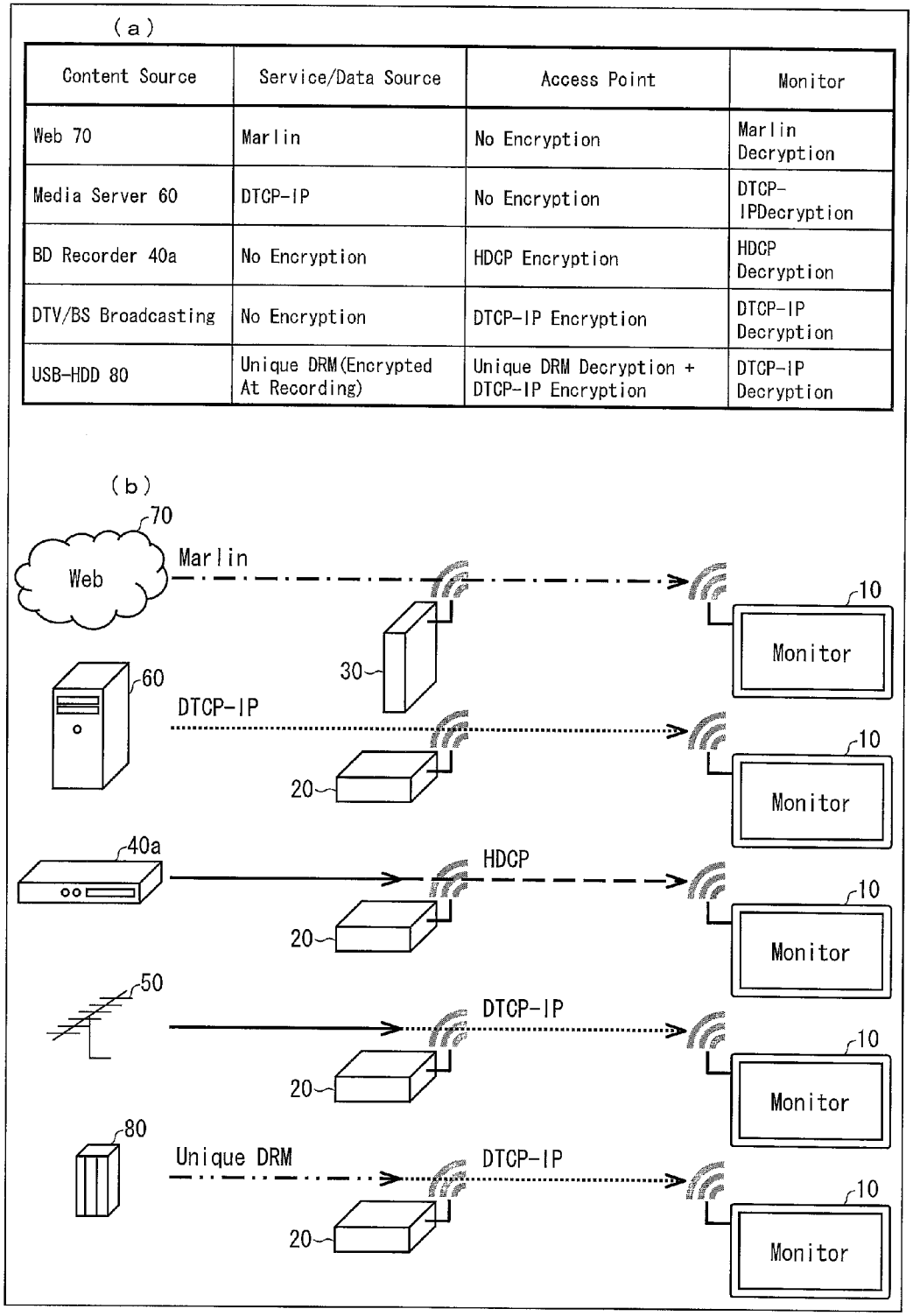

(a) of FIG. 3 shows relationship between content sources and DRM, and (b) of FIG. 3 is a view schematically illustrating a format of encryption for content that is being transmitted from a content source to the monitor illustrated in FIG. 1 via an access point.

Figure 4:
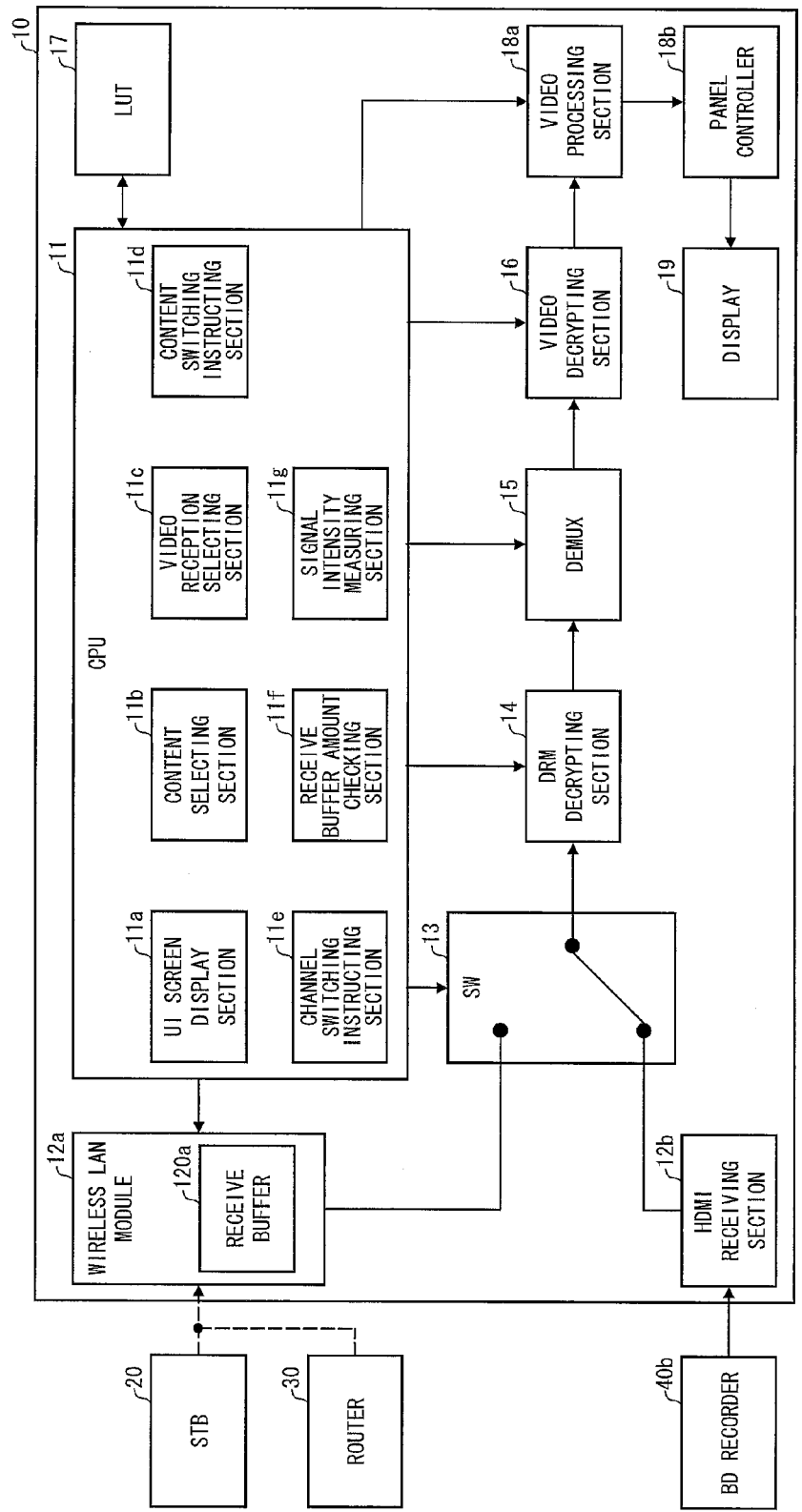

FIG. 4 is a block diagram illustrating a configuration of the monitor illustrated in FIG. 1.

Figure 5:
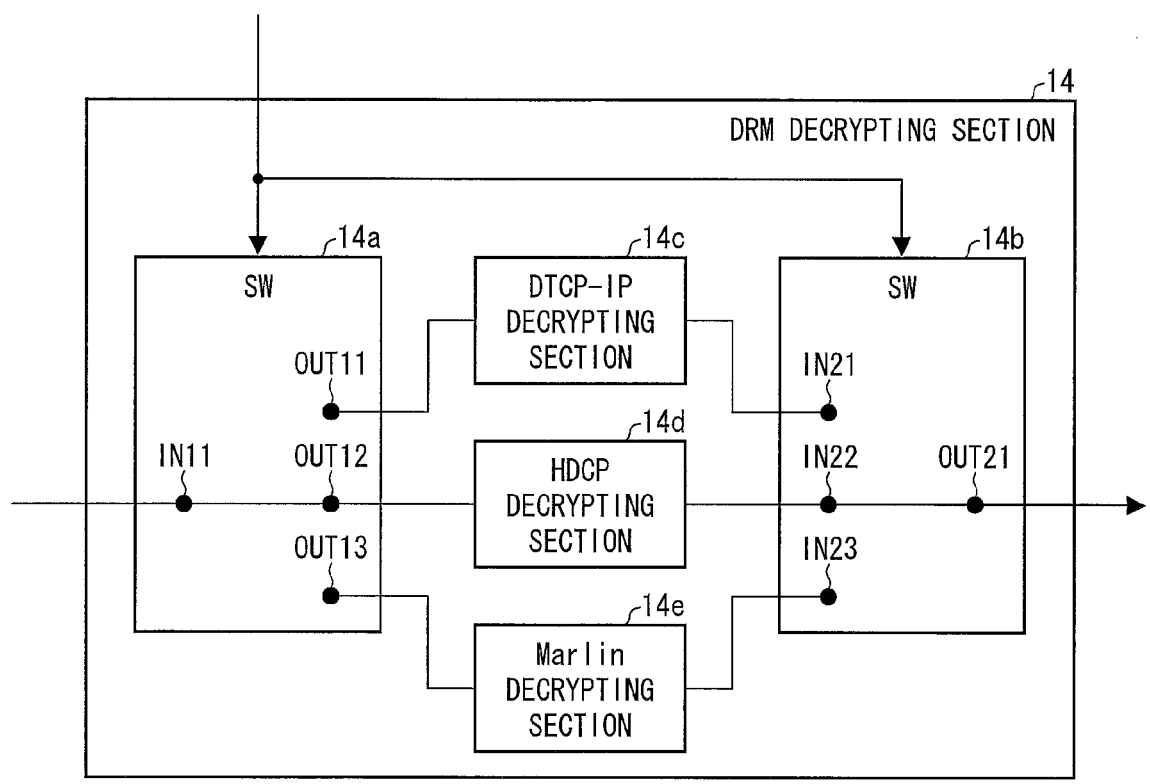

FIG. 5 is a block diagram illustrating a configuration of a DRM decrypting section of the monitor illustrated in FIG. 4.

FIG. 6 is a view illustrating an LUT which is referred to by a CPU of the monitor illustrated in FIG. 4.

FIG. 7 is a block diagram illustrating a configuration of a video decrypting section of the monitor illustrated in FIG. 4.

Figure 8:
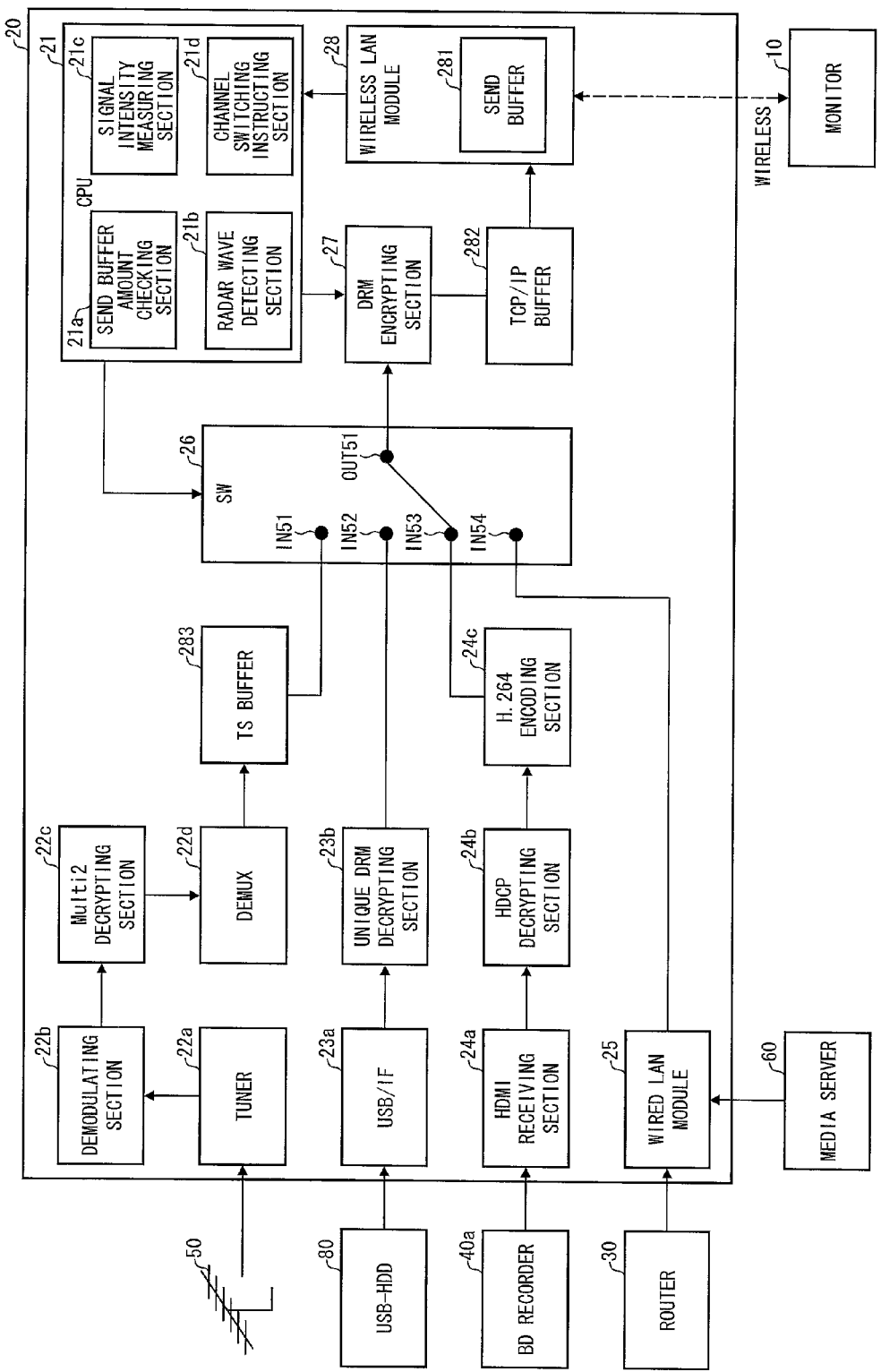

FIG. 8 is a block diagram illustrating a configuration of a set-top box illustrated in FIG. 1.

FIG. 9 is a block diagram illustrating a configuration of a DRM encrypting section of the set-top box illustrated in FIG. 8.

Figure 10:
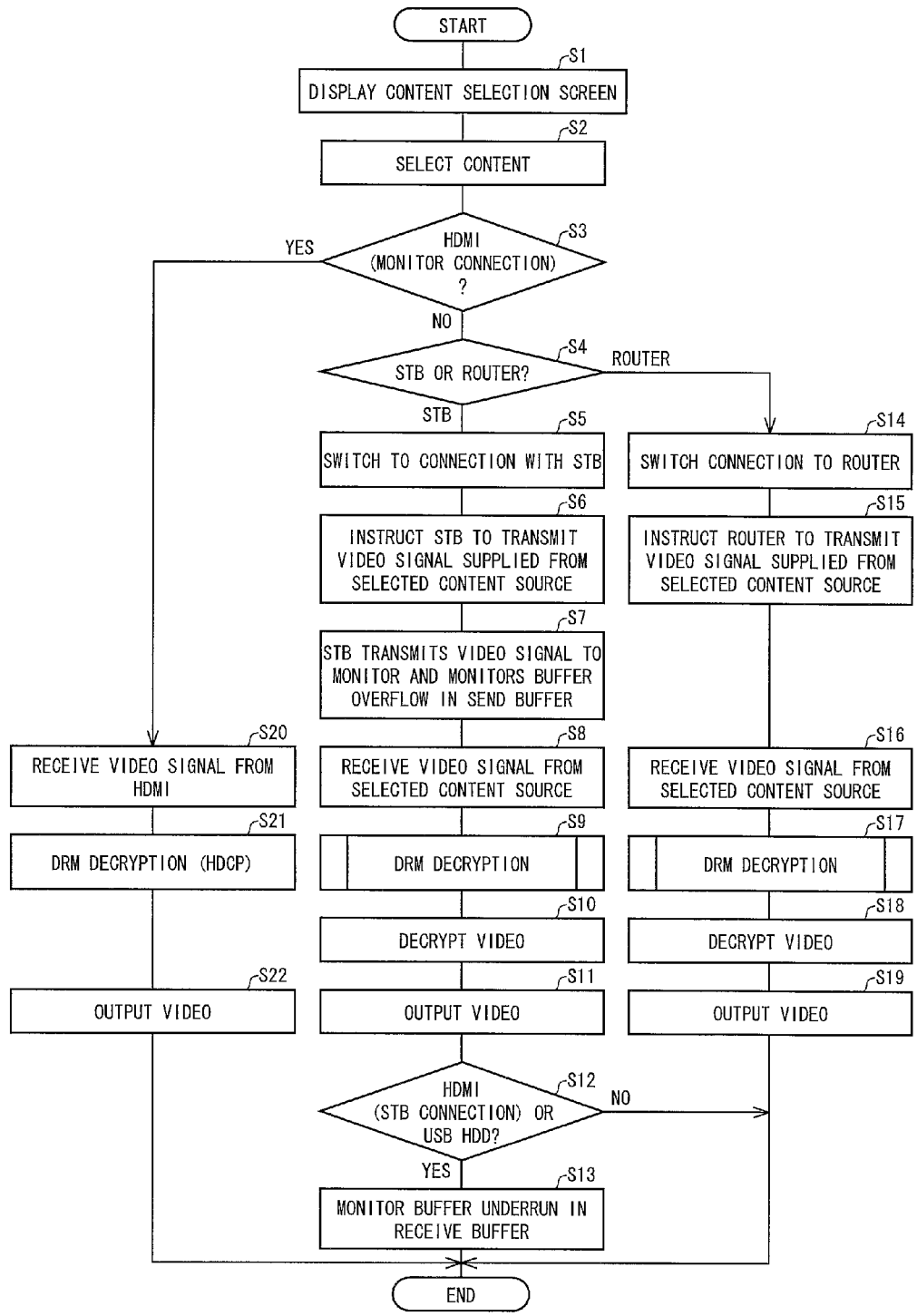

FIG. 10 is a flow chart showing operations carried out by the monitor illustrated in FIG. 1 from selection of content to display of a video of the content on a display.

Figure 11:
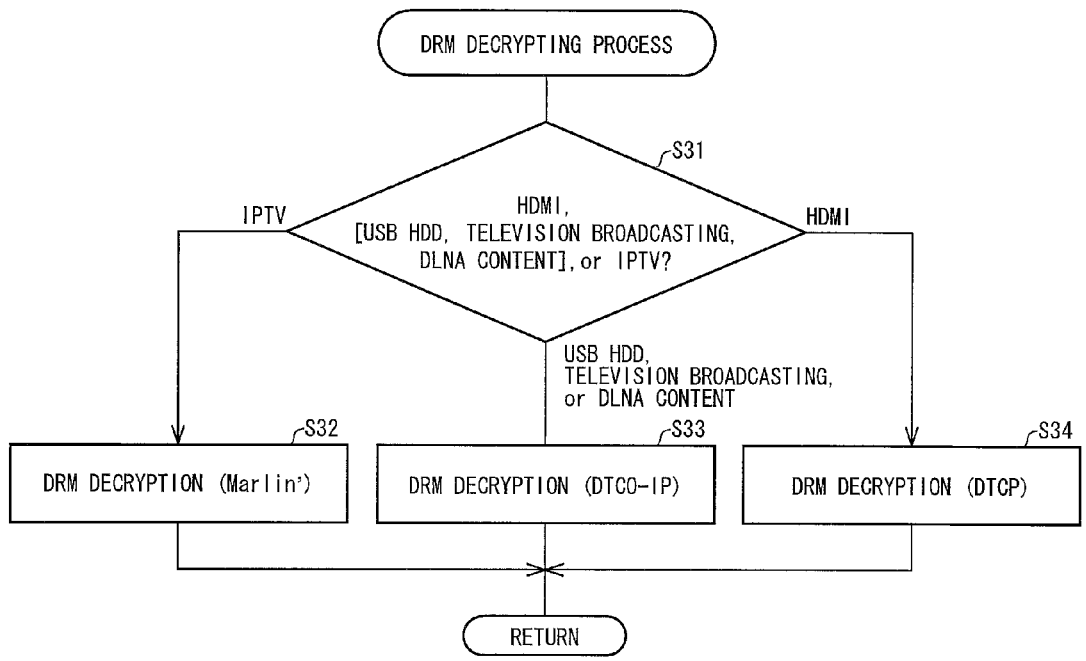

FIG. 11 is a flow chart showing details of a DRM decrypting operation in the flow chart shown in FIG. 10.

Figure 12:
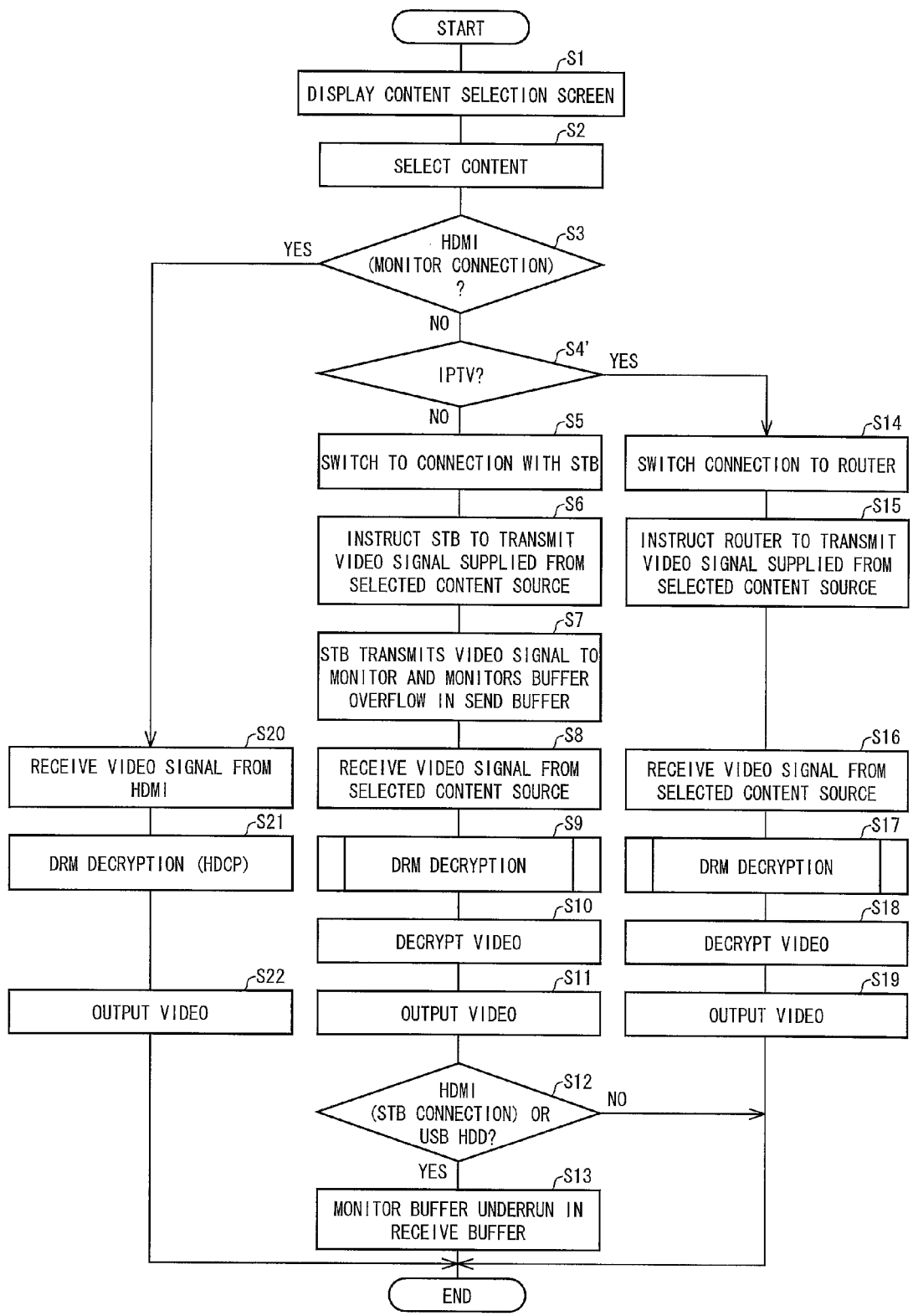

FIG. 12 is a flow chart showing other operations carried out by the monitor illustrated in FIG. 1 from selection of content to display of a video of the content on a display.

Figure 13:
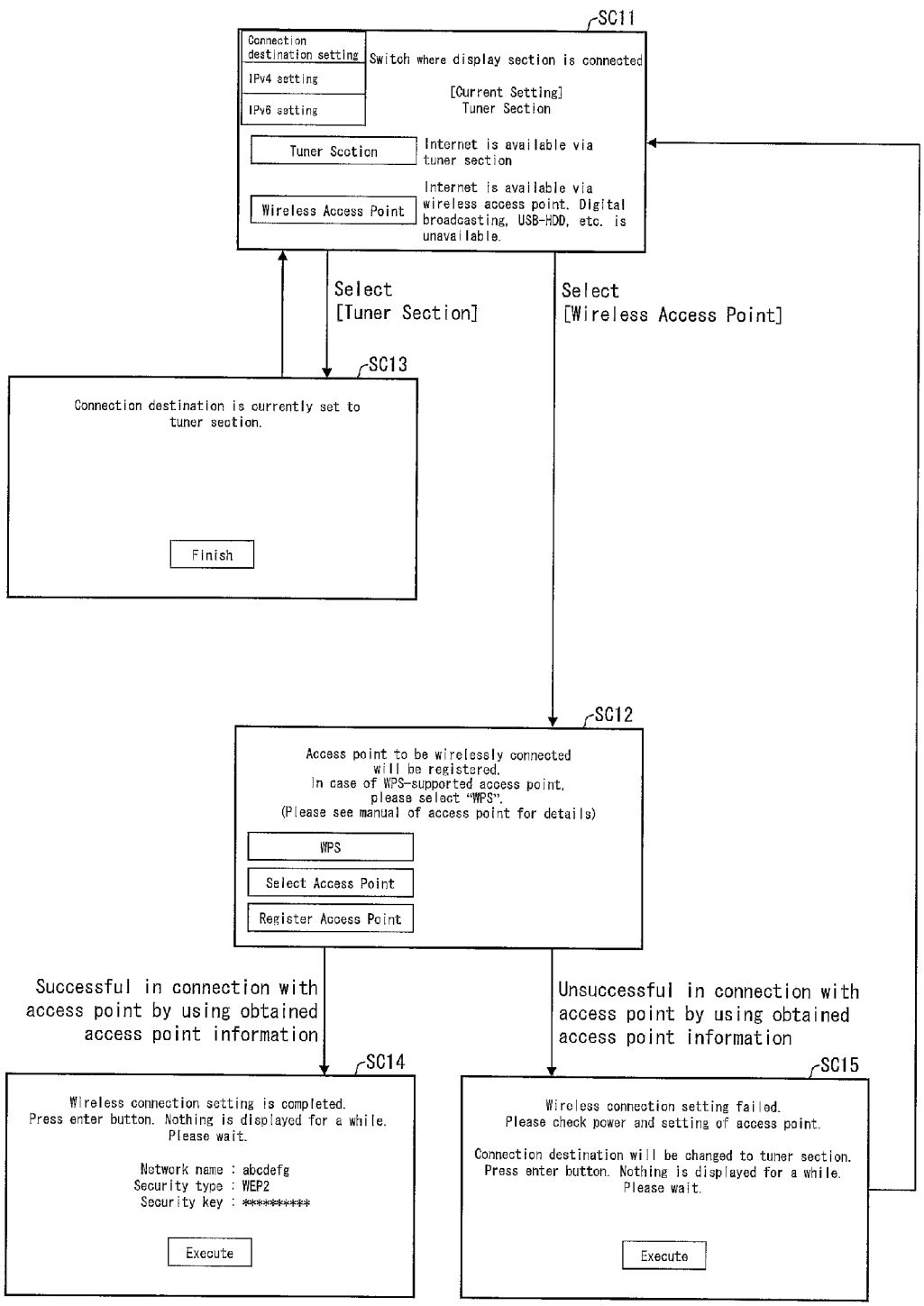

FIG. 13 is a view illustrating a series of connection destination setting screens for user's setting of a Wi-Fi connection destination of the monitor which are displayed by the monitor illustrated in FIG. 1.

Figure 14:
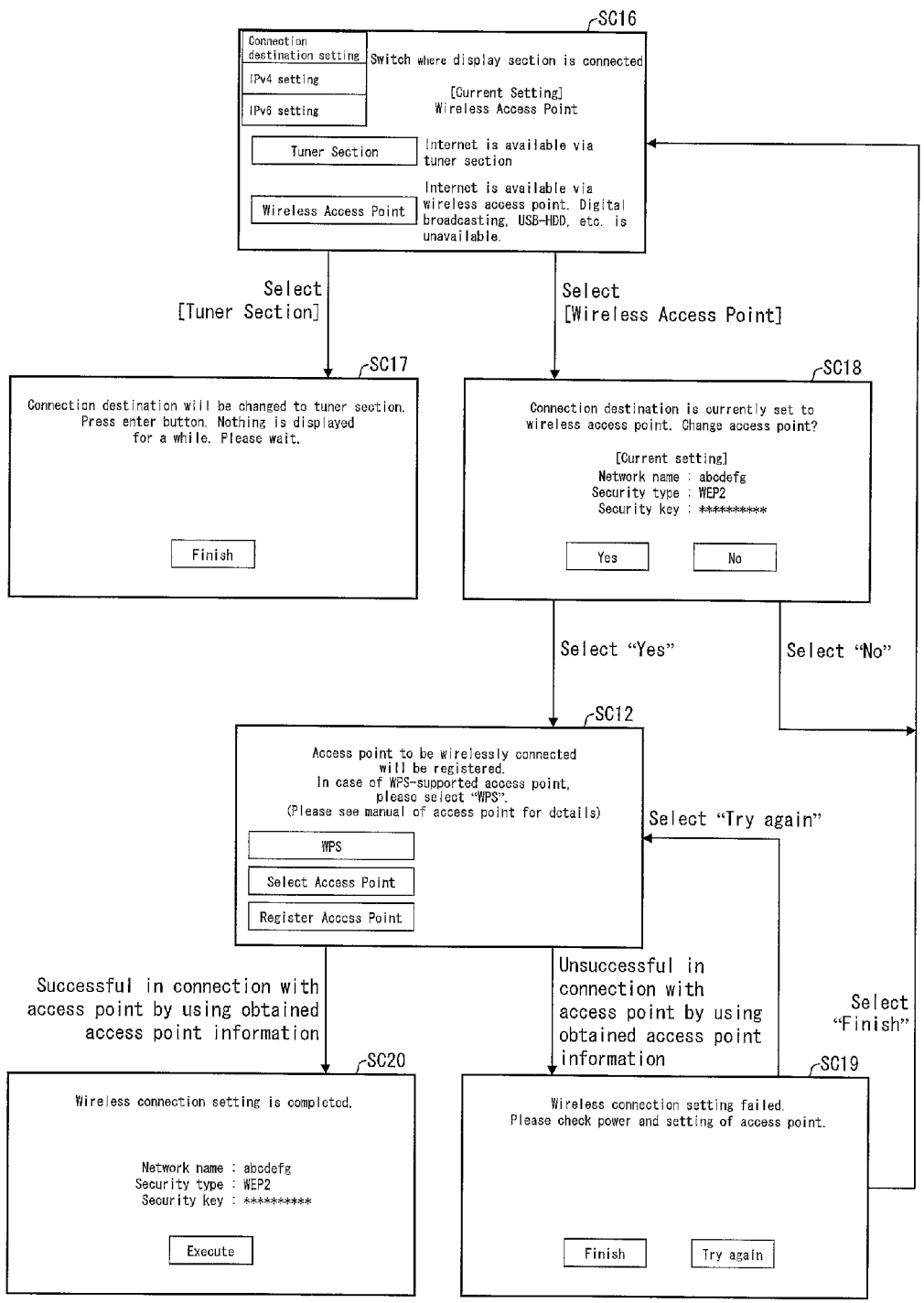

FIG. 14 is a view illustrating a series of connection destination setting screens for user's setting of a Wi-Fi connection destination of the monitor which are displayed by the monitor illustrated in FIG. 1.

FIG. 15 is a flow chart showing operations carried out by the monitor illustrated in FIG. 1 in a case where radio interference is detected during Wi-Fi communication with the set box illustrated in FIG. 1.

Figure 16:
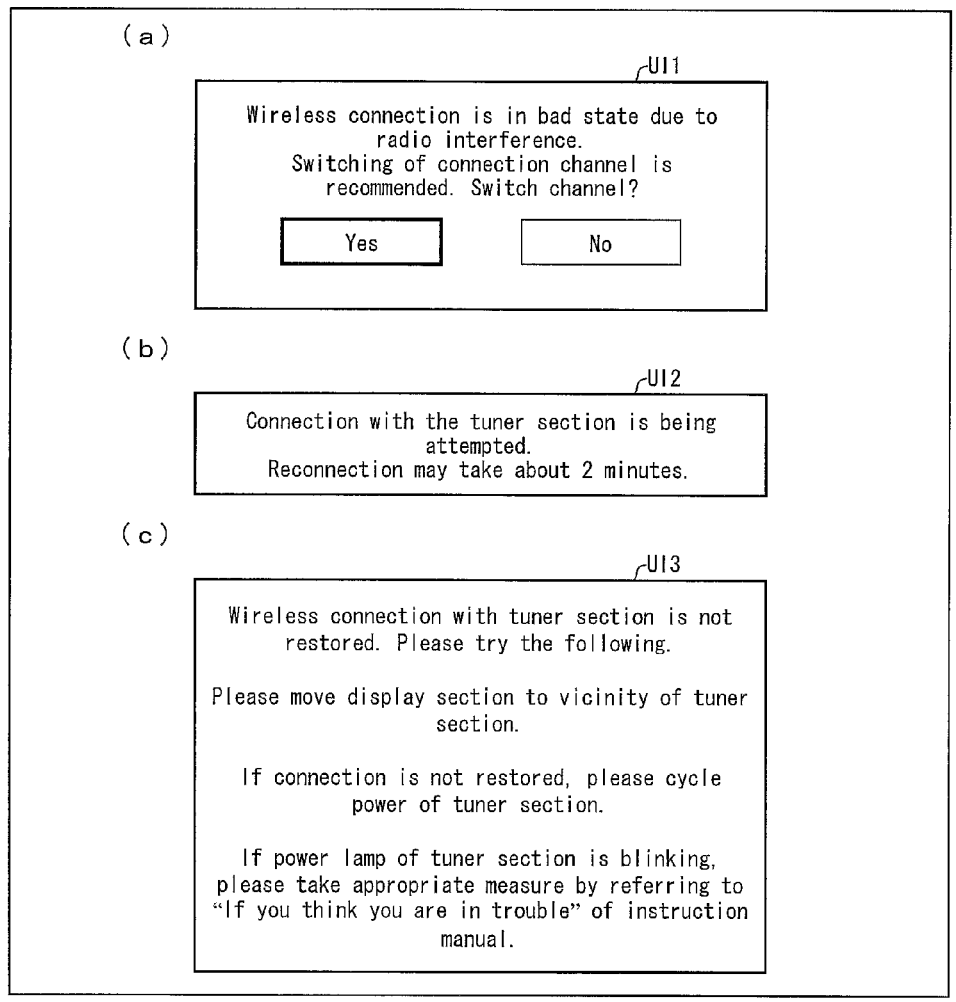

FIG. 16 is a view illustrating cautions displayed by the monitor illustrated in FIG. 1 in the process according to the flow chart of FIG. 15.

Figure 17:
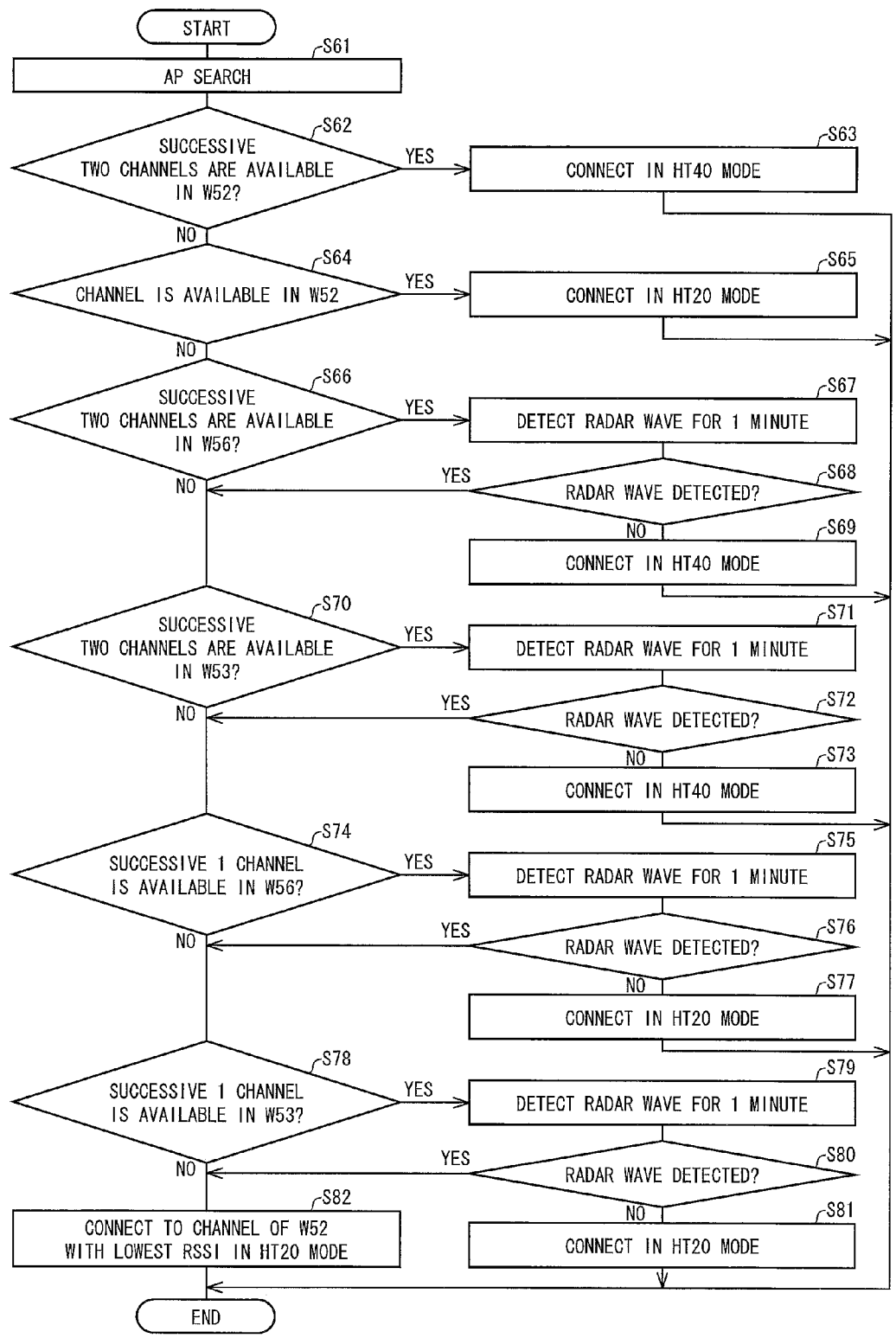

FIG. 17 is a flow chart showing detailed operations of an all channel AFS process executed by the set-top box illustrated in FIG. 1.

Figure 18:
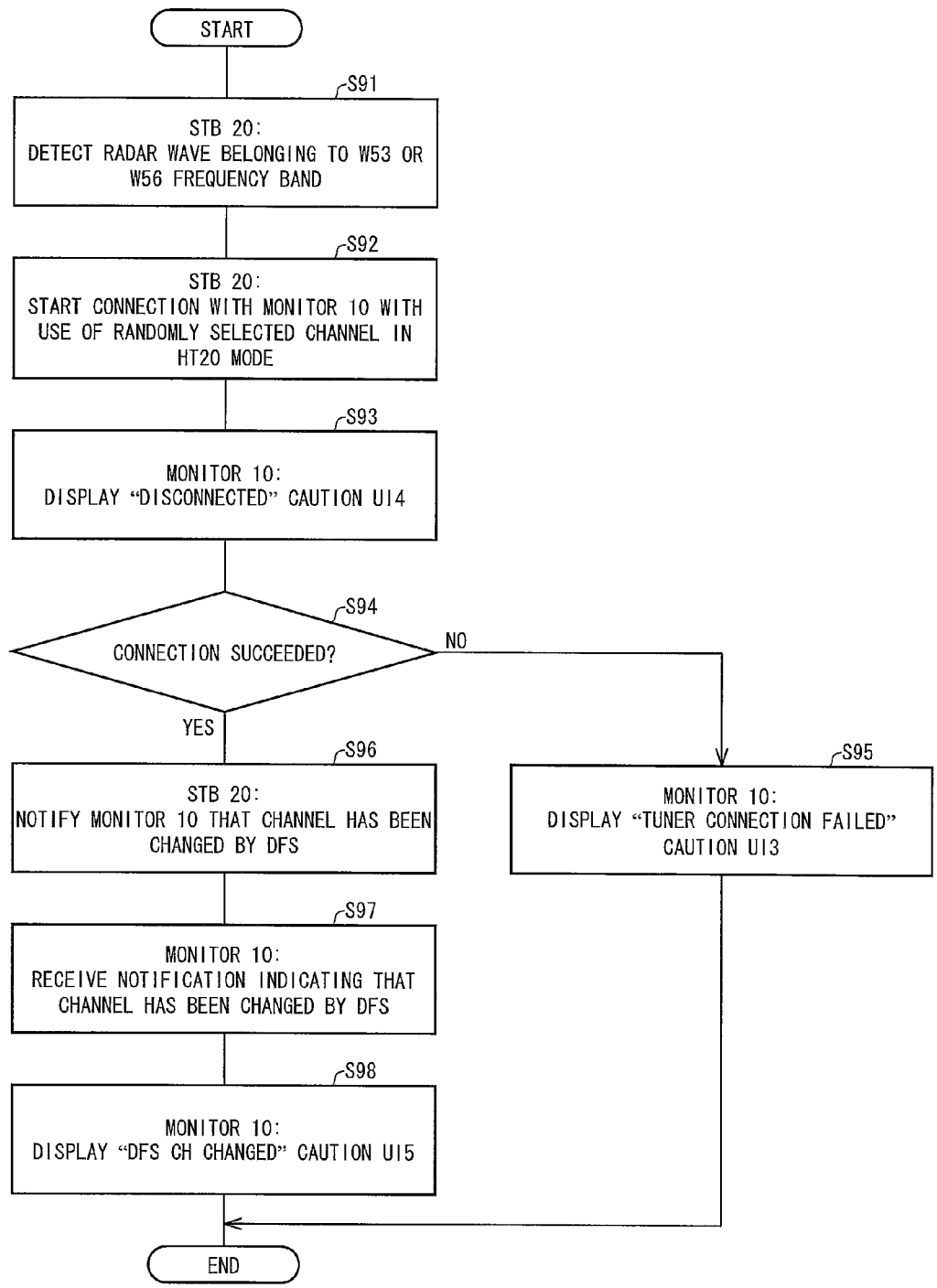

FIG. 18 is a flow chart showing operations carried out in a case where the set-top box illustrated in FIG. 1 detects a radar wave.

FIG. 19 is a view illustrating cautions displayed by the monitor illustrated in FIG. 1 in the process according to the flow chart of FIG. 18.

FIG. 20 is a view schematically illustrating an example of radar wave detection history data which is referred to for determination of a newly used channel in a case where the set-top box illustrated in FIG. 1 detects a radar wave.

Figure 21:
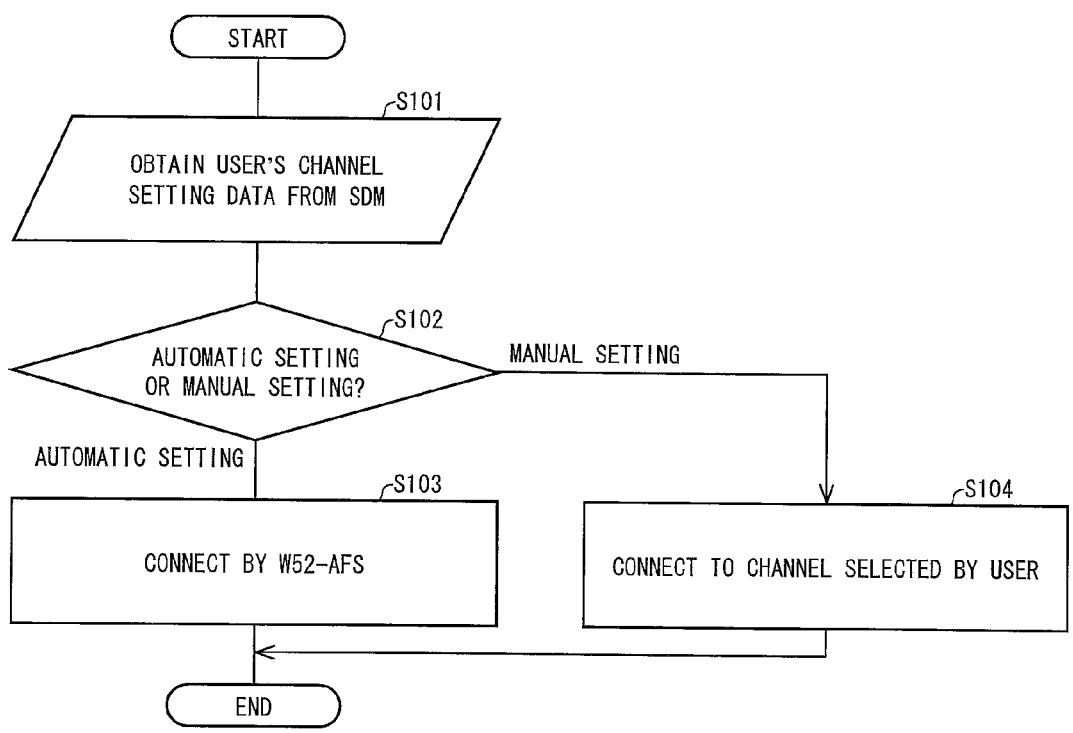

FIG. 21 is a flow chart showing an operation carried out at activation of the set-top box illustrated in FIG. 1.

FIG. 22 is a flow chart showing a detailed operation of a W52-AFS process which is executed by the monitor illustrated in FIG. 1 as one step of the process according to the flow chart of FIG. 21.

Figure 23:
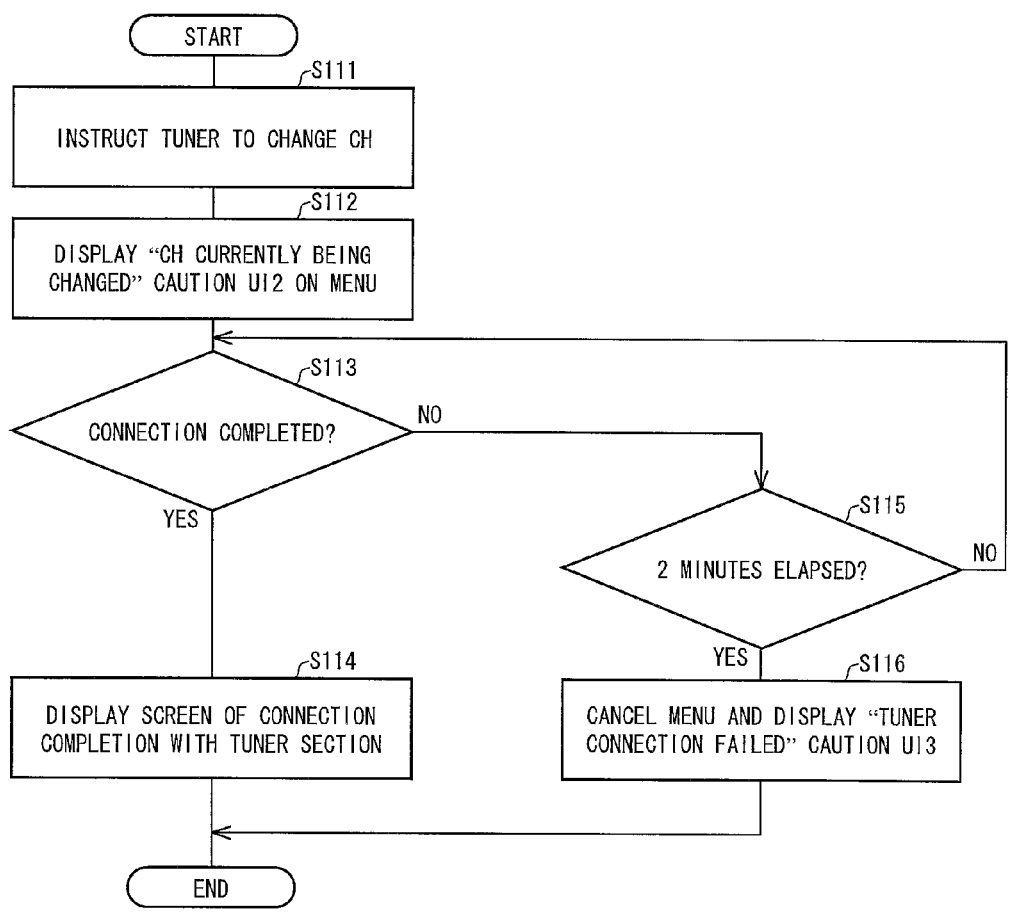

FIG. 23 is a flow chart showing an operation carried out in a case where the monitor illustrated in FIG. 1 accepts a user's designation of a channel used for Wi-Fi connection on a connection setting screen.

(a) through (c) of FIG. 24 is a view illustrating an example of a connection state confirmation screen displayed by the monitor illustrated in FIG. 1.

FIG. 25 is a view illustrating a series of connection setting screens displayed by the monitor illustrated in FIG. 1 in accordance with a user's operation instruction in a case where the user's operation instruction is an instruction to automatically determine a channel used for Wi-Fi connection.

Figure 26:
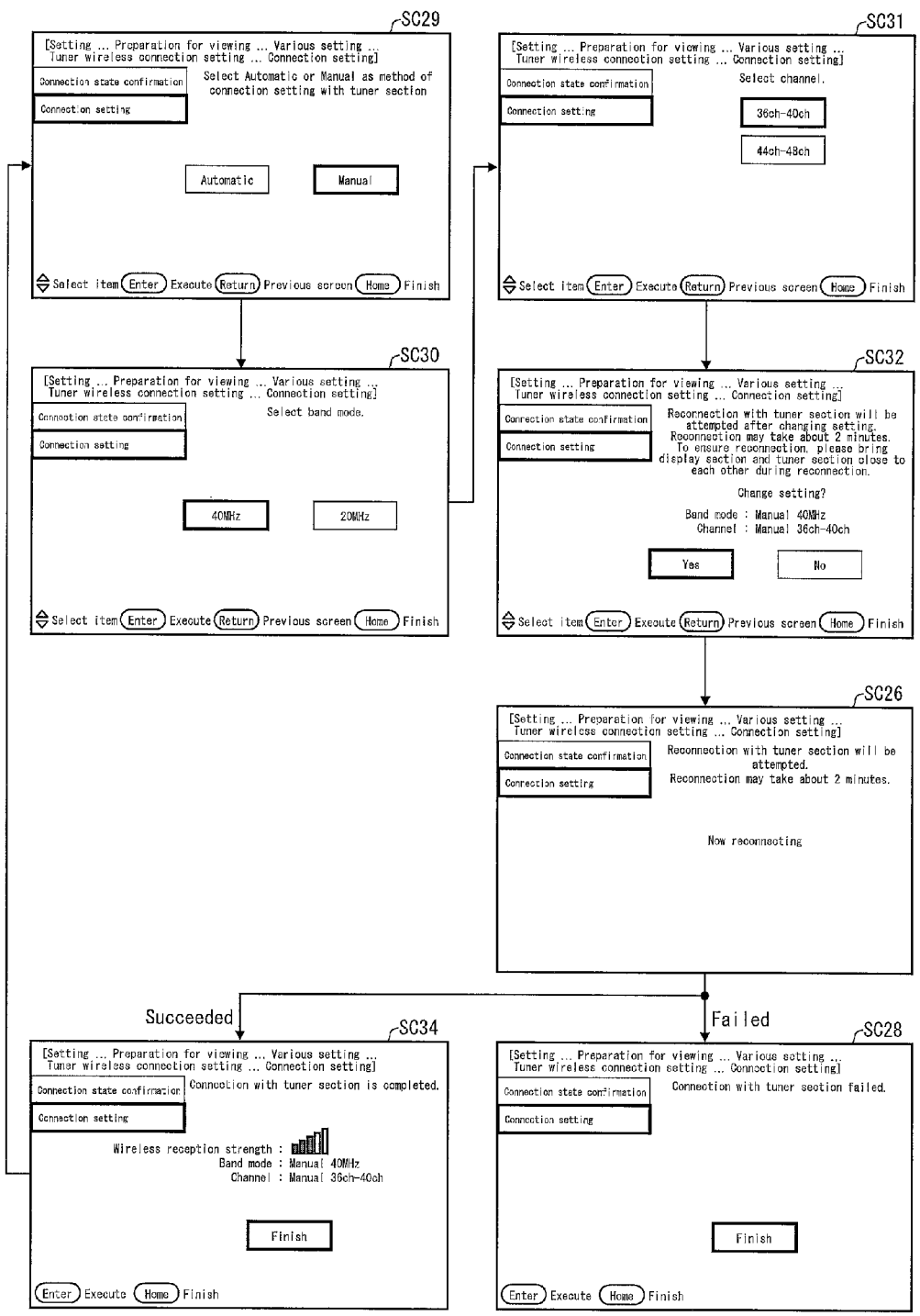

FIG. 26 is a view illustrating a series of connection setting screens displayed by the monitor illustrated in FIG. 1 in accordance with a user's operation instruction in a case where the user's operation instruction is an instruction to manually determine successive two channels as channels used for Wi-Fi connection.

Figure 27:
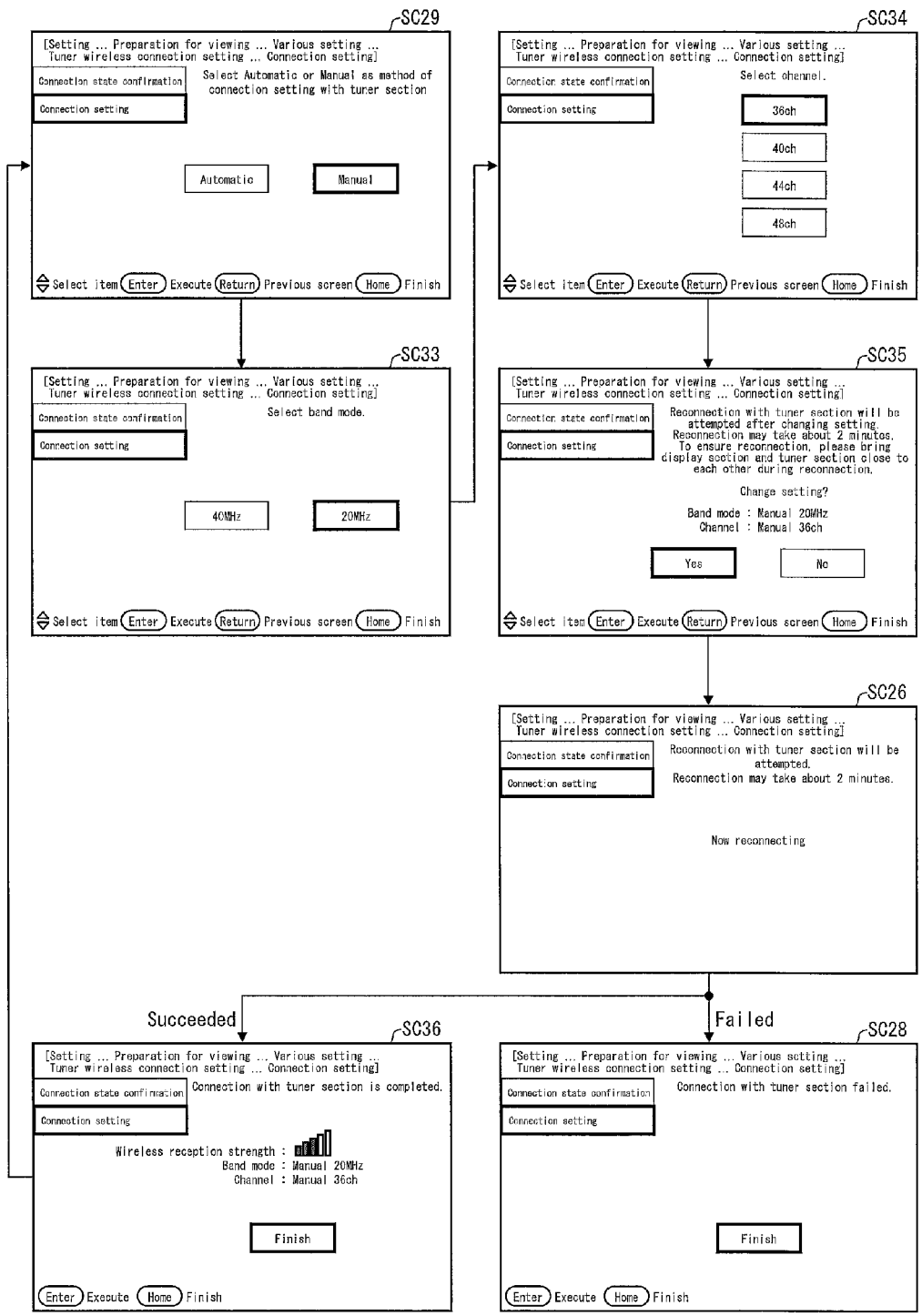

FIG. 27 is a view illustrating a series of connection setting screens displayed by the monitor illustrated in FIG. 1 in accordance with a user's operation instruction in a case where the user's operation instruction is an instruction to manually determine only 1 channel as a channel used for Wi-Fi connection.

FIG. 28 is a view illustrating a screen displayed by the monitor illustrated in FIG. 1 in a case where setting of a channel used for Wi-Fi connection cannot be accepted.

Figure 29:
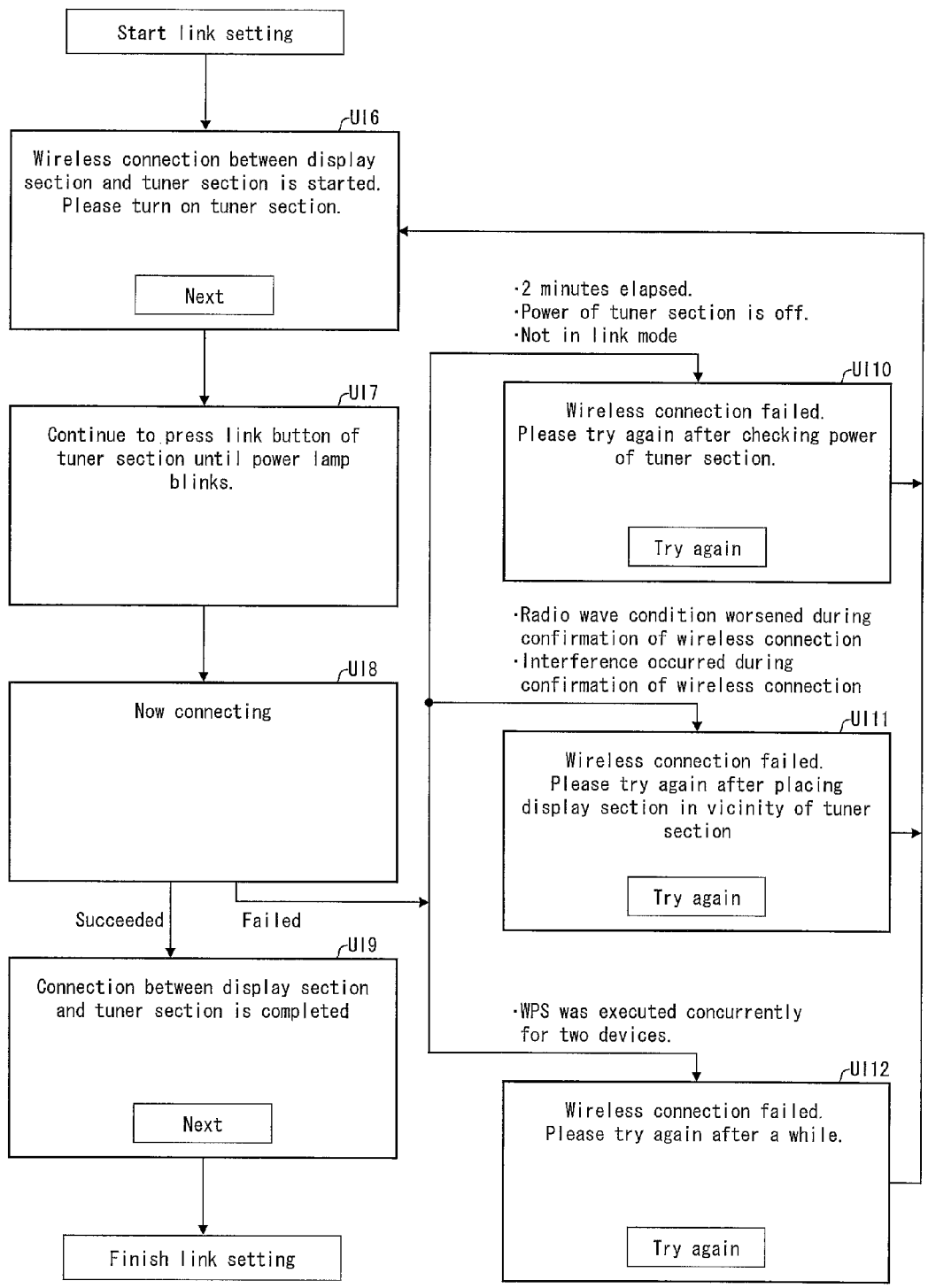

FIG. 29 is a view illustrating dialogs concerning link setting which are displayed by the monitor illustrated in FIG. 1.

Figure 30:
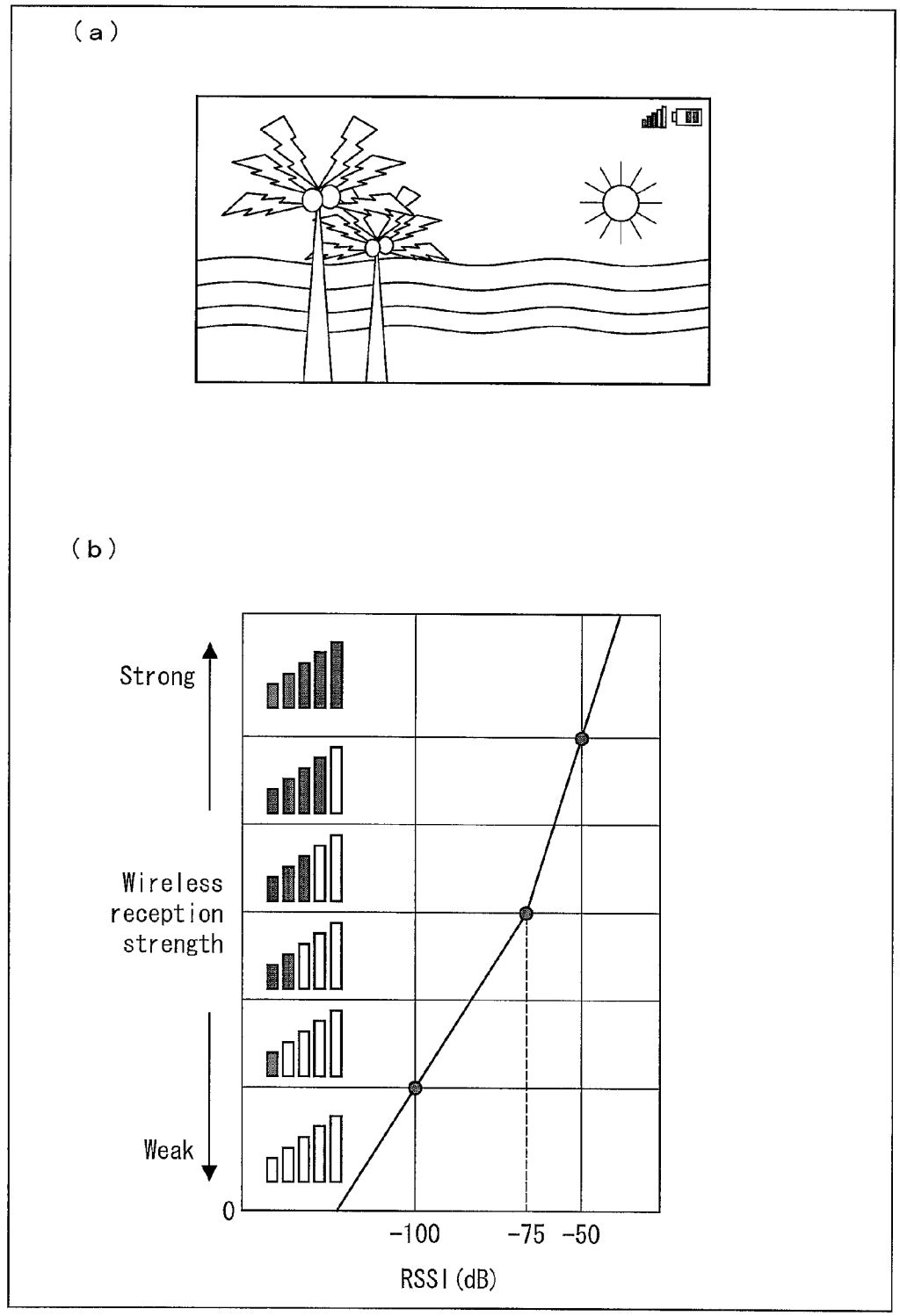

FIG. 30 is a view for explaining a radio wave strength icon. (a) of FIG. 30 illustrates an example of a video displayed on the monitor illustrated in FIG. 1. (b) of FIG. 30 is a graph showing relationship between (i) received signal strength of a radio wave in the monitor illustrated in FIG. 1 which radio wave is supplied from the set-top box illustrated in FIG. 8 and (ii) a radio wave strength icon displayed on an upper right corner of a video.

Figure 31:
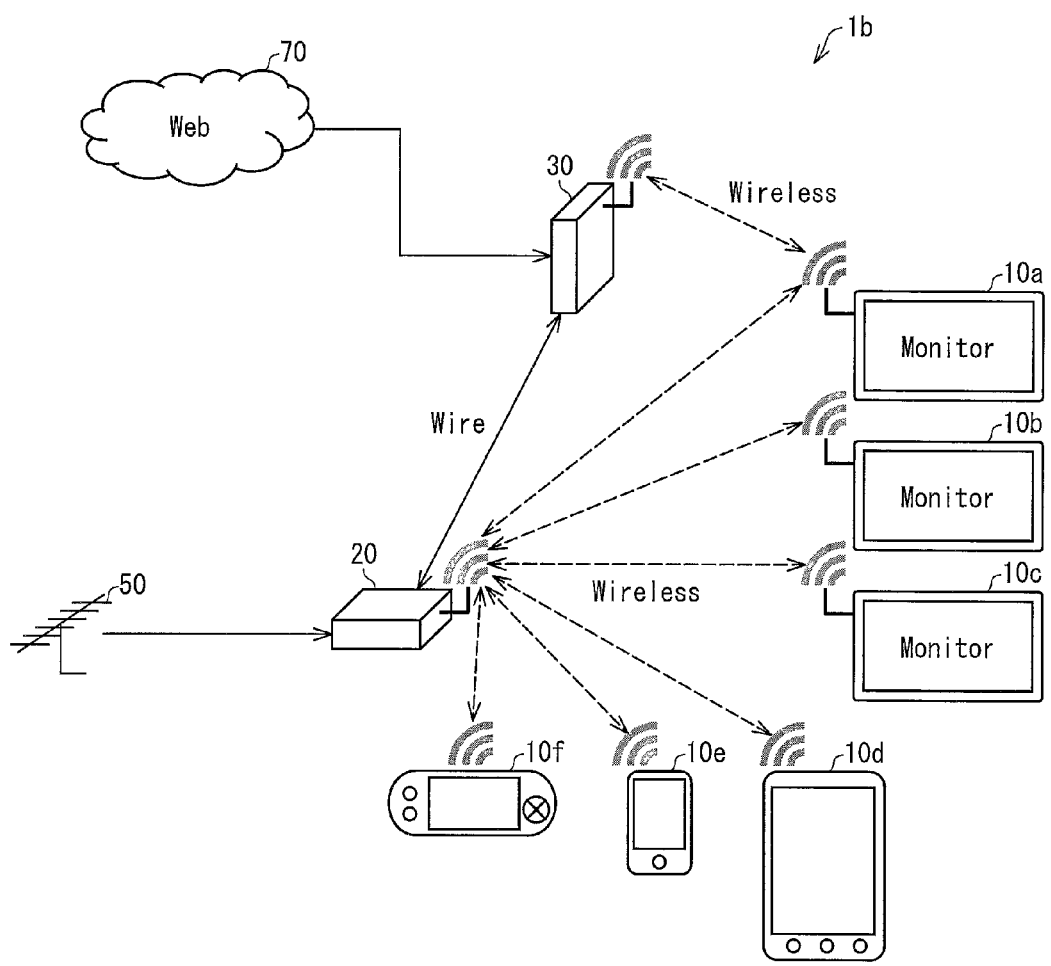

FIG. 31 is a block diagram schematically illustrating a configuration of a content display system of another modification of an embodiment of the present invention.

FIG. 32 is a block diagram schematically illustrating a configuration of a content display system of still another modification of an embodiment of the present invention.

Figure 33:
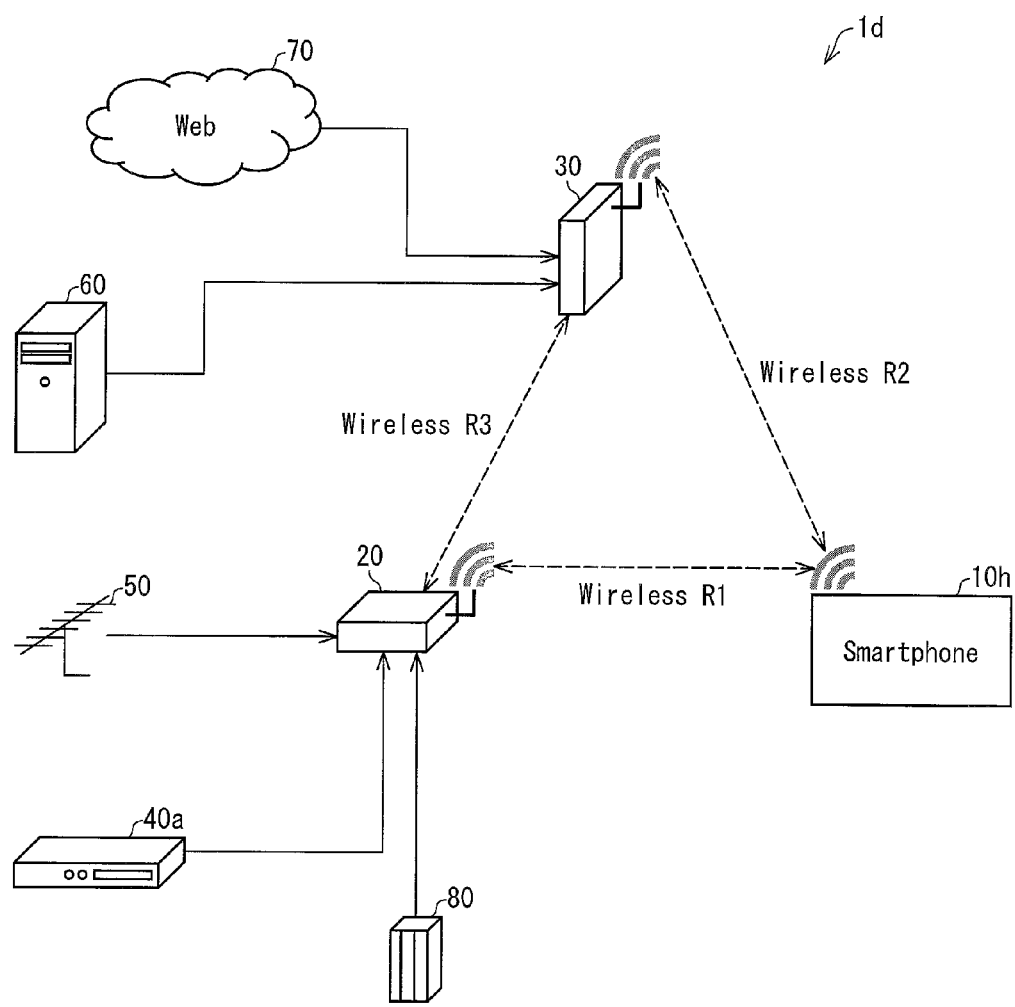

FIG. 33 is a block diagram schematically illustrating a configuration of a content display system of still another modification of an embodiment of the present invention.

FIG. 34 is a block diagram schematically illustrating a configuration of a content display system of still another modification of an embodiment of the present invention.

Figure 35:
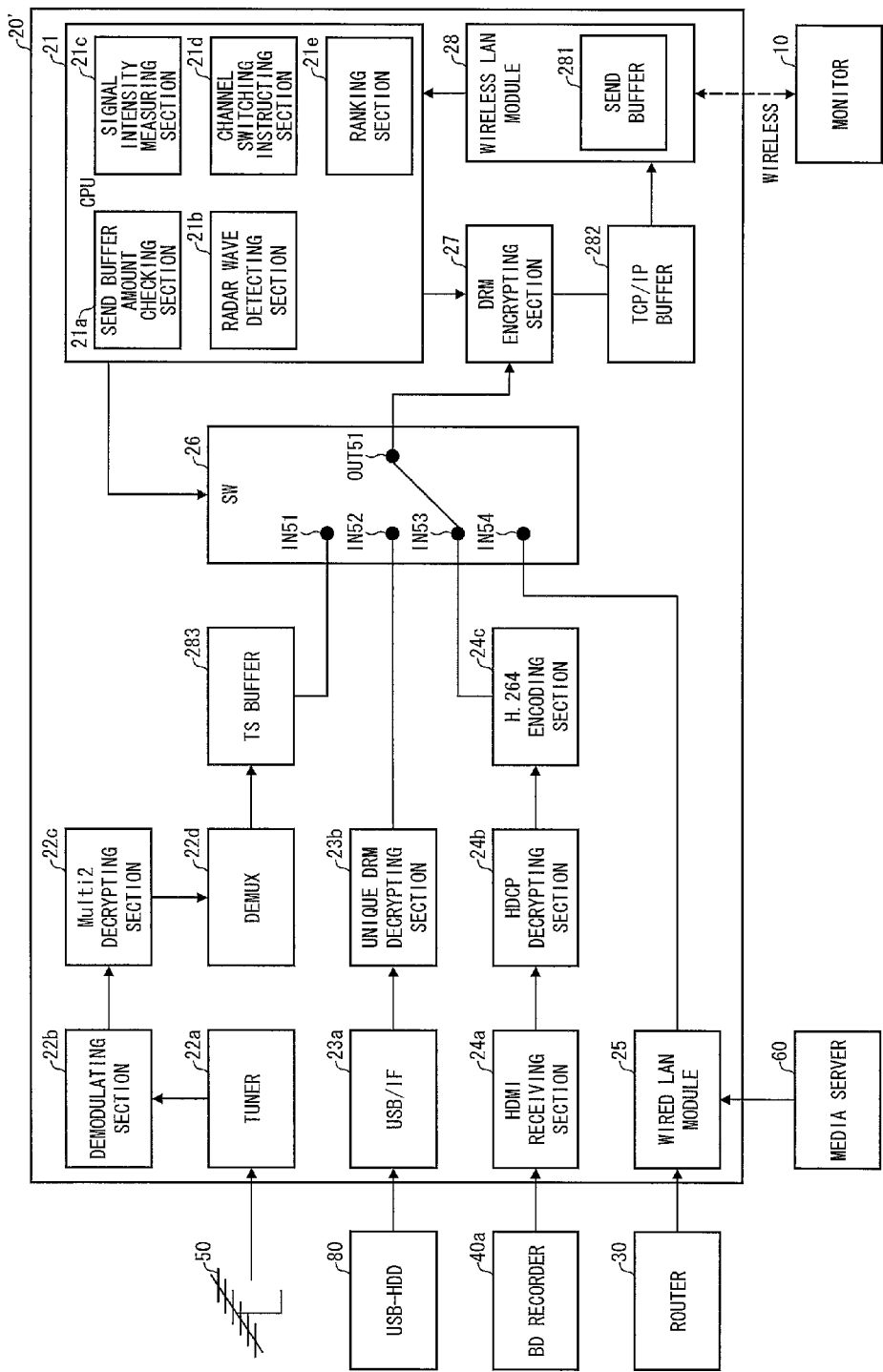

FIG. 35 is a block diagram illustrating a modification of the set-top box illustrated in FIG. 8.

Figure 36:
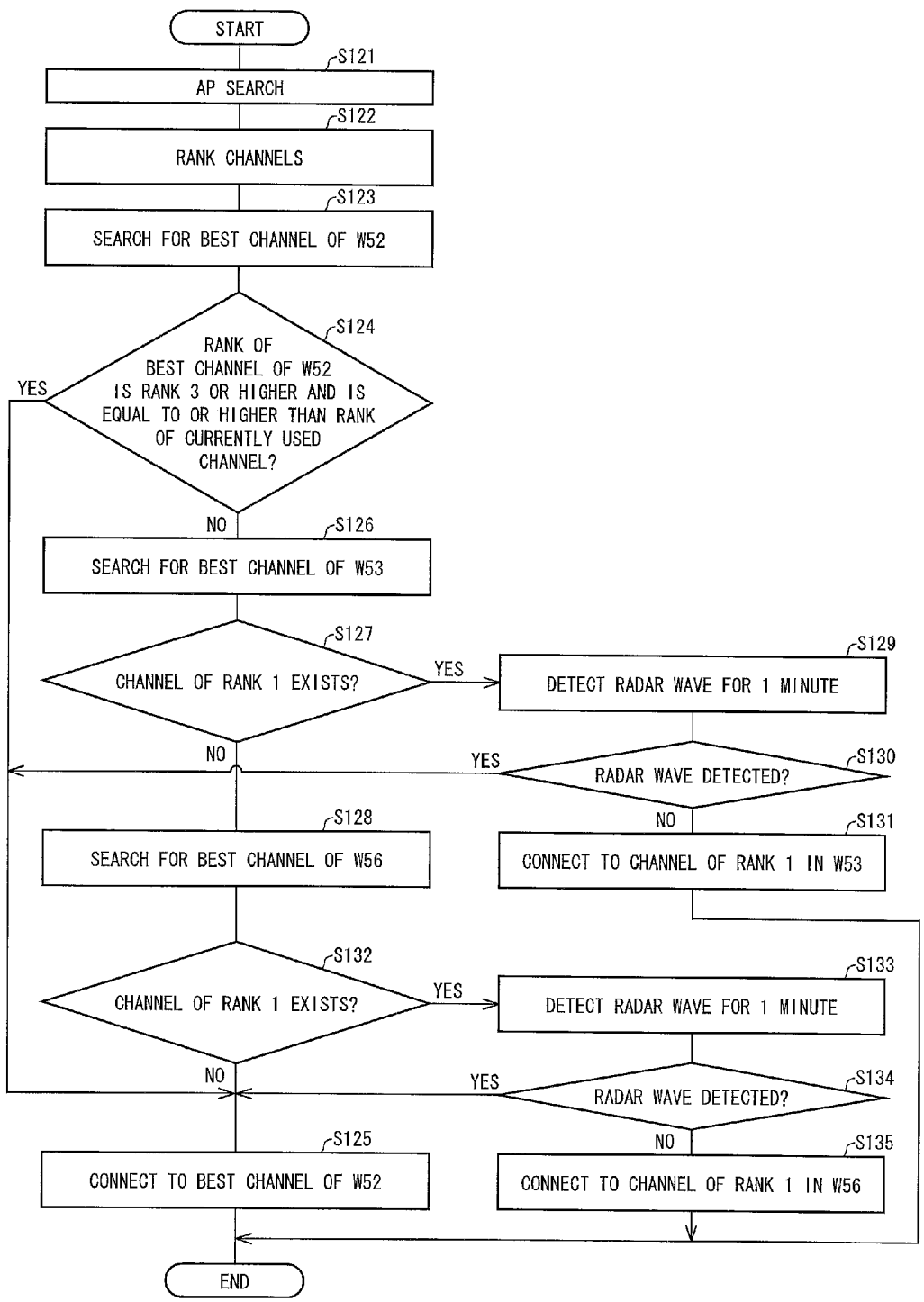

FIG. 36 is a flow chart showing a detailed operation of an all-channel AFS process executed by the set-top box illustrated in FIG. 35.

FIG. 37 is a view showing, for each channel, an example of the number of existing APs using the channel and a rank of the channel.

DESCRIPTION OF EMBODIMENTS

An embodiment of the present invention is described below with reference to the drawings. In the following description, a monitor is taken as an example of an output device. However, the present invention is not limited to this. The output device may be another device, such as a PDA, a smartphone, a tablet PC, or a handheld gaming device, which has a display section and functions as a display device.

The following describes an overall configuration and operation of a content display system of the present embodiment. First, the configuration of the content display system of the present embodiment is described with reference to FIG. 1. FIG. 1 is a view schematically illustrating the configuration of a content display system 1 of the present embodiment. The content display system 1 is a system which receives video content provided by a plurality of content sources. The content display system 1 includes a monitor 10 (output device, communication device), a set-top box (STB) 20 (transmitting device), and a router 30 (transmitting device).

The STB 20 (displayed as "tuner section" on a display of the monitor 10) and the monitor 10 (displayed as "display section" on a display of the monitor 10) are configured to be wirelessly connectable only to a device having an identification code, such as a MAC address, by which the device can be uniquely identified. This is because the present embodiment assumes a case where the STB 20 and the monitor 10 combine to constitute a single commodity. Since the combination of the STB 20 and the monitor 10 is fixed as a single commodity, it is unnecessary to carry out an operation necessary for initial setting for wireless connection between these two devices, thereby exempting a user from an unnecessary burden.

The STB 20 and the router 30 (displayed as "wireless access point" on a display of the monitor 10) function as an access point for relaying the video content from the plurality of content sources. The "access point" means a terminal having a radio wave relaying function for wireless connection from a certain terminal to another terminal or server.

The monitor 10 is a video reproducing device which wirelessly receives a video signal from the STB 20 and the router 30. The monitor 10 can selectively switch its connection destination between the STB 20 and the router 30. A frequency band for wireless connection between the monitor 10 and the STB 20 can be either a 2.4 GHz band or a 5 GHz band. A frequency band for wireless connection between the monitor 10 and the router 30 is 2.4 GHz. The STB 20 and the router 30 may be connected by a wire. The frequency band for wireless connection between the monitor 10 and the router 30 may be fixed to the 5 GHz band or may be switched between the 2.4 GHz band and the 5 GHz band.

More specifically, the available 5 GHz band is constituted by a W52 band (5.15 GHz to 5.25 GHz band made up of four channels, 36ch, 40ch, 44ch, and 48ch), a W53 band (5.25 GHz to 5.35 GHz band made up of four channels, 52ch, 56ch, 60ch, and 64ch), and a W56 band (5.47 GHz to 5.725 GHz band made up of eleven channels, 100ch, 104ch, 108ch, 112ch, 116ch, 120ch, 124ch, 128ch, 132ch, 136ch, and 140ch). Further, specifically, 1 channel or successive 2 channels belonging to any one of the three bands (19 channels in total) is(are) set as a channel used for the wireless communication.

In the present embodiment, for example, (i) BD recorders 40a and 40b, which support HDMI, (ii) a media server 60, which supports DTV/BS broadcasting or DLNA, and (iii) a Web 70 are provided as the plurality of content sources.

(Content Selection Screen)

Figure 2:
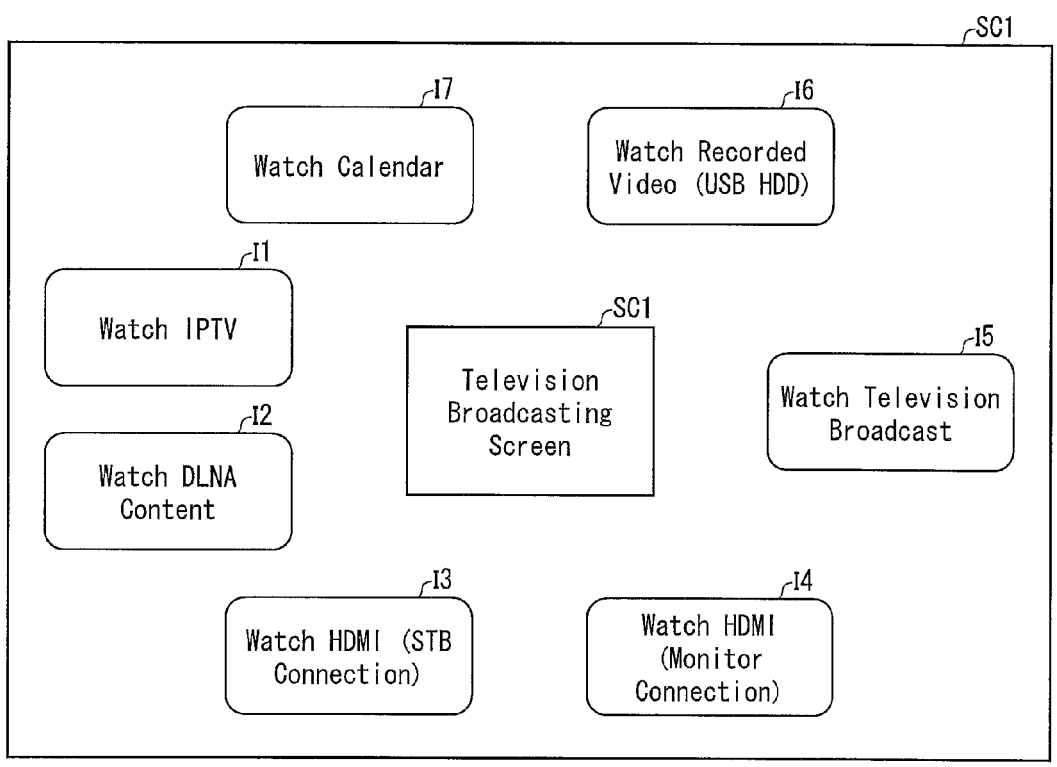
FIG. 2 is a view illustrating an example of a content selection screen displayed on a monitor illustrated in FIG. 1.

FIG. 2 is a view illustrating an example of a content selection screen SC displayed on the monitor 10. On the content selection screen SC, a television broadcasting screen SC1 is displayed in a central part, and seven icons I1 through I7, each representing content that can be viewed, are displayed around the television broadcasting screen SC1.

For example, the icon I1 is an icon for viewing IPTV broadcasting provided by the Web 70 shown in FIG. 1. The icon I2 is an icon for viewing content provided by the media server 60 (DLNA-supported device). The icon I3 is an icon for viewing content provided by the BD recorder 40a (external device) which is an HDMI-supported device connected to the STB 20. The icon I4 is an icon for viewing content provided by the BD recorder 40b which is an HDMI-supported device connected to the monitor 10. The icon I5 is an icon for viewing TV broadcasting received from the DTV/BS antenna 50. The icon I6 is an icon for viewing content provided by the hard disc device 80 that can be connected via a USB terminal. The icon I7 is an icon for displaying a calendar on the basis of a calendar function of the monitor 10.

(Format of Video Signal and DRM)

(a) of FIG. 3 is a table showing DRM encrypting operations carried out by the content sources and DRM encrypting operations carried out by the access points. (b) of FIG. 3 is a view schematically illustrating encryption formats between the content sources and the access points and encryption formats between the access points and the monitor 10.

As is clear from (a) and (b) of FIG. 3, for example, a video signal supplied from a USB-HDD 80 is encrypted in a unique DRM format, decrypted and then encrypted in a DTCP-IP format at the access point (STB 20), and then transmitted to the monitor 10. Meanwhile, a video signal of video on demand or IPTV (multicast broadcasting) supplied from the Web 70 (IPTV/VOD server on the Internet) is encrypted in a Marlin format, and is transmitted to the monitor 10 without a change in format at the access point (router 30). Meanwhile, a video signal supplied from the media server 60 which provides DLNA in a home network is encrypted with the use of a DTCP-IP copyright protection technique at the media server 60.

(Configuration of Monitor)

FIG. 4 is a block diagram illustrating a configuration of the monitor 10. The monitor 10 decodes a video signal transmitted from the STB 20 or the router 30 through Wi-Fi communication and then displays video represented by the video signal. The monitor 10 is basically similar to the STB 20 and a general television. Specifically, the monitor 10 includes a CPU 11, a wireless LAN module 12a, an HDMI receiving section 12b, a switch (SW) 13, a DRM decrypting section 14, a DEMUX 15, a video decrypting section 16, a lookup table (LUT) 17, a video processing section 18a, and a display 19 (output section, display section).

The CPU 11 includes a UI display section 11a (display control means), a content selecting section 11b, a video reception selecting section 11c, a content switching instructing section 11d, a channel switching instructing section 11e (first executing means, second executing means), a receive buffer amount checking section 11f (determining means), and a signal intensity measuring section 11g (signal intensity measuring means). The CPU 11 controls the wireless LAN module 12a, the SW 13, the DRM decrypting section 14, the DEMUX 15, the video decrypting section 16, and the video processing section 18a.

The wireless LAN module 12a is wirelessly connected to the STB 20 and the router 30, and receives a video signal from the STB 20 and the router 30. The HDMI receiving section 12b is connected to the BD recorder 40b.

Specifically, the wireless LAN module 12a has therein a receive buffer 120a. The wireless LAN module 12a causes received video signals (video data) to be sequentially stored in the receive buffer 120a and causes the video signals (video data) stored in the receive buffer 120a to be sequentially outputted to the SW 13. Therefore, no buffer underrun occurs in the receive buffer 120a while the video signals are being transmitted to the monitor 10 at certain level of transmission rate, but the buffer overrun occurs in the receive buffer 120a when the transmission rate greatly declines.

The SW 13 includes 2 input terminals IN1 and IN2 and 1 output terminal OUT1. The input terminal IN1 is connected to the wireless LAN module 12a, and the input terminal IN2 is connected to the HDMI receiving section 12b. The SW 13 selects either an input signal supplied to the input terminal IN1 or an input signal supplied to the input terminal IN2 on the basis of an instruction from the CPU 11, and causes the input signal to be outputted from the output terminal OUT1.

The UI screen display section 11a causes various screens, such as the content selection screen shown in FIG. 2, a connection state confirmation screen shown in FIG. 19, and a connection setting screen shown in FIG. 20, to be displayed on the display 19 in accordance with a user's operation. The content selecting section 11b selects a content source in accordance with a user's operation made on the content selection screen.

The video reception selecting section 11c controls the wireless LAN module 12a and the SW 13. Specifically, the video reception selecting section 11c determines, based on the LUT 17 representing preset correspondences among a content source, a DRM encryption format, and a video signal compression format, whether the content source (hereinafter sometimes referred to as "target content source") selected by the content selecting section 11b is provided via an access point (the STB 20 or the router 30) or provided via the HDMI receiving section 12b.

Specifically, the video reception selecting section 11c determines that the target content source is provided via the access point, in a case where a video signal compression format is associated with the target content source in the LUT 17. Meanwhile, the video reception selecting section 11c determines that the target content source is provided via the HDMI receiving section 12b, in a case where a video signal compression format is not associated with the target content source in the LUT 17.

In the case where the target content source is provided via the access point, the video reception selecting section 11c specifies the access point used for reception of a video signal supplied from the target content source. Then, the video reception selecting section 11c causes the wireless LAN module 12a to receive the video signal supplied from the access point thus specified, and causes the SW 13 to select the input terminal IN1 connected to the wireless LAN module 12a.

The content switching instructing section 11d supplies, to the wireless LAN module 12a, an instruction signal for instructing the access point specified by the video reception selecting section 11c to transmit, to the monitor 10, the video signal supplied from the target content source. For example, in a case where the BD recorder 40a is selected as a content source, the content switching instructing section 11d supplies a preset control command for the STB 20 to the wireless LAN module 12a. This allows the wireless LAN module 12a to receive, from the STB 20, a video signal transmitted by the BD recorder 40a, as a response to the control command transmitted to the STB 20.

The channel switching instructing section 11e designates a channel to be used for wireless communication of the wireless LAN module 12a. For example, the channel switching instructing section 11e designates 36ch of W52 as the channel to be used for wireless communication of the wireless LAN module 12a.

The receive buffer amount checking section 11f checks a data amount of data buffered in the receive buffer 120a of the wireless LAN module 12a.

The signal intensity measuring section 11g measures RSSI (received signal strength indicator) of Wi-Fi waves emitted from access points around the monitor 10.

The DRM decrypting section 14 carries out decryption according to DRM in accordance with a DRM encryption format of the video signal outputted from the SW 13. As illustrated in FIG. 5, the DRM decrypting section 14 includes two SWs 14a and 14b, a DTCP-IP decrypting section 14c, an HDCP decrypting section 14d, and a Marlin decrypting section 14e.

The SW 14a includes 1 input terminal IN11 and 3 output terminals OUT11 through OUT13. The SW 14b includes 3 input terminals IN21 through IN23 and 1 output terminal OUT21. Switching between the SWs 14a and 14b is controlled by the CPU 11.

The DTCP-IP decrypting section 14c decrypts a video signal encrypted in a DTCP-IP format. The DTCP-IP decrypting section 14c is provided between the output terminal OUT11 of the SW 14a and the input terminal IN21 of the SW 14b. The HDCP decrypting section 14d decrypts a video signal encrypt in an HDCP format. The HDCP decrypting section 14d is provided between the output terminal OUT12 of the SW 14a and the input terminal IN22 of the SW 14b. The Marlin decrypting section 14e decrypts a video signal encrypted in a Marlin format. The Marlin decrypting section 14e is provided between the output terminal OUT13 of the SW 14a and the input terminal IN23 of the SW 14b.

The CPU 11 controls switching between the SW 14a and the SW 14b by referring to the LUT 17 stored in a memory (not illustrated). FIG. 6 illustrates an example of the LUT 17. As illustrated in FIG. 6, the LUT 17 shows correspondences among the content source, the DRM encryption format, and the video signal compression format.

Based on the LUT 17, the CPU 11 controls the DRM decrypting section 14 so that a decrypting section corresponding to a DRM encryption format of a video signal supplied from a selected content source carries out a decrypting process. For example, in a case where a received video signal is a video signal supplied from the Web 70, the CPU 11 controls the DRM decrypting section 14 so that the Marlin decrypting section 14e of the DRM decrypting section 14 carries out a decrypting process. That is, the CPU 11 controls the DRM decrypting section 14 so that the SW 14a selects the output terminal OUT14 and the SW 14b selects the input terminal IN24. Similarly, in a case where a received video signal is a video signal supplied from the DTV/BS antenna 50, the media server 60, or the USB-HDD 80, the CPU 11 controls the DRM decrypting section 14 so that the DTCP-IP decrypting section 14c carries out a decrypting process. In a case where a received signal is a video signal from the BD recorder 40a or the BD recorder 40b, the CPU 11 controls the DRM decrypting section 14 so that the HDCP decrypting section 14d carries out a decrypting process.

The DEMUX 15 mainly demultiplexes, for example, an IPTV video signal supplied from the Web 70 out of video signals outputted from the DRM decrypting section 14. A video signal outputted from the DEMUX 15 is supplied to the video decrypting section 16.

The video decrypting section 16 decrypts the video signal in accordance with a compression format of the video signal. As illustrated in FIG. 7, the video decrypting section 16 includes two SWs 16a and 16b, an MPEG2 decrypting section 16c, and an H.264 decrypting section 16d.

The SW 16a includes 1 input terminal IN31 and 3 output terminals OUT31 through OUT33. The SW 16b includes 3 input terminals IN41 through IN43 and 1 output terminal OUT41. Switching between the SW 16a and the SW 16b is controlled by the CPU 11.

The MPEG2 decrypting section 16c decrypts a video signal compressed in an MPEG2 format. The MPEG2 decrypting section 16c is provided between the output terminal OUT31 of the SW 16a and the input terminal IN41 of the SW 16b. The H.264 decrypting section 16d decrypts a video signal compressed in an H.264 format. The H.264 decrypting section 16d is provided between the output terminal OUT32 of the SW 16a and the input terminal IN42 of the SW 16b. The output terminal OUT33 of the SW 16a and the input terminal IN43 of the SW 16b are directly connected to each other.

The CPU 11 controls switching between the SW 16a and the SW 16b by referring to the LUT 17. Specifically, the CPU 11 controls, by referring to the correspondences between the content source and the compression format in the LUT 17 shown in FIG. 6, the video decrypting section 16 so that a decrypting section corresponding to a compression format of a video signal supplied from a selected content source carries out a decrypting process. For example, in a case where a received video signal is a video signal from the BD recorder 40a or the Web 70, the CPU 11 controls the video decrypting section 16 so that the H.264 decrypting section 16d of the video decrypting section 16 carries out a decrypting process. That is, the CPU 11 controls the video decrypting section 16 so that the SW 16a selects the output terminal OUT32 and the SW 16b selects the input terminal IN42. Similarly, in a case where a received video signal is a video signal from the DTV/BS antenna 50, the media server 60, or the USB-HDD 80, the CPU 11 controls the video decrypting section 16 so that one of the MPEG2 decrypting section 16c and the H.264 decrypting section 16d which one corresponds to a format of compression of the video signal carries out a decrypting process. Note that since a video signal supplied from the BD recorder 40b is a base band signal, the CPU 11 controls the video decrypting section 16 so that the SW 16a selects the output terminal OUT33 and the SW 16b selects the input terminal IN43.

A video signal outputted from the video decrypting section 16 is supplied to the video processing section 18a. The video processing section 18a subjects the video signal to predetermined image processing such as image quality correction, and then supplies the video signal to the display 19 via the panel controller 18b. In this way, an image of video content transmitted from a selected content source is displayed on the display 19.

The DRM encryption formats supported by the monitor 10 of the present embodiment are Marlin encryption, DTCP-IP encryption, and HDCP encryption. Note, however, that the present invention is not limited to this. That is, types of decrypting sections in a DRM decrypting section of a display device may be appropriately changed depending on types of DRM encryption formats supported by the display device. Further, no DRM decrypting section may be provided in a display device in a case where the display device does not support DRM.

Similarly, video compression formats supported by the monitor 10 of the present embodiment are MPEG2 and H264, but the present invention is not limited to this. That is, types of decrypting sections in a video decrypting section of a display device may be appropriately changed depending on types of video compression formats supported by the display device.

(Configuration of STB)

Next, a configuration of the STB 20 is described. As illustrated in FIG. 1, the BD recorder 40a and the media server 60 are connected to the STB 20 as content sources and the DTV/BS antenna 50 for receiving DTV/BS broadcasting is connected to the STB 20 as a content source. Further, as illustrated in FIG. 6, the STB 20 encrypts, for copyright protection, a video signal supplied from each content source. Specifically, the STB 20 encrypts the video signal supplied from the BD recorder 40a according to HDCP. Further, the STB 20 encrypts the video signal supplied from the DTV/BS antenna 50 according to DTCP-IP. Further, the STB 20 decrypts the video signal supplied from the USB-HDD 80 according to unique DRM and encrypts it according to DTCP-IP.

The STB 20 can thus switch an encryption format in accordance with a content source. The following describes a configuration of the STB 20 for this operation.

FIG. 8 is a block diagram illustrating the configuration of the STB 20. The STB 20 has a wireless transmission system which is attached to a part corresponding to a panel output of a general television. The STB 20 outputs a video signal to the monitor 10 through Wi-Fi communication. Specifically, the STB 20 includes a CPU 21, a tuner 22a, a demodulating section 22b, a Multi2 decrypting section 22c, a DEMUX 22d, a USB interface (USB/IF, video input means) 23a, a unique DRM decrypting section 23b, an HDMI receiving section 24a, an HDCP decrypting section 24b, an H.264 encoding section 24c, a wired LAN module 25, a switch (SW) 26, a DRM encrypting section 27, a wireless LAN module 28, and a TS buffer 283. Further, the STB 20 includes a TCP/IP buffer 282 in a memory (not illustrated).

The TCP/IP buffer 282 is a buffer used for transmitting video content to the monitor 10 in accordance with a TCP/IP protocol. The TCP/IP buffer 282 is a buffer in which a SYN packet of video content is preserved for retransmission during a period from transmission of the SYN packet to reception of a corresponding ACK packet. The TS buffer 283 is a buffer in which SPTS of a video signal is buffered.

The tuner 22a, the USB/IF 23a, and the HDMI receiving section 24a are connected to the DTV/BS antenna 50, the USB-HDD 80, and the BD recorder 40a, respectively. The wired LAN module 25 is connected to a local network to which the router 30 and the media server 60 are connected. The wireless LAN module 28 is wirelessly connected to the monitor 10.

A video signal received by the tuner 22a is demodulated by the demodulating section 22b, and is subjected to a DRM decrypting process in the Multi2 decrypting section 22c. Then, MPTS of the video signal is demultiplexed into a plurality of SPTSs by the DEMUX 22d, and the plurality of SPTSs are buffered in the TS buffer 283. The SPTSs in the TS buffer 283 are sequentially supplied to the SW 26 as long as there is a space in the TCP/IP buffer 282.

A video signal received by the USB/IF 23a is subjected to a DRM decrypting process in the unique DRM decrypting section 23b, and is then supplied to the SW 26.

A video signal received by the HDMI receiving section 24a is subjected to a DRM decrypting process in the HDCP decrypting section 24b, compressed by the H.264 encoding section 24c, and then supplied to the SW 26. Note that although the video signal obtained through the decrypting process in the HDCP decrypting section 24b may be supplied to the SW 26 as it is, it is desirable to compress the video signal according to H.264 for example since a transmission rate tends to decline in a wireless section.

The SW 26 includes 4 input terminals IN51 through IN54 and 1 output terminal OUT51. The input terminal IN51 is connected to the DEMUX 22d, the input terminal IN52 is connected to the unique DRM decrypting section 23b, the input terminal IN53 is connected to the H.264 encoding section 24c, and the input terminal IN54 is connected to the wired LAN module 25. The SW 26 selects any one of input signals supplied to the input terminals IN51 through IN54 on the basis of an instruction from the CPU 21, and then outputs the input signal from the output terminal OUT51.

As described above, the wireless LAN module 12a of the monitor 10 transmits, to the STB 20, an instruction signal supplied from the content switching instructing section 11d. This instruction signal is supplied to the CPU 21. Based on the instruction signal, the CPU 21 controls the SW 26 and the DRM encrypting section 27. Thus, the STB 20 encrypts a video signal supplied from a selected content source in a DRM encryption format corresponding to the video signal, and then supplies the video signal to the monitor 10.

For example, in a case where the selected content source is the BD recorder 40a (second mode), the CPU 21 controls the SW 26 so that only a signal supplied from the input terminal IN53 is outputted from the output terminal OUT51. As a result, only the video signal received by the HDMI receiving section 24a is supplied to the DRM encrypting section 27. Similarly, (i) in a case where the selected content source is DTV/BS broadcasting (first mode), the CPU 21 controls the SW 26 so that a signal supplied from the input terminal IN51 is outputted from the output terminal OUT51, (ii) in a case where the selected content source is the USB-HDD 80 (second mode), the CPU 21 controls the SW 26 so that only a signal supplied from the input terminal IN52 is outputted from the output terminal OUT51, and (iii) in a case where the selected content source is the Web 70 (first mode), the CPU 21 controls the SW 26 so that a signal supplied from the input terminal IN54 is outputted from the output terminal OUT51.

The DRM encrypting section 27 subjects a video signal outputted from the SW 26 to DRM encryption according to a content source. As illustrated in FIG. 9, the DRM encrypting section 27 includes two SWs 27a and 27b, a DTCP-IP encrypting section 27c, and an HDCP encrypting section 27d.

The SW 27a includes 1 input terminal IN61 and 3 output terminals OUT61 through OUT63. The SW 27b includes 3 input terminals IN71 through IN73 and 1 output terminal OUT71. Switching between the SWs 27a and 27b is controlled by the CPU 21.

The DTCP-IP encrypting section 27c encrypts a video signal in a DTCP-IP format. The DTCP-IP encrypting section 27c is provided between the output terminal OUT61 of the SW 27a and the input terminal IN71 of the SW 27b. The HDCP encrypting section 27d encrypts a video signal in an HDCP format. The HDCP encrypting section 27d is provided between the output terminal OUT62 of the SW 27a and the input terminal IN72 of the SW 27b. The output terminal OUT63 of the SW 27a and the input terminal IN73 of the SW 27b are directly connected to each other.

The CPU 21 controls the SW 27a and the SW 27b so that a video signal is encrypted in an encryption format corresponding to a selected content source. For example, in a case where the selected content source is DTV/BS broadcasting, the CPU 21 controls the SW 27a and the SW 27b so that the DTCP-IP encrypting section 27c of the DRM encrypting section 27 carries out an encrypting process. That is, the CPU 21 controls the DRM encrypting section 27 so that the SW 27a selects the output terminal OUT61 and the SW 27b selects the input terminal IN71. Similarly, in a case where the selected content source is the BD recorder 40a, the CPU 21 controls the SW 27a and the SW 27b so that the HDCP encrypting section 27d is selected in the DRM encrypting section 27.

Note that in a case where a video signal of a selected content source is received from the wired LAN module 25, the DRM encrypting section 27 does not encrypt the video signal since the video signal is already encrypted. In this case, the CPU 21 controls the DRM encrypting section 27 so that the SW 27a selects the output terminal OUT63 and the SW 27b selects the input terminal IN73.

In this way, a video signal properly encrypted according to a selected content source is transmitted from the wireless LAN module 28 to the monitor 10. Specifically, video signals (video data) having been encrypted are sequentially buffered in the order of the TCP/IP buffer 282 and a send buffer 281 of the wireless LAN module 28, and the video signals (video data) in the send buffer 281 are sequentially transmitted to the monitor 10. Therefore, no buffer overflow occurs in the send buffer 281 and the TCP/IP buffer 282 while video signals are being transmitted to the monitor 10 at certain level of transmission rate, but when the transmission rate greatly declines, buffer overflow occurs in the send buffer 281 and the TCP/IP buffer 282. Especially in a case where the selected content source is DTV/BS broadcasting, buffer overflow occurs also in the TS buffer 283 which is provided at a stage preceding the TCP/IP buffer 282.

The CPU 21 includes a send buffer amount checking section 21a, a radar wave detecting section 21b, a signal intensity measuring section 21c, and a channel switching instructing section 21d.

The send buffer amount checking section 21a checks a data amount of data buffered in the send buffer 281 of the wireless LAN module 28.

The radar wave detecting section 21b operates in a case where a channel used for Wi-Fi communication of the wireless LAN module 28 is a channel of W53 or W56 (i.e., a channel which assigns priority to a public institution). The radar wave detecting section 21b detects radar waves from public institutions, such as a weather radar and a military radar.

The signal intensity measuring section 21c measures RSSI (received signal strength) of Wi-Fi waves emitted by terminals, such as the monitor 10, located around the STB 20.

The channel switching instructing section 21d designates a channel to be used for wireless communication of the wireless LAN module 28.

The overall configuration of the content display system 1 of the present embodiment has been described above. The following describes overall operations of the content display system 1 of the present embodiment with reference to FIGS. 10 through 22.

(Operations of Content Display System)

FIG. 10 is a flow chart showing a procedure by which the monitor 10 starts reception of a video signal.

First, the content selection screen is displayed (S1). Then, when content is selected by a user's operation (S2), the video reception selecting section 11c determines whether the content source thus selected is provided via an access point or provided via the HDMI receiving section 12b (S3).

In a case where the selected content source is provided via the HDMI receiving section 12b (YES in S3), the HDMI receiving section 12b receives a video signal having been HDCP-encrypted from the BD recorder 40b (S20), and then the DRM decrypting section 14 carries out a DRM decrypting process with respect to the video signal thus received (S21). The video signal thus decrypted are subjected to processes in subsequent sections (the video decrypting section 16, the video processing section 18a), and video thus subjected to such processes is displayed on the display 19 (S22).

Meanwhile, in a case where the selected content source is provided via an access point (NO in S3), the video reception selecting section 11c specifies whether the access point used for reception of the video signal supplied from the selected content source is the STB 20 or the router 30 (S4).

In a case where the access point thus specified is the STB 20 (STB in S4), the video reception selecting section 11c causes the wireless LAN module 12a to receive the video signal from the STB 20 and causes the SW 13 to select the input terminal IN1 connected to the wireless LAN module 12a (S5). Further, the wireless LAN module 12a transmits, to the STB 20, an instruction signal for the STB 20 supplied from the content switching instructing section 11d (instruction signal instructing the STB 20 to transmit, to the monitor 10, the video signal supplied from the selected content source) (S6).

In the STB 20 having received the instruction signal, the send buffer amount checking section 21a monitors a buffer amount of the send buffer 281, and the wireless LAN module 28 transmits, to the monitor 10, the video signal supplied from the selected content source (S7).

Thus, the video signal supplied from the selected content source is received via the STB 20 (S8), is subjected to a DRM decrypting process (S9), and is then subjected to a video decrypting process (S10), and finally video is outputted (S11).

Specifically, the wireless LAN module 12a receives the video signal (video data) from the STB 20 and causes the video signal (video data) to be buffered in the receive buffer 120a. Then, one of the decrypting sections in the DRM decrypting section 14, which one corresponds to a DRM encryption format of the video signal (video data), carries out a DRM decrypting process with respect to the video signal. Then, the video decrypting section 16 appropriately demultiplexes the video signal thus obtained through the DRM decrypt process. Next, one of the two decrypting sections 16c and 16d of the video decrypting section 16 subjects the video signal to a decrypting process corresponding to a compression format of the video signal. The video signal thus obtained through the decrypting process is subjected to predetermined video processing in the video processing section 18a, and the panel controller 18b outputs video thus obtained to the display 19.

Then, the receive buffer amount checking section 11f of the CPU 11 determines whether or not the selected content source is an external device (the BD recorder 40a or the USB/HDD 80) connected to the STB (S12). In a case where the selected content source is an external device connected to the STB (YES in S12, second mode), the receive buffer amount checking section 11f starts monitoring occurrence of buffer underrun in the receive buffer 120a (S13). To be specific, the monitoring of occurrence of buffer underrun in the receive buffer 120a is a process of repeatedly checking whether a data amount of video data in the receive buffer 120a is exceeding a predetermined threshold value or not.

Meanwhile, in a case where the specified access point is the router 30 (STB in S4), the video reception selecting section 11c causes the wireless LAN module 12a to receive the video signal supplied from the router 30 and causes the SW 13 to select the input terminal IN1 connected to the wireless LAN module 12a (S14). Further, the wireless LAN module 12a transmits, to the router 30, an instruction signal for the router 30 supplied from the content switching instructing section 11d (instruction signal instructing the router 30 to transmit, to the monitor 10, the video signal supplied from the selected content source) (S15).

Thus, the video signal supplied from the selected content source is received via the router 30 (S16), is subjected to a DRM decrypting process (S17), and is then subjected to a video decrypting process (S18), and finally video is outputted (S19).

The decrypting processes in S9 and S17 are shown in detail in the flow chart of FIG. 11. Specifically, the DRM decrypting section 14 determines which of the selected content sources has been selected (S31). In a case where the selected content source is the Web 70, the DTCP-IP decrypting section 14c carries out a DTCP-IP decrypting process (S32). Meanwhile, in a case where the selected content source is the BD recorder 40a, the HDCP decrypting section 14d carries out an HDCP decrypting process (S34). Meanwhile, in a case where the selected content source is a device other than the Web 70 and the BD recorder 40a, the Marlin decrypting section 14e carries out a Marlin decrypting process (S33).

As described above, the receive buffer amount checking section 11f checks a data amount of video data buffered in the receive buffer 120a while the monitor 10 is wirelessly receiving, from the STB 20, a video signal supplied from an external device connected to the STB 20. The receive buffer amount checking section 11f detects occurrence of buffer underrun in a case where it is determined that the data amount is equal to or below the predetermined threshold value one or more times (predetermined times).

To prevent mistaken detection of occurrence of buffer underrun, the receive buffer amount checking section 11f may detect occurrence of buffer underrun in a case where it is determined that the data amount of the video data buffered in the receive buffer 120a is equal to or below the predetermined threshold value predetermined times (Q≥1) or more per unit time within a certain period of time (e.g., 10 or more times within 1 minute).

The operations of the monitor 10 have been described above. Note, however, that whether an access point to be used is the STB 20 or the router 30 may be specified in S4 as follows. For example, such an arrangement is possible in which the STB 20 is specified as the access point in a case where current setting on the connection destination setting screen illustrated in FIG. 13 and FIG. 14 is "Tuner Section", whereas the router 30 is specified as the access point in a case where current setting on the connection destination setting screen is "Wireless Access Point". Alternatively, such an arrangement is also possible in which the router 30 is specified as the access point in a case where the selected content source is the Web 70, whereas the STB 20 is specified in the other cases (see S4' of the flow chart of FIG. 12). Details of the connection destination setting screen will be described later.

Through the above operations, reception of a video signal is started. In a case where occurrence of buffer underrun is detected in the receive buffer 120a, the CPU 11 of the monitor 10 may execute a predetermined error prevention process that should be executed upon detection of a decline in throughput of wireless communication between the monitor 10 and the STB 20.

One example of the predetermined error prevention process is a process of (i) measuring received signal strength of a radio wave emitted from the STB 20 and (ii) switching a channel used for wireless communication with the STB 20 to another one in a case where the received signal strength is equal to or higher than a predetermined threshold value (i.e., in a case where it is determined that the decline in throughput is caused not by a decline in received signal strength but by radio interference (hereinafter sometimes referred to as "case where radio interference is detected")). The predetermined threshold value can be, for example, one-tenth of a standard level at which a video signal can be sufficiently transmitted (a value lower by 20 dB than the standard level).

The following describes this process with reference to FIGS. 15 through 17. FIG. 15 is a flow chart showing an operation in which the channel switching instructing section 11e of the monitor 10 switches a channel used for wireless communication.

First, the channel switching instructing section 11e determines whether a "CH unchanged" flag is "1" or not (S41). The "CH unchanged" flag is a flag which is set to "1" in a case where an instruction not to change a channel is given by a user upon detection of radio interference, but is set to "0", which is a default value, every time a channel is changed.

In a case where it is determined that the "CH unchanged" flag is "1" (YES in S41), the process is finished without doing anything.

Meanwhile, in a case where it is determined that the "CH unchanged" flag is "0" (YES in S41), the UI screen display section 11a causes a "CH change confirmation" caution UI1 (see (a) of FIG. 16) to be displayed on the display 19 (S42). Then, the channel switching instructing section 11e determines whether a user has selected "YES" or "NO" on the "CH change confirmation" caution UI1 (S43).

In a case where it is determined that the user has selected "NO" (NO in S43), the "CH unchanged" flag is set to "1" (S44), and then the process is finished.

Meanwhile, in a case where it is determined that the user has selected "YES" (YES in S43), the channel switching instructing section 11e supplies, to the wireless LAN module 12a, an instruction command for instructing the STB 20 to execute an all-channel AFS process (see the flow chart of FIG. 17), and the wireless LAN module 12a transmits the instruction command to the STB 20 (S45). Details of the all-channel AFS process will be described later.

Then, the UI screen display section 11a causes a "CH currently being changed" caution UI2 (see (b) of FIG. 16) to be displayed on the display 19 until connection with the STB 20 is established through a new channel by the all-channel AFS process (S46).

Then, the wireless LAN module 12a regularly determines whether connection with the STB 20 has been established through a new channel or not (S47). In a case where it is determined that the connection with the STB 20 has not been established (NO in S47), the wireless LAN module 12a determines whether 2 minutes have elapsed from transmission of the instruction command in S45 or not (S49). In a case where it is determined that 2 minutes have not elapsed (NO in S49), the process in S47 is carried out again. Meanwhile, in a case where it is determined that 2 minutes have elapsed (YES in S49), the UI screen display section 11a causes a "channel connection failed" caution UI3 (see (c) of FIG. 16) to be displayed on the display 19 (S50), and then the process is finished.

Meanwhile, in a case where it is determined that the connection with the STB 20 has been established through the new channel (YES in S47), the "CH currently being changed" caution UI2 (see (b) of FIG. 16) is deleted from the display 19 (S48), and then the process is finished.

The above description has discussed, as an example of the predetermined error prevention process, the process in which the monitor 10 switches a channel used for wireless communication with the STB 20 in a case where radio interference has been detected. According to the present embodiment, the STB 20 also carries out a process for switching a channel used of wireless communication with the monitor 10 in a case where radio interference has been detected.

Specifically, the send buffer amount checking section 21a of the STB 20 carries out an operation for detecting buffer overflow in the send buffer 281 while transmitting, to the monitor 10 through Wi-Fi communication, a video signal received from an outside of the content display system 1 via the DTV/BS antenna 50 over a broadcasting wave (first mode). More specifically, the send buffer amount checking section 21a carries out an operation of repeatedly determining whether a data amount of video data buffered in the send buffer 281 is below a predetermined threshold value or not. The send buffer amount checking section 21a recognizes that buffer overflow has occurred, in a case where it is determined that the data amount is not less than the predetermined threshold value one or more times (predetermined times).

To prevent mistaken detection of occurrence of buffer overflow, the send buffer amount checking section 21a may detect occurrence of buffer overflow in a case where it is determined that the data amount of the video data buffered in the send buffer 281 is equal to or larger than the predetermined threshold value predetermined times (P≥1) or more per unit time within a certain period of time (e.g. 3 or more times within 1 minute).

The signal intensity measuring section 21c regularly measures received signal strength of a carrier wave supplied from the monitor 10.

In a case where the signal intensity measuring section 21c detects received signal strength that is equal to or higher than the threshold value around the same time as detection of buffer overflow by the send buffer amount checking section 21a, the STB 20 recognizes that radio interference has occurred in a channel that is being used, and executes, for example, the process in S92 (later described) (after the process in S92, the monitor 10 executes the processes in S93 through S95) in order to change the channel used for transmission and reception of a video signal. The "around the same time" may be defined to mean that a time interval between the time at which the buffer overflow is detected and the time at which the signal strength equal to or higher than the threshold value is detected is within 1 minute, or may be defined to mean that the time at which the buffer overflow is detected and the time at which the signal strength equal to or higher than the threshold value is detected are identical when counted by minutes, or may be defined otherwise (e.g., defined to mean that a time interval between these two times is within a predetermined range).

As described above, the content display system 1 of the present embodiment can change a Wi-Fi communication channel used for transmission of a video signal from the STB 20 to the monitor 10 not only in a case where the monitor 10 has detected radio interference, but also in a case where the STB 20 has detected radio interference.

Note that it is also possible to employ an arrangement in which any one of the monitor 10 and the STB 20 carries out the process for detecting radio interference and switching a channel.

(Regarding All-Channel AFS Process)

The following describes the all-channel AFS process executed by the STB 20 with reference to FIG. 17. FIG. 17 is a flow chart showing the all-channel AFS process.

As shown in FIG. 17, the channel switching instructing section 21*d* of the STB 20 controls the wireless LAN module 28 to execute AP search (S61). Based on a result of the AP search, the channel switching instructing section 21*d* determines whether successive two channels of W52 (36ch and 40ch or 44ch and 48ch) are available or not (S62).

In a case where it is determined that the successive two channels of W52 are available (YES in S62), the wireless LAN module 28 connects to the monitor 10 in an HT40 mode (equivalent to a dual channel mode and a 40 MHz mode) using the successive two channels of W52 (S63), and then the process is finished.

Meanwhile, in a case where the successive two channels of W52 are not available (NO in S62), the channel switching instructing section 21*d* determines whether or not there is any available channel of W52 (S64).

In a case where it is determined that any successive channels of W52 are available (YES in S62), the wireless LAN module 28 connects to the monitor 10 in an HT20 mode (equivalent to a single channel mode and a 20 MHz mode) using the available channel of W52 (S65), and then the process is finished.

Meanwhile, in a case where it is determined that there is no available channel of W52 (NO in S62), the channel switching instructing section 21*d* determines, based on the result of the AP search, whether successive two channels of W56 (100ch and 104ch, 108ch and 112ch, . . . ) are available or not (S66).

In a case where it is determined that the successive two channels of W56 are not available (NO in S66), the process proceeds to S70.

In a case where it is determined that the successive two channels of W56 are available (YES in S66), the radar wave detecting section 21*b* carries out, for 1 minute, an operation for detecting radar waves having frequencies belonging to the available successive two channels (S67).

In a case where the radar wave detecting section 21*b* detects a radar wave belonging to any of the channels as a result of the operation in S67 (YES in S68), the process proceeds to S70. Meanwhile, in a case where the radar wave detecting section 21*b* detects no radar wave as a result of the operation in S67 (NO in S68), the wireless LAN module 28 connects to the monitor 10 in an HT40 mode using the successive two channels of W56 for which no radar wave was detected (S65), and then the process is finished.

In S70, the channel switching instructing section 21*d* determines, based on the result of the AP search, whether successive two channels of W53 (52ch and 56ch, 60ch and 64ch, . . . ) are available or not.

In a case where it is determined that the successive two channels of W53 are not available (NO in S70), the process proceeds to S74.

In a case where it is determined that the successive two channels of W53 are available (YES in S70), the radar wave detecting section 21*b* carries out, for 1 minute, an operation for detecting radar waves having frequencies belonging to the available successive two channels (S71).

In a case where the radar wave detecting section 21*b* detects a radar wave belonging to any of the channels as a result of the operation in S71 (YES in S72), the process proceeds to S74. Meanwhile, in a case where the radar wave detecting section 21*b* detects no radar wave as a result of the operation in S71 (NO in S72), the wireless LAN module 28 connects to the monitor 10 in an HT40 mode using the successive two channels of W56 for which no radar wave was detected (S73), and then the process is finished.

In S74, the channel switching instructing section 21*d* determines, based on the result of the AP search, whether or not there is any available channel of W56.

In a case where it is determined that there is no available channel of W56 (NO in S74), the process proceeds to S78.

In a case where it is determined that there is an available channel of W56 (YES in S74), the radar wave detecting section 21*b* carries out, for 1 minute, an operation for detecting a radar wave having a frequency belonging to this available channel (S75).

In a case where the radar wave detecting section 21*b* detects a radar wave as a result of the operation in S75 (YES in S76), the process proceeds to S78. Meanwhile, in a case where the radar wave detecting section 21*b* detects no radar wave as a result of the operation in S75 (NO in S76), the wireless LAN module 28 connects to the monitor 10 in an HT20 mode using the channel of W56 for which no radar wave was detected (S77), and then the process is finished.

In S78, the channel switching instructing section 21*d* determines, based on the result of the AP search, whether or not there is any available channel of W53.

In a case where it is determined that there is no available channel of W53 (NO in S78), the process proceeds to S82.

In a case where it is determined that there is an available channel of W53 (YES in S78), the radar wave detecting section 21*b* carries out, for 1 minute, an operation for detecting a radar wave having a frequency belonging to this available channel (S79).

In a case where the radar wave detecting section 21*b* detects a radar wave as a result of the operation in S79 (YES in S80), the process proceeds to S82. Meanwhile, in a case where the radar wave detecting section 21*b* detects no radar wave as a result of the operation in S79 (NO in S80), the wireless LAN module 28 connects to the monitor 10 in an HT20 mode using the channel of W53 for which no radar wave was detected (S81), and then the process is finished.

In S82, the signal intensity measuring section 21*c* measures received signal strength of a carrier wave of each channel of W52, and the wireless LAN module 28 connects to the monitor 10 in an HT20 mode using a channel for which measured received signal strength is minimum. Thus, the all-channel AFS process is finished.

As is clear from the flow chart of FIG. 17, the all-channel AFS is carried out according to an algorism of selecting a newly used channel in the order of W52, W56, and W53 as the order of descending priorities. However, a newly used channel may be selected in the order of W52, W53, and W56 as the order of descending priorities. Alternatively, the order of priorities may be changed depending on a geographical region to which the STB 20 is directed. For example, in a case where the STB 20 is directed to a country (e.g., Japan) or a geographical region in which frequency of use of military radar is assumed to be lower than that of weather radar, the STB 20 may execute the all-channel AFS so that a newly used channel is selected in the order of descending priorities of W52, W56, and W53. Meanwhile, in a case where the STB 20 is directed to a country (e.g., garrison state) or a geographical region in which frequency of use of military radar is assumed to be higher than that of weather radar, the STB 20 may execute the all-channel AFS so that a newly used channel is selected in the order of descending priorities of W52, W53, and W56.

In a case where a radar wave is detected as a result of the operation in S67 (YES in S68), the detection of the radar wave may trigger the STB 20 to carry out the process in S82. Similarly, in a case where a radar wave is detected as a result of the operation in S71 (YES in S72) and in a case where a radar wave is detected as a result of the operation in S75 (YES in S76), the detection of the radar wave may trigger the STB 20 to carry out the process in S82. In such cases, the STB 20 has an advantage of a shorter maximum period of time taken for connection with the monitor 10 as compared with the case where the operation is carried out according to the flow chart of FIG. 17 in which case processing time for detection of a radar wave is 4 minutes at maximum.

(Regarding More Desirable Example of All-Channel AFS Process)

According to the all-channel AFS process shown in FIG. 17, the search for an available channel is conducted in the order of a band with the smallest frequency to a band with the highest frequency, and if no available channel is found, a channel with the smallest RSSI is selected. However, in general, a channel is affected more by interference of adjacent channels than interference of the channel, and the interference is affected more by the number of overlapping interference sources (APs) than RSSI. In view of this, the following describes an arrangement in which the all-channel AFS process is carried out in consideration of interference of adjacent channels, with reference to FIGS. 35 through 37.

FIG. 35 is a block diagram illustrating a configuration of a STB 20' according to a modification of the set-top box. The STB 20' further includes a ranking section 21e in addition to the configuration of the STB 20 illustrated in FIG. 8. The STB 20' carries out an all-channel AFS process so that the ranking section 21e gives each channel a rank indicative of likelihood of occurrence of radio interference and the channel switching instructing section 21d selects a channel on the basis of the ranks.

FIG. 36 is a flow chart showing the all-channel AFS process.

As shown in FIG. 36, a channel switching instructing section 21d of the STB 20 controls a wireless LAN module 28 to execute AP search (S121). Based on a result of this search, the ranking section 21e gives each channel a rank indicative of likelihood of occurrence of radio interference (S122). Details of the ranking by the ranking section 21e will be described later.

Subsequently, the channel switching instructing section 21d searches for a channel (best channel) given the highest rank among the channels of W52 (S123), and then determines whether or not a rank of the best channel of W52 is Rank 3 or higher and is equal to or higher than a rank of a channel currently being used (S124).

In a case where the rank of the best channel of W52 is Rank 3 or higher and is equal to or higher than the rank of the channel currently being used (YES in S124), the wireless LAN module 28 connects to the monitor 10 in an HT20 mode using the best channel of W52 (S125), and then the process is finished.

Meanwhile, in a case where the rank of the best channel of W52 is Rank 4 or lower or in a case where the rank of the best channel of W52 is lower than the channel currently being used (NO in S124), the channel switching instructing section 21d searches for a best channel among the channels of W53 (S126), and then determines whether or not there exists a channel of Rank 1 among the channels of W53 (S127).

In a case where it is determined that there is no channel of Rank 1 among the channels of W53 (NO in S127), the channel switching instructing section 21d searches for a best channel among the channels of W56 (S128). Meanwhile, in a case where it is determined that there is a channel of Rank 1 among the channels of W53 (YES in S127), a radar wave detecting section 21b carries out, for 1 minute, an operation for detecting a radar wave having a frequency belonging to the channel of Rank 1 (S129).

In a case where the radar wave detecting section 21b detects a radar wave belonging to the channel of Rank 1 in W53 as a result of the operation in S129 (YES in S130), the process proceeds to S125. Meanwhile, in a case where the radar wave detecting section 21b detects no radar wave as a result of the operation in S129 (NO in S130), the wireless LAN module 28 connects to the monitor 10 in an HT20 mode using the channel of Rank 1 in W53 for which no radar wave was detected (S131), and then the process is finished. Note that in the case where the radar wave detecting section 21b detects a radar wave in S130, the process may proceed to S128.

In S128, the channel switching instructing section 21d searches for a best channel among the channels of W56. In a case where it is determined that there exists no channel of Rank 1 among the channels of W56 (NO in S132), the wireless LAN module 28 connects to the monitor 10 in an HT20 mode using the best channel of W52 found in S123 (S125), and then the process is finished. Meanwhile, in a case where it is determined that there exists a channel of Rank 1 among the channels of W56 (YES in S132), the radar wave detecting section 21b carries out, for 1 minute, an operation for detecting a radar wave having a frequency belonging to the channel of Rank 1 (S133).

In a case where the radar wave detecting section 21b detects a radar wave belonging to the channel of Rank 1 in W56 as a result of the operation in S133 (YES in S134), the wireless LAN module 28 connects to the monitor 10 in an HT20 mode using the best channel of W52 found in S123 (S125), and then the process is finished. Meanwhile, in a case where the radar wave detecting section 21b detects no radar wave as a result of the operation in S133 (NO in S134), the wireless LAN module 28 connects to the monitor 10 in an HT20 mode using the channel of Rank 1 in W56 for which no radar wave was detected (S135), and then the process is finished.

The following describes details of the ranking of each channel. The ranking section 21e illustrated in FIG. 35 determines a rank indicative of likelihood of occurrence of radio interference as follows. Note that a smaller numeral indicates a higher rank (less likelihood of occurrence of radio interference).

Rank 1: Channel which is available and whose adjacent channels are not being used Rank 2: Channel which is being used by 1 existing AP and whose adjacent channels are not being used Rank 3: Channel which is being used by 1 or less existing AP and whose adjacent channels are being used Rank 4: Channel which is being used by 2 existing APs and whose adjacent channels are being used A rank of a channel whose adjacent channels are being used becomes lower as the number of existing APs using the channel increases.

Note that channels used in an HT40 mode (dual channel mode) are ranked by summing up ranks of these channels. Note also that an end channel (36ch, 64ch, 100ch, 140ch) is ranked by using only an adjacent 1 channel.

FIG. 37 is a table showing an example of the number of existing APs using each channel and ranking of the channel. Since interference of adjacent channels is taken into consideration, even a channel that is being used by 0 existing AP has a low rank if its adjacent channels are being used.

The ranking section 21e thus determines a rank of each channel by preferentially taking interference of adjacent channels into consideration. That is, a channel whose adjacent channels are not being used is given a higher rank than a channel whose adjacent channels are being used. The channel whose adjacent channels are being used is given a higher rank as the number of communication devices using the channel becomes smaller. This allows the channel switching instructing section 21d to easily select a channel which is not influenced by interference of adjacent channels which have the greatest influence. Further, the channel switching instructing section 21d can select a channel that is being used by the smallest number of existing APs even in a case where the channel to be selected has adjacent channels that are being used.

For example, the channel switching instructing section 21d preferentially selects a channel of a highest rank among the channels of W52 (see S124 and S125 in the flow chart of FIG. 36). Thus, a channel of W52 whose adjacent channels are not being used is most preferentially selected, and even in a case where there exists no channel whose adjacent channels are not being used among the channels of W52, a channel that is being used by the smallest number of APs is selected. Since a channel is affected more by interference of adjacent channels than interference of the channel and the interference is affected more by the number of overlapping APs than RSSI, the channel switching instructing section 21d can select a channel with least likelihood of occurrence of radio interference.

The channels of W53 and W56 are not selected unless the other channels are unavailable.

The channel switching instructing section 21d can thus select a channel for Wi-Fi communication which is less likely to suffer from a delay in time and from radio interference.

Further, the channel switching instructing section 21d preferentially selects a channel of W53 or W56 which is not being used and whose adjacent channels are not being used, in a case where a rank of a channel with a highest rank in W52 is lower than that of a channel that is currently being used (see S124 and S126 through S135 of the flow chart of FIG. 36). Similarly, the channel switching instructing section 21d preferentially selects a channel of W53 or W56 which is not being used and whose adjacent channels are not being used, in a case where a rank of a channel with a highest rank in W52 is lower than that of a channel whose adjacent channels are being used and which is being used by 1 or less other AP. This allows the channel switching instructing section 21d to select a channel with less likelihood of occurrence of radio interference as compared with a case where the channel of W52 is selected.

Further, the channel switching instructing section 21d preferentially selects a channel with a highest rank in W52 in a case where there exists no channel which is not being used and whose adjacent channels are not being used among the channels of W53 and W56. That is, according to the all-channel AFS process shown in FIG. 36, a newly used channel is not selected from channels of Rank 2 or lower but is selected only from channels which are available and whose adjacent channels are not being used, out of the channels of S53 and S56 (see S127 and S132). This is because the radar wave detecting section 21b has a risk of mistakenly detecting, as radar waves, a radio wave of AP using a currently-used channel and AP using adjacent channels.

Further, the channel switching instructing section 21d selects a channel of W53 in preference to a channel of W56 in a case where it selects a channel other than the channels of W52. This is because a channel of W53 is lower in possibility of mistaken detection of radar by the radar wave detecting section 21b.

According to the all-channel AFS process shown in FIG. 36, the wireless LAN module 28 connects to the monitor 10 in an HT20 mode using 1 channel. Since the HT20 mode uses the smaller number of channel than an HT40 mode in which two channels are used, it becomes easy to select a channel less influenced by interference of the channel and its adjacent channels. Further, in a case where the STB 20' is relatively far away from the monitor 10, the HT20 mode has an advantage of being less likely to be influenced by interference as compared with the HT40 mode.

The above has described how the monitor 10 and the STB 20 operate in a case where the monitor 10 detects radio interference while receiving a video signal from the STB 20 through Wi-Fi communication.

The following describes, with reference to FIGS. 18 through 20, how the monitor 10 and the STB 20 operate in a case where the STB 20 detects a radar wave while transmitting a video signal to the monitor 10 through Wi-Fi communication. In the following, it is assumed that the STB 20 is communicating with the monitor 10 via Wi-Fi by using a channel of W53 or W56 and is carrying out an operation for detecting a radar wave of the channel.

FIG. 18 is a flow chart showing the above operation. FIG. 19 is a view illustrating cautions displayed by the monitor 10 during the above operation. FIG. 20 illustrates radar wave detection history data which is referred to when a channel is changed upon detection of a radar wave by the STB 20.

First, the radar wave detecting section 21b of the STB 20 detects a radar wave having a frequency belonging to a channel of W53 or W56 which channel is being used for Wi-Fi communication with the monitor 10 (S91).

Next, the channel switching instructing section 21d changes, based on the radar wave detection history data of FIG. 20, the channel which the wireless LAN module 28 uses for Wi-Fi communication with the monitor 10 to another one, and the wireless LAN module 28 starts connecting to the monitor 10 with the use of the channel thus newly selected (S92). The radar wave detection history data of FIG. 20 has, to be specific, a structure in which each channel belonging to W52, W53, or W56 is associated with a radar wave detection flag. A radar wave detection flag "YES" indicates that a radar wave has been detected in a corresponding channel after last resetting of the radar wave detection history data. A radar wave detection flag "NO" indicates that no radar wave has been detected in a corresponding channel after last resetting of the radar wave detection history data. For example, the radar wave detection history data of (a) of FIG. 20 shows that a radar wave has been detected in 52ch but no radar wave has been detected in 56ch after the resetting. Note that (b) of FIG. 20 shows radar wave detection history data that has been reset. The radar wave detection history data is stored in a nonvolatile memory (storage section) such as a FLASH memory (not illustrated) of the STB 20.

The channel changing process in S92 is described below in more detail. The channel switching instructing section 21*d* determines, as a newly used channel, a channel randomly selected from channels associated with the radar wave detection flag "NO" in the radar wave detection history data. The channel switching instructing section 21*d* updates a radar wave detection flag associated with the channel thus determined to "YES". Note that the channel switching instructing section 21*d* resets the radar wave detection history data when all the radar wave detection flags become "YES" or when 30 minutes has elapsed from activation of the STB 20 or last detection of a radar wave (setting of a radar wave detection flag). This is because it is legally permitted to use, after 30 minutes from detection, even a channel in which a radar wave was detected once.

In the channel changing process in S92, in a case where just 1 channel is associated with the radar wave detection flag "NO" in the radar wave detection history data, the channel switching instructing section 21*d* selects this channel as a newly used channel. In this case, the channel switching instructing section 21*d* may reset the radar wave detection history data without updating the radar wave detection flag corresponding to the channel thus selected.

In the monitor 10 which has received, from the STB 20, a request for reconnection using a new channel selected in S92, the UI screen display section 11*a* causes the display 19 to display a "disconnected" caution UI4 indicating that connection using a currently-used channel has been cut (S93).

After S93, the channel switching instructing section 11*e* controls the wireless LAN module 12*a* to continue a reconnection process with the STB 20 with the use of the new channel, and when the connection using the new channel between the monitor 10 and the STB 20 succeeds (YES in S94), the process proceeds to S96. Meanwhile, when the connection fails, the UI screen display section 11*a* causes the display to display a "tuner connection failed" caution UI3 (S95), and then the process is finished.

In S96, the channel switching instructing section 21*d* of the STB 20 notifies, via the wireless LAN module 28, the monitor 10 that the channel has been changed by DFS (dynamic frequency selection). When the wireless LAN module 12*a* of the monitor 10 receives this notification in S97, the UI screen display section 11*a* causes the display 19 to display a "DFS CH changed" caution UI5 (S98), and then the process is finished.

As described above, in a case where the STB 20 detects a radar wave in a currently-used channel, the STB 20 uses, as a new channel, a channel in which no radar wave has been detected recently, by referring to the radar wave detection history data in S92. This reduces a possibility that a radar wave is detected again during use of the new channel, as compared with a case where a new channel is determined utterly randomly. It is therefore possible to reduce a risk of DFS-caused interruption of video communication using the new channel and a risk of occurrence of a situation in which video on the display 19 stops or ceases to be displayed.

Note that, in the process in S92, a newly selected channel may be randomly determined without referring to the radar wave detection history data. Alternatively, the process in S92 may be an all-channel AFS process like the one shown in the flow chart of FIG. 17. Also in such a case where the process in S92 is an all-channel AFS process, it is more likely that a channel of W52 is used as a new channel. It is therefore possible to reduce a risk of DFS-caused interruption of video communication using the new channel and a risk of occurrence of a situation in which video on the display 19 stops or ceases to be displayed.

Alternatively, in the process in S92, a newly selected channel may be randomly selected from among 4 channels of W52 without referring to the radar wave detection history data. In this case there is no risk of DFS-caused interruption of video communication using the new channel and no risk of occurrence of a situation in which a video on the display 19 stops or ceases to be displayed.

As described above, the processes in S92 through S95 may be executed not only in a case where the STB 20 detects a radar wave in a currently-used channel but also in a case where the STB 20 detects radio interference in a currently-used channel.

Meanwhile, on the monitor 10 side, upon request for reconnection from the STB 20 in S92, the UI screen display section 11*a* may cause the display 19 to display a dialog inquiring a user of whether to attempt reconnection with the use of a new channel or not. The dialog may contain information about a maximum time required for the reconnection. The channel switching instructing section 11*e* may control the wireless LAN module 12*a* to continue the reconnection process between the monitor 10 and the STB 20 only in a case where the user gives, via a remote control (not illustrated), an instruction to attempt reconnection with the use of the new channel.

The following describes other operations carried out by the monitor 10 and the STB 20.

(Wi-Fi Connection Operation at Activation of STB 20)

A Wi-Fi connection operation at activation of the STB 20 is described below with reference to FIGS. 21 and 22.

FIG. 21 is a flow chart showing the Wi-Fi connection operation at activation of the STB 20. FIG. 22 is a flow chart showing details of W52-AFS which is one step of the flow chart.

As shown in FIG. 21, first, the channel switching instructing section 21*d* of the STB 20 obtains channel setting data from information stored in the CPU (S101). The channel setting data is data reflecting connection setting determined by a user on the connection setting screen of the monitor 10. The channel setting data contains information indicative of whether a channel used for Wi-Fi communication is automatically selected by the STB 20 (automatic setting) or is selected by the user on the connection setting screen (manual setting).

In a case where the channel setting data obtained in S101 contains information indicative of automatic setting (AUTOMATIC SETTING in S102), the wireless LAN module 28 connects to the monitor 10 through W52-AFS (S103). Meanwhile, in a case where the channel setting data obtained in S101 contains information indicative of manual setting (MANUAL SETTING in S102), the wireless LAN module 28 connects to the monitor 10 with the use of a channel, in the channel setting data, determined by the user on the connection setting screen (S104).

The following describes details of W52-AFS in S103 with reference to FIG. 22.

As shown in FIG. 22, the channel switching instructing section 21*d* of the STB 20 controls the wireless LAN module 28 to execute AP search (S105). Based on a result of the AP search, the channel switching instructing section 21*d* determines whether successive two channel of W52 are available or not (S106).

In a case where it is determined that the successive two channel of W52 are available (YES in S106), the wireless LAN module 28 connects to the monitor 10 in an HT40 mode using the successive two channel of W52 which are available (S109), and then the process is finished.

Meanwhile, in a case where it is determined that the successive two channel of W52 are not available (NO in S106), the channel switching instructing section 21d determines whether or not there is any available channel in W52 (S107).

In a case where it is determined that there are available successive channels in W52 (YES in S107), the wireless LAN module 28 connects to the monitor 10 in an HT20 mode using the available channel of W52 (S110), and then the process is finished.

Meanwhile, in a case where it is determined that there is no available channel in W52 (NO in S107), the signal intensity measuring section 21c measures received signal strength of a carrier wave of each channel of W52, and the wireless LAN module 28 connects to the monitor 10 in an HT20 mode using a channel for which measured received signal strength is minimum (S108), and then the process is finished.

(Wi-Fi Connection Operation in Case Where User Determines Channel on Connection Setting Screen of Monitor 10)

The following describes, with reference to FIG. 23, an operation in which the monitor 10 reconnects to the STB 20 through Wi-Fi communication in a case where a channel is determined.

FIG. 23 is a flow chart showing this operation.

As shown in FIG. 23, first, the channel switching instructing section 11e supplies, to the wireless LAN module 12a, an instruction command instructing reconnection with the monitor 10 with the use of a channel determined on the connection setting screen, and then the wireless LAN module 12a transmits the instruction command to the STB 20 (S111).

Next, the UI screen display section 11a of the monitor 10 causes the display 19 to display the "CH currently being changed" caution UI2 (S112), and then the process proceeds to S113.

In S113, the channel switching instructing section 11e determines whether or not the STB 20 has reconnected to the monitor 10 through the channel determined on the connection setting screen. In a case where it is determined that the reconnection has not been established (NO in S113), the channel switching instructing section 11e determines whether or not 2 minutes have elapsed from transmission of the instruction command in S111 (S115). In a case where it is determined that 2 minutes have not elapsed (NO in S115), the process returns to S113. Meanwhile, in a case where it is determined that 2 minutes have elapsed (YES in S115), the UI screen display section 11a causes the display 19 to display the "tuner connection failed" caution UI3 (S116), and then the process is finished.

Meanwhile, in a case where it is determined in S113 that the reconnection has been established (YES in S113), the UI screen display section 11a causes the display 19 to display a connection completion screen (not illustrated) (S114), and then the process is finished.

The above has described various operations of the monitor 10 and the STB 20. The following describes various screens displayed on the display of the monitor 10.

(Connection Destination Setting Screen Displayed by UI Screen Display Section 11a)

When a user selects a connection destination setting menu with the use of an operating section (not illustrated), the UI screen display section 11a causes the display 19 to display a connection destination setting screen like the one illustrated in FIG. 13 or FIG. 14.

FIG. 13 illustrates connection destination setting screens to be sequentially displayed in accordance with user's operations in a case where the monitor 10 is currently connected to the STB 20. FIG. 14 illustrates connection destination setting screens to be sequentially displayed in accordance with user's operations in a case where the monitor 10 is currently connected to the router 30.

As shown in FIG. 13, when a user selects the connection destination setting menu while the monitor 10 is currently connected to the STB 20, the UI screen display section 11a displays a connection destination setting screen SC11. In a case where the user selects an item "Tuner Section" with the use of a move button and an enter button of a remote control (not illustrated) in this state, the UI screen display section 11a displays a connection destination setting screen SC13 indicating that the monitor 10 is currently connected to a tuner section. When the user presses the enter button in this state, the UI screen display section 11a displays the connection destination setting screen SC11 again.

In a case where the user selects an item "Wireless Access Point" in a state in which the connection destination setting screen SC11 is being displayed, the UI screen display section 11a displays a connection destination setting screen SC12 for selecting a method for registering access point information.

In a case where the user select an item "WPS" in a state in which the connection destination setting screen SC12 is being displayed, access point information of a WPS-supported access point to be connected whose push button has been pressed at the substantially same time is automatically obtained, and connection with the access point to be connected is started with the use of the access point information thus obtained. The UI screen display section 11a displays a connection destination setting screen SC14 in a case where the connection has succeeded, whereas the UI screen display section 11a displays a connection destination setting screen SC15 in a case where the connection has failed.

Also in a case where the user selects an item "Select Access Point" or an item "Register Access Point" in a state where the connection destination setting screen SC12 is being displayed, the UI screen display section 11a displays the connection destination setting screen SC14 or the connection destination setting screen SC15 depending on whether connection has succeeded or not, after displaying an access point information input screen (not illustrated).

Meanwhile, as shown in FIG. 14, when a user selects the connection destination setting menu while the monitor 10 is currently connected to the router 30, the UI screen display section 11a displays a connection destination setting screen SC16. In a case where the user selects an item "Tuner Section" in this state, the UI screen display section 11a displays a connection destination setting screen SC17 indicating that a connection destination is to be changed to the tuner section. When the user presses the enter button in this state, the UI screen display section 11a displays the connection destination setting screen SC11 of FIG. 13.

In a case where the user selects an item "Wireless Access Point" in a state in which the connection destination setting screen SC11 is being displayed, the UI screen display section 11a displays a connection destination setting screen SC18 for causing the user to determine whether to change an access point to be connected or not. In a case where the user selects an item "NO" with the use of the movement button in this state, the UI screen display section 11a displays the connection destination setting screen SC16 again.

Meanwhile, in a case where the user selects an item "YES" in a state in which the connection destination setting screen SC18 is being displayed, the UI screen display section 11a displays the connection destination setting screen SC 12.

Then when the user selects any one of the three items in a state in which the connection destination setting screen SC12 is being displayed, the monitor 10 starts connection with an access point thus selected as a connection destination, with the use of obtained access point information. The UI screen display section 11a displays a connection destination setting screen SC20 in a case where the connection has succeeded, whereas the UI screen display section 11a displays a connection destination setting screen SC19 in a case where the connection has failed.

(Connection State Confirmation Screen Displayed by UI Screen Display Section 11a)

When a user selects a connection state confirmation menu with the use of the operating section (not illustrated), the UI screen display section 11a causes the display 19 to display a connection state confirmation screen, like the one illustrated in FIG. 24, showing a current connection state with the STB 20.

Specifically, in a case where the monitor 10 is wirelessly connected to the STB 20, the UI screen display section 11a displays a radio wave strength icon corresponding to received signal strength of a carrier wave supplied from the STB 20, a band mode (a 40 MHz mode or a 20 MHz mode), and a channel used for the wireless connection (see, for example, a connection state confirmation screen SC21 of (a) of FIG. 24 and a connection state confirmation screen SC21 of (b) of FIG. 24).

Meanwhile, in a case where the monitor 10 is not wirelessly connected to the STB 20, the UI screen display section 11a displays information indicating that the monitor 10 is not wirelessly connected to the STB 20 (see, for example, a connection state confirmation screen SC23 of (c) of FIG. 24).

(Connection Setting Screen Displayed by UI Screen Display Section 11a)

When a user selects a connection setting menu with the use of the remote control (not illustrated), the UI screen display section 11a causes the display 19 to display a connection setting screen for causing the user to select automatic setting or manual setting.

The following describes, with reference to FIG. 25, connection setting screens which are sequentially displayed in a case where a user selects automatic setting as connection setting.

When a user selects the connection setting menu, the UI screen display section 11a displays a connection setting screen SC24. In a case where the user select an item "Automatic" with the use of the enter button in this state, the UI screen display section 11a displays a connection setting screen SC25 for causing the user to determine whether channel automatic setting is carried out or not.

In a case where the user selects an item "YES" in a state in which the connection setting screen SC25 is being displayed, the STB 20 starts reconnection with the monitor 10 with the use of a band mode and a channel that are automatically selected. The UI screen display section 11a displays a connection setting screen SC26 until the reconnection succeeds or 2 minutes elapse.

In a case where 2 minutes elapse and the reconnection fails, the UI screen display section 11a displays a connection setting screen SC28. When the user presses the "enter" button, the UI screen display section 11a displays the connection setting screen SC24 again.

Meanwhile, in case where the reconnection succeeds, the UI screen display section 11a displays a connection setting screen SC27 showing completion of the connection, band mode and channel being used. When the user presses the "Enter" button, the UI screen display section 11a displays the connection setting screen SC24 again.

The following describes, with reference to FIG. 26, connection setting screens which are sequentially displayed in a case where a user selects successive two channels by manual setting as connection setting.

When a user selects the connection setting menu, the UI screen display section 11a displays a connection setting screen SC29. In a case where the user selects an item "Manual" with the use of the enter button in this state, the UI screen display section 11a displays a connection setting screen SC30 for causing the user to select a 40 MHz mode or a 20 MHz mode as a band mode.

In a case where the user selects an item "40 MHz" in a state in which the connection setting screen SC30 is being displayed, the UI screen display section 11a displays a connection setting screen SC31 for causing the user to select two channels to be used.

When the user selects an item "36ch and 40ch" or "44ch and 48ch" in a state in which the connection setting screen SC31 is being displayed, reconnection with the monitor 10 is started in the 40 MHz mode, which is selected by the user, with the use of the two channels selected by the user. The UI screen display section 11a displays the connection setting screen SC26 until the reconnection succeeds or 2 minutes elapse.

In a case where 2 minutes elapse and the reconnection fails, the UI screen display section 11a displays the connection setting screen SC28. Meanwhile, in a case where the reconnection succeeds, the UI screen display section 11a displays a connection setting screen SC34 showing completion of the connection, band mode and channel being used. When the user presses the "Enter" button, the UI screen display section 11a displays the connection setting screen SC29 again.

Finally, the following describes, with reference to FIG. 27, connection setting screens which are sequentially displayed in a case where a user selects 1 channel by manual setting as connection setting.

When a user selects the connection setting menu, the UI screen display section 11a displays the connection setting screen SC29. In a case where the user selects an item "Manual" with the use of the enter button in this state, the UI screen display section 11a displays a connection setting screen SC33 for causing the user to select a 40 MHz mode or a 20 MHz mode as a band mode.

In a case where the user selects an item "20 MHz" in a state in which the connection setting screen SC33 is being displayed, the UI screen display section 11a displays a connection setting screen SC34 for causing the user to select 1 channel to be used.

When the user selects any one of items "36ch", "40ch", "44ch", and "48ch" in a state in which the connection setting screen SC34 is being displayed, reconnection with the monitor 10 is started in the 20 MHz mode selected by the user with the use of the channel selected by the user. The UI screen display section 11a displays the connection setting screen SC26 until the reconnection succeeds or 2 minutes elapse.

In a case where 2 minutes elapse and the reconnection fails, the UI screen display section 11a displays the connection setting screen SC28. Meanwhile, in a case where the reconnection succeeds, the UI screen display section 11a displays a connection setting screen SC36 showing completion of the connection, band mode and channel being used. When the user presses the "Enter" button, the UI screen display section 11a displays the connection setting screen SC29 again.

Note that in a case where a user selects the connection setting menu in a state in which the monitor 10 is not wirelessly connected to the STB 20, the UI screen display section 11*a* displays a connection setting screen SC37 (see FIG. 28) notifying the user that connection setting is currently unavailable.

(Link Setting Screen Displayed by UI Screen Display Section 11*a*)

As described above, a user can connect the monitor 10 to the STB 20 by (i) determining, on the connection destination setting screen, the STB 20 as a wireless connection destination of the monitor 10 and (ii) determining, on the connection setting screen, a band mode and a channel that are used for the wireless connection between the monitor 10 and the STB 20.

However, operations of the connection destination setting screen and the connection setting screen are complicated for beginners. In view of this, the monitor 10 has a link setting menu for easily establishing wireless connection with the STB 20. Note that this wireless connection is established by using WPS.

The following describes, with reference to FIG. 29, messages which are sequentially displayed in a case where a user selects the link setting menu.

When a user selects the link setting menu, the UI screen display section 11*a* causes the display 19 to display a dialog UI6 which prompts the user to turn on the STB 20. When the user presses the enter button in this state, the UI screen display section 11*a* displays a message UI7 which prompts the user to press a LINK button (not illustrated) of the STB 20 until a power lamp (not illustrated) blinks (i.e., until the STB 20 shifts to a LINK mode), and then displays a message UI8 notifying the user that connection is being attempted.

In a case where the connection succeeds, the UI screen display section 11*a* displays a dialog UI9 notifying the user of completion of the wireless connection, and then the link setting process is finished.

Meanwhile, in a case where the connection fails, the UI screen display section 11*a* displays a dialog notifying the user of failure of the wireless connection. Specifically, the UI screen display section 11*a* displays a dialog with a message which varies depending on a cause of the failure of the wireless connection.

For example, in a case where power of the STB 20 is off, a case where the STB 20 has not shifted to the LINK mode, or a case where 2 minutes have elapsed from start of connection, the UI screen display section 11*a* displays a dialog UI10.

Meanwhile, in a case where radio waves have weakened during the wireless connection (e.g., a case where received signal strength has declined, a case where radio interference has been detected), the UI screen display section 11*a* displays a dialog UI11. Meanwhile, in a case where the monitor 10 has detected 2 or more WPS-supported access points in which WPS connection is under way, the UI screen display section 11*a* displays a dialog UI12.

When the user presses the enter button after the dialog notifying the user of failure of wireless connection is displayed, the UI screen display section 11*a* displays the dialog UI6 again.

(Regarding Radio Wave Strength Icon)

As illustrated in (a) of FIG. 30, the UI screen display section 11*a* displays, on an upper right corner of the display 19, a radio wave strength icon indicative of received signal strength of a radio wave supplied from an access point that is being connected, while video of television broadcasting or a calendar screen is being displayed on the display 19. Note that whether the radio wave strength icon is displayed or not can be determined by a user through a setting menu (not illustrated). Note, however, that the radio wave strength icon is always displayed irrespective of setting of the setting menu while a specific screen such as the content selection screen SC1 or the connection setting screen is being displayed on the display.

In the monitor 10, 6 signal strength levels 0 through 5 are defined depending on the received signal strength. In a case where the signal strength level is 1 or higher, the UI screen display section 11*a* displays the radio wave strength icon showing the same number of antenna-like objects as the signal strength level. Note that a relationship between the received signal strength and the radio wave strength icon is schematically illustrated by the graph in FIG. 18.

As is clear from FIG. 18, in the monitor 10, received signal strength of not less than −50 dB is defined as a signal strength level 5, received signal strength of not less than −60 dB but not more than −50 dB is defined as a signal strength level 4, and received signal strength of not less than −70 dB but not more than −60 dB is defined as a signal strength level 3.

Further, in the monitor 10, received signal strength of not less than −80 dB but not more than −70 dB is defined as a signal strength level 2, received signal strength of less than −80 dB is defined as a signal strength level 1, and a case where no signal is received is defined as a signal strength level 0.

(Advantages of Content Display System 1)

As described above, the content display system 1 (output system) of the present embodiment is arranged such that (i) the STB 20 (transmitting device), in the first mode, receives video content from an outside (e.g., the Web 70) of the content display system and wirelessly transmit the video content to the monitor 10, and, in the second mode, wirelessly transmits, to the monitor 10, video content stored in a recording medium such as a BD loaded into the BD recorder 40*a* or the USB/HDD 80, and (ii) the monitor 10 receives the content and displays video of the content.

The STB 20 includes the send buffer 281 in which video data, which are part of video content, are sequentially buffered, the wireless LAN module 28 (transmitting means) which transmits the data stored in the send buffer 281 to the monitor 10, and the send buffer amount checking section 21*a* which repeatedly determines whether or not the send buffer 281 is in an overflow state during buffering into the send buffer 281. In a case where it is determined that the send buffer 281 is in an overflow state predetermined times or more in the first mode, the wireless LAN module 28 (notifying means) gives notification (predetermined notification) of a request for reconnection with the monitor 10 with the use of a new channel.

The monitor 10 includes the receive buffer 120*a* in which received video data, which are part of video content, are sequentially buffered, the display 19 (output section) on which video represented by the video data stored in the receive buffer 120*a* is displayed, the receive buffer amount checking section 11*f* (determining means) which repeatedly determines whether or not buffer underrun has occurred in the receive buffer 120*a* during buffering into the receive buffer 120*a*, and the channel switching instructing section 11*e* (first executing means) which controls the wireless LAN module 12*a* to continue a reconnection process with the STB 20 which has responded to the request for reconnection (executes a predetermined error prevention process according to the notification). In a case where the receive buffer amount checking section 11*f* determines that buffer underrun has occurred predetermined times or more in the second mode, the channel switching instructing section 11*e* (second executing means) supplies, to the wireless LAN module 12*a*, an instruction command for causing the STB 20 to establish reconnection with the monitor 10 with the use of a new channel (executes the predetermined error prevention process).

According to the arrangement, the content display system of the present embodiment, in the first mode, the STB 20 notifies the monitor 10 of a request for reconnection with the monitor 10 with the use of a new channel in a case where it is determined that buffer overflow has occurred predetermined times or more, but the monitor 10 does not supply, to the wireless LAN module 12*a*, an instruction command for causing the STB 20 to establish reconnection with the monitor 10 with the use of a new channel even in a case where it is determined that buffer underrun has occurred predetermined times or more.

That is, according to the content display system 1 of the present embodiment, it is possible to prevent the monitor 10 from mistakenly recognizing that throughput in wireless transmission is insufficient and instructing the STB 20 to reconnect with the monitor 10 with the use of a new channel, in a case where supply of content to the STB 20 from a television station is stopped, for example, due to off-the-air.

Meanwhile, according to the content display system 1 of the present embodiment, in the second mode, the monitor 10 instructs the STB 20 to reconnect to the monitor 10 with the use of a new channel, in a case where buffer underrun occurs in the receive buffer 120*a* due to shortage of throughput while the STB 20 is transmitting, to the monitor 10, the content stored in the BD loaded into the BD recorder 40*a* or the USB/HDD80. Since the monitor 10 detects the shortage of throughput by itself, the monitor 10 can quickly instruct the STB 20 to attempt reconnection which should be executed in response to occurrence of shortage of throughput.

As described above, the content display system 1 of the present embodiment produces the following effect: the monitor 10 can quickly carry out a process for accurately detecting shortage of throughput in wireless transmission of video content and switching a channel used for the wireless transmission of the video content.

(Other System Configuration of Content Display System)

The output system of the present invention is not limited to the content display system 1 of FIG. 1. For example, the output system of the present invention may be realized as any of content display systems 1*a* through 1*d* illustrated in FIGS. 31 through 34.

That is, as in the content display system 1*b* of FIG. 31, a handheld gaming device 10*f*, a PDA 10*e*, a tablet terminal 10*d*, or the like may be used as an output device including the means. Further, as in the content display system 1*b*, a plurality of output devices (monitors 10*a* through 10*c*, the handheld gaming device 10*f*, the PDA 10*e*, and the tablet terminal 10*d* in FIG. 31) may be provided in the output system.

Further, as in the content display system 1*c* of FIG. 32, a stationary main TV 20*a* may be used as the transmitting device instead of the STB 20, and the sub-monitor 10*g* may be used as the output device.

Alternatively, as in the content display system 1*d* of FIG. 33, a smartphone 10*h* may be used as the output device. Not only wireless connection is established between the smartphone 10*h* and the STB 20 (wireless R1) and between the smartphone 10*h* and the router 30 (wireless R2), but also wireless connection may be established between the STB 20 and the router 30 (wireless R3).

As in the content display system 1*a* of FIG. 34, the router 30 including the CPU 21 and the send buffer 281 may be used as the transmitting device, and the monitor 10 may be used as the output device. The content display system 1*a* can solve problems 1 through 3 later described by using the CPU 21 as a CPU of the router 30 and using the wireless LAN module 28 as a wireless LAN module of the router 30 and by configuring the router 30 to support 5 GHz-band Wi-Fi communication.

(Additional Matter 1)

In the content display system of the present embodiment, the monitor 10 is used as an output device including each of the means. However, in the present invention, an audio instrument (not illustrated) may be used as the output device instead of the monitor 10. That is, the present invention may be realized as an audio content output system in which the audio instrument outputs audio from a speaker (not illustrated) on the basis of an audio signal wirelessly transmitted from the STB 20.

Shortage of throughput is likely to occur when wirelessly transmitting, from the STB 20 to the audio instrument, audio data which (i) is not compressed, (ii) has a large bit rate and a large sampling frequency, and (iii) requires a considerable network bandwidth. However, according to the audio content output system, the shortage of the throughput can be accurately detected, and the audio instrument can quickly execute a process which should be executed in response to occurrence of the shortage of the throughput.

(Additional Matter 2)

In the above embodiment, two access points, i.e., a STB and a router, are provided. However, the number of access points is not limited to two, and can be three or more. Further, the number of content sources connected to each access point is not limited to the disclosure of the above embodiment.

(Additional Matter 3)

The STB 20 itself may be a content source. That is, the STB 20 may include a storage medium in which content is stored, and the monitor 10 may display, on the content selection screen, an icon for watching recorded video recorded in the STB 20. In a case where this icon is selected, the STB 20 may wirelessly transmit, to the monitor 10, video content read out from the storage medium provided therein. Alternatively, the STB 20 may include, instead of the storage medium provided therein, a slot into which an external medium is loaded. In a case where this icon is selected, the STB 20 may wirelessly transmit, to the monitor 10, video content read out from the external medium loaded into the slot.

(Additional Matter 4)

According to the content display system 1, in the first mode, the STB 20 notifies the monitor 10 of a request for reconnection with the monitor 10 with the use of a new channel in a case where it is determined that buffer overflow has occurred predetermined times or more. However, also in the second mode (mode in which a content source is the STB 20 itself or an external device (e.g., USB-HDD) connected to the STB 20), a similar notification may be issued. Further, according to the content display system 1, in the first mode, the monitor 10 may supply, to the wireless LAN module 12*a*, an instruction command for instructing the STB 20 to reconnect with the monitor 10 with the use of a new channel, also in a case where it is determined that buffer underrun has occurred predetermined times or more. According to the content display system 1, even in such a case, shortage of throughput in wireless transmission can be detected without a decline in detection accuracy even in a case where content contains much noise, and the monitor 10 can quickly execute a process which should be executed in response to the shortage of throughput.

(Additional Matter 5)

In the above embodiment, both of the monitor 10 and the STB 20 can execute an operation for switching a channel used for wireless communication upon detection of radio interference (the STB 20 executes an AFS process, and the monitor 10 instructs the STB 20 to execute the AFS process) irrespective of a content source. However, the present invention is not limited to this.

That is, it is possible to employ an arrangement in which any one of the monitor 10 and the STB 20 can execute the above operation depending on a content source. For example, not the monitor 10 but the STB 20 may execute the above operation by monitoring occurrence of buffer overflow in the send buffer 281 in a case where a content source is DTV/BS broadcasting (that is, while the STB 20 is transmitting a terrestrial digital broadcasting, BS broadcasting, or CS broadcasting video signal to the monitor 10) (see Table below).

TABLE 1

| Content source | AFS upon detection of radio interference | Criterion for judgment of decline of transmission throughput |
| --- | --- | --- |
| DTV/BS broadcasting | Active | Buffer overflow of send buffer 281 |
| USB-HDD 80 | Active | Buffer underrun of receive buffer 120a |
| Media server 60 | Active (during video reproduction) Inactive (during music reproduction) | Buffer underrun of receive buffer 120a (during video reproduction) |
| Web 70 | Inactive | — |
| BD recorders 40a and 40b | Inactive | — |

In a case where reception sensitivity of the DTV/BS antenna 50 declines or in a case where an antenna cable connecting the DTV/BS antenna 50 and the STB 20 comes off, a data stream stops. This can be a cause of buffer underrun in the receive buffer 120a. According to the above arrangement, it is possible to avoid a problem that the monitor 10 mistakenly detects a decline in transmission throughput, in a case where buffer underrun occurs because of the above cause.

In a case where the content source is the media server 60, not the STB 20 but the monitor 10 may execute, only in a case where a video signal supplied from the media server 60 is being transmitted to the monitor 10, the above operation by monitoring occurrence of buffer underrun in the receive buffer 120c (see Table above). Further, it is also possible to employ an arrangement in which neither the monitor 10 nor the STB 20 execute the above operation, for example, in a case where the content source is the Web 70 (that is, while the STB 29 is transmitting a video on demand or IPTV video signal to the monitor 10) or in a case where the content source is the media server 60 and where not a video signal but an audio signal is being transmitted to the monitor 10.

(Additional Matter 6)

In the above embodiment, the send buffer amount checking section 21a recognizes buffer overflow by checking a data amount of data buffered in the send buffer 281 of the wireless LAN module 28. However, the send buffer amount checking section 21a may recognize buffer overflow by checking a data amount of data in the TCP/IP buffer 282.

Alternatively, in a case where the content source is DTV/BS broadcasting, the send buffer amount checking section 21a may recognize buffer overflow by checking a data amount of data in the TS buffer 283. That is, in a case where the content is being transmitted from another device or system to an output device such as the monitor 10, the send buffer amount checking section 21a may recognize buffer overflow by checking a data amount of data in a receive buffer, such as the TS buffer 283, used for reception of the content from the another device or system.

Note that the send buffer amount checking section 21a may recognize buffer overflow by concurrently checking data amounts in any two or more buffers out of the send buffer 281, the TCP/IP buffer 282, and the TS buffer 283.

(Additional Remark 7)

Note that it is also possible to employ an arrangement in which the STB 20 does not include the signal intensity measuring section 21c. In this case, in the STB 20, the send buffer amount checking section 21a may notify, in a case where buffer overflow is recognized, the monitor 10 of occurrence of the buffer overflow. Then, in the monitor 10 which has received the notification, the signal intensity measuring section 11g may measure an RSSI value of a carrier wave emitted from the STB 20 and transmit the RSSI value thus obtained to the STB 20.

Then, the STB 20 may transmit a request for reconnection to the monitor 10 in a case where the RSSI value received from the monitor 10 is equal to or lower than a predetermined threshold value and where the send buffer amount checking section 21a recognizes buffer overflow predetermined times within a predetermined period of time.

(Program etc.)

The monitor 10 and the STB 20 of the present embodiment may be realized by way of hardware or at least one function of the monitor 10 and the STB 20 may be realized by way of software as executed by a CPU as follows:

The monitor 10 and the STB 20 each include a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the monitor 10 and the STB 20 a computer-readable storage medium containing control program code (executable program, intermediate code program, or source program) for the monitor 10 and the STB 20, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy™ disk or a hard disk, or an optical disk, such as CD-ROM/CD-R/MO/MD/BD/DVD; a card, such as an IC card (memory card) or an optical card; or a semiconductor memory, such as a mask ROM/EPROM/EEPROM/flash ROM.

The monitor 10 and the STB 20 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which the program code is embodied electronically.

[Other Problems Solved by the Invention]

The following describes other problems solved by the display system of the present embodiment.

There are various wireless LAN standards such as IEEE802.11a/b/g/n. Of these wireless LAN standards, IEEE802.11a is a standard for communication using a channel of any of bands W52, W53, and W56.

Specifically, W53 is a 5.25 GHz to 5.35 GHz band made up of 4 channels in total, i.e., 52ch, 56ch, 60ch, and 64ch, and includes frequencies of radar waves emitted by weather radar. W56 is a 5.47 GHz to 5.725 GHz band made up of 11 channels in total, i.e., 100ch, 104ch, 108ch, 112ch, 116ch, 120ch, 124ch, 128ch, 132ch, 136ch, and 140ch, and includes frequencies of radar waves emitted by military radar.

Therefore, wireless LAN devices for Wi-Fi communication using the W53 or W56 band are legally obliged to carry out, for 1 minute, an operation of checking whether or not a radar wave having a frequency which interferes with a channel of the band is emitted from a radar before starting communication using the channel. Moreover, such wireless LAN devices are legally obliged to change, upon detection of the radar wave during communication using the channel of the band, the channel used for communication to another channel which does not interfere with the radar wave by DFS (dynamic frequency selection).

Meanwhile, W52 is a 5.15 GHz to 5.25 GHz band made up of 4 channels in total, i.e., 36ch, 40ch, 44ch, and 48ch, and radar waves using this band are not ones emitted from a radar. Therefore, wireless LAN devices are not legally obliged to carry out the above operation in a case where communication is established with the use of the W52 band.

[Problem 1]

However, even in a case where a wireless LAN device establishes Wi-Fi communication with the use of a channel of W52, radio interference occurs in a case where another wireless LAN device which establishes another Wi-Fi communication with the use of the same channel is present around the wireless LAN device.

In a case where radio interference occurs, throughput of Wi-Fi communication is likely to decline. Accordingly, general wireless LAN devices are designed to automatically change, upon detection of the radio interference, a channel used for Wi-Fi communication. Further, some devices (e.g., the terminal device described in Japanese Patent Application Publication, Tokukai, No. 2011-19195 (Publication date: Jan. 27, 2011), automatically changes, upon detection of radio interference, an access point (AP) used for Wi-Fi communication to another one whose interference level is minimum out of all APs in a system.

However, according to the conventional arrangements, a channel or an AP used for Wi-Fi communication is automatically changed even in situations which do not require such a change. This results in a problem that a temporal interruption of communication is unnecessarily caused by such a change.

Note that examples of the situations which do not require the change include the following examples 1 and 2:

Example 1 case where reproduction of streaming video content which is being received through Wi-Fi communication in a television is almost finished (there is no need to change a channel since a remaining reproduction time is short and it is unlikely that a reproduction trouble occurs due to a decline in throughput by the time when the reproduction is finished)

Example 2 case where another wireless LAN device causing radio interference has been identified by a user (there is no need to change a channel since radio interference can be got rid of if the user can stop Wi-Fi communication of such another wireless LAN device)

The monitor (more generally, display device) of the present embodiment is accomplished in view of the above problem, and an object of the monitor of the present embodiment is to display a video without causing a problem that unnecessary change of a channel temporarily interrupts communication and thereby temporarily hinders display of a video.

In order to attain the above object, a display device is arranged to include: a display section on which a video of video content wirelessly transmitted from a transmitting device is displayed; switching means for switching a channel used for the wireless communication; radio interference detecting means for detecting occurrence of radio interference in the channel which is being used for the wireless communication; instruction accepting means for accepting, from a user, an instruction as to whether or not the channel used for the wireless communication should be switched by the switching means, in a case where the radio interference detecting means detects radio interference during display of the video; and display control means for causing the display section to display a UI (user interface) for accepting the instruction from the user, the UI containing information on a period of time from the time when the instruction accepting means accepts the instruction to the time when transmission of the video content is started again.

According to the arrangement, the display device allows the user to determine whether the channel used for transmission of the video content is switched to another one or not, in a case where radio interference is detected during display of the video. For example, in a case where the user is going to finish watching the video shortly afterward and where the display device detects radio interference and displays a UI informing the user that it takes 1 minute to restart transmission of video content with the use of a different channel, the user can choose not to switch the channel used for transmission of the video content. In this case, since the channel is not switched, a temporal interruption of communication caused by switching of the channel does not occur as a natural consequence. Further, since a transmission amount necessary for the display device to display a remaining small part of the video without any problems is not so large, it is highly likely that the remaining small part of the video can be displayed without any problems even in a case where throughput declines due to the radio interference.

Meanwhile, according to a display device having a different arrangement from the above arrangement, in which a channel used for transmission of video content is automatically switched upon detection of radio interference, temporal interruption of communication is unnecessarily caused by switching of the channel upon detection of radio interference in a case where a user is going to finish watching the video shortly afterward.

According to the above arrangement, the display device can thus prevent temporal interruption of communication from being unnecessarily caused by switching of a channel used for wireless communication.

Note that the display device is desirably arranged such that the display control means causes a message notifying the user that the channel is currently being switched with another one to be displayed during a period of time from start of the channel switching process carried out by the switching means to end of the channel switching process.

According to the arrangement, it is possible to produce the following effect: in a case where the display device temporarily ceases to display a video until restart of transmission of video content, a user who has a certain level of knowledge about wireless communication can understand that the video is not being displayed not because of malfunction of the display device but because of switching of a channel.

In the above case, viewers whose have no knowledge about wireless communication sometimes call a support center of a maker of the display device, thinking that the display device may have been broken. In such a case, according to the above arrangement, a person in charge of the support center can easily judge whether the video is not being displayed temporarily because of channel switching or another cause, by checking with the viewers about whether or not the "message notifying the user that the channel is currently being switched with another one".

It is desirable that a display system of the present invention is a display system including the display device and the transmitting device, in which the transmitting device includes:

determining means for determining, in a case where the channel that is being used is a channel which assign high priority to a public institution, whether or not a public institution is emitting a radio wave of the channel; and a notifying means for notifying the display device that the channel is to be switched, in a case where the determining means determines that the public institution is emitting the radio wave of the channel, the switching means is configured to switch the channel in response to the notification from the notifying means, and in a case where the switching means switch the channel in response to the notification, the display control means causes the display section to display a predetermined message after completion of the switching. The predetermined message is not limited in particular, provided that it notifies the user that the channel has been switched upon detection of a radio wave emitted from the public institution.

According to the arrangement, it is possible to produce the following further effect: even in a case where a channel is forcibly switched, for example, by DFS and display of a video is stopped without notice, a viewer who has a certain level of technical knowledge about wireless communication can easily understand a reason why display of the video has been stopped.

[Problem 2]

By the way, a general wireless LAN device can automatically select a channel used for Wi-Fi communication. For example, a wireless LAN device which supports communication using W52, W53, and W56 can automatically select an actually used channel from 19 channel in a case where communication is carried out according to IEEE802.11a.

In general, such a wireless LAN device randomly selects the actually used channel from the 19 channels. Therefore, there are cases where the wireless LAN device selects a channel of W53 or W56. In this case, however, the wireless LAN device cannot start Wi-Fi communication for 1 minute from selection of the channel as described above.

A technique for reducing a delay time taken to start wireless communication is disclosed in Japanese Patent Application Publication, Tokukai, No. 2011-29952 (Publication date: Feb. 10, 2011) and Japanese Patent Application Publication, Tokukai, No. 2009-278368 (Publication date: Nov. 26, 2009).

However, these conventional techniques are based on a premise that a wireless LAN device includes a plurality of wireless communication sections (e.g., antennas), and therefore cannot be applied to a wireless LAN device including only 1 wireless communication section.

The monitor (more generally, communication device) of the present embodiment is accomplished in view of the above problem, and an object of the monitor of the present embodiment is to switch a channel used for Wi-Fi communication while avoiding occurrence of a delay time as much as possible.

In order to attain the above object, a communication device which wirelessly communicates with another communication device includes: selecting means for selecting a channel used for the wireless communication from a predetermined group of channels; and radio interference detecting means for detecting occurrence of radio interference in the channel that is being used for the wireless communication, the selecting means automatically selecting, upon detection of the radio interference by the radio interference detecting means, a different channel from the channel that is being used, and the selecting means preferentially selecting, as the different channel, a channel other than a channel which assigns high priority to a public institution from the group of channels.

According to the arrangement, upon detection of radio interference, the communication device uses, for wireless communication, a channel different from a channel that is being used. However, in a case where both a channel which assigns high priority to a public institution and a channel other than such a channel are available at the time of detection of radio interference, the channel other than the channel which assigns high priority to the public institution is selected. For example, in a case where a channel of W52 and a channel of W56 are available at the time of detection of radio interference, the communication device selects the channel of W52.

That is, according to the communication device, the channel which assigns high priority to the public institution (i.e., channel which the communication device cannot use until it confirms that the public institution is not using the channel (until the delay time elapses) is not selected unless other channels are unavailable.

The communication device can thus switch a channel used for wireless communication while avoiding occurrence of a delay time as much as possible.

The channels belonging to W53 and W56 are channels which assign high priority to a public institution, and the channels belonging to W52 are channels other than the channels which assigns high priority to a public institution. It is desirable that the selecting means selects a channel in the following order of descending priority: the channels belonging to W52, the channels belonging to W56, the channels belonging to W53.

Further, it is desirable that the communication device further includes determining means for determining whether or not the public institution is emitting a radio wave of the channel, in a case where the channel that is being used is a channel belonging to W56 or W53, and the selecting means automatically selects the channel belonging to W52 in a case where the determining means determines that the public institution is emitting the radio wave of the channel.

Further, it is desirable that (i) the channels belonging to W53 and W56 are channels which assigns high priority to the public institution, and the channels belonging to W52 are channels other than the channels which assigns high priority to the public institution, and (ii) the selecting means selects a channel in any of the following two orders of descending priority (a) and (b) depending on a geographical region to which the communication device is directed: (a) the channels belonging to W52, the channels belonging to W56, the channels belonging to W53 or (b) the channels belonging to W52, the channels belonging to W56, the channels belonging to W53.

Note that interference caused by adjacent channels has a greater influence than that caused by a channel identical to a currently-used channel and the number of overlapping interference sources (AP) has a greater influence than RSSI.

It is therefore desirable that the communication device further includes ranking means for giving each channel a rank indicative of likelihood of occurrence of radio interference, and the ranking means gives a channel whose adjacent channels are not being used a higher rank (indicative of less likelihood of occurrence of radio interference) than a channel whose adjacent channels are being used, and the ranking means ranks the channel whose adjacent channels are being used in such a manner that a channel that is being used by the smaller number of communication devices is given a higher rank, and the selecting means preferentially selects, as the different channel, a channel given a highest rank among the channels other than the channels which assign high priority to the public institution.

According to the arrangement, a channel whose adjacent channels are not being used among the channels other than the channels which assign high priority to the public institution is most preferentially selected, and even in a case where there is no channel whose adjacent channels are not being used among the channels other than the channels which assign high priority to the public institution, a channel that is being used by the smallest number of communication devices is selected. Since interference caused by adjacent channels has a greater influence than that caused by a channel identical to a currently-used channel and the number of overlapping interference sources (AP) has a greater influence than RSSI, the selecting means can select a channel which can minimize possibility of occurrence of radio interference.

Further, according to the communication device, the channels which assign high priority to the public institution are not selected unless the other channels are unavailable.

It is thus possible to select a channel for Wi-Fi communication which can minimize possibility of occurrence of a delay time and radio interference.

It is desirable that in a case where a rank of a channel among the channels other than the channels which assign high priority to the public institution is lower than that of the channel that is being used, the selecting means selects, as the different channel, a channel which is not being used and whose adjacent channels are not being used among the channels which assign high priority to the public institution.

According to the arrangement, it is possible to select a channel with less likelihood of occurrence of radio interference as compared with a case where a channel other than the channels which assign high priority to the public institution is selected.

It is desirable that in a case where a rank of the channel of the highest rank among the channels other than the channels which assign high priority to the public institution is lower than that of a channel whose adjacent channels are being used and which is being used by one or less other communication device, the selecting means preferentially selects, as the different channel, a channel which is not being used and whose adjacent channels are not being used among the channels which assign high priority to the public institution.

According to the arrangement, it is possible to select a channel with less likelihood of occurrence of radio interference as compared with a case where a channel other than the channels which assign high priority to the public institution is selected.

It is desirable that in a case where there is no channel which is not being used and whose adjacent channels are not being used among the channels which assign high priority to the public institution, the selecting means preferentially select the channel of the highest rank among the channels other than the channels which assign high priority to the public institution.

According to the arrangement, a channel is selected only from channels which are available and whose adjacent channels are not being used. It is therefore possible to prevent inconvenience of mistakenly detecting radio waves of interference sources of a channel identical to the channel that is being used and of the adjacent channels.

It is desirable that the communication device further includes determining means for determining, in a case where the selecting means selects a channel which assigns high priority to the public institution, whether or not the public institution is emitting a radio wave of the channel, and in a case where the determining means determines that the public institution is emitting the radio wave of the channel, the selecting means preferentially selects the channel of the highest rank among the channels other than the channels which assign high priority to the public institution.

In a case where a radio wave (radar wave) from a public institution is detected, a channel used by the public institution cannot be used for 30 minutes. According to the arrangement, in a case where the determining means determines that the public institution is emitting the radio wave of the channel, the selecting means preferentially selects the channel of the highest rank among the channels other than the channels which assign high priority to the public institution. This makes it possible to shorten a delay time in channel switching.

It is desirable that (i) the channels belonging to W53 or W56 are channels which assigns high priority to the public institution, and the channels belonging to W52 are channels other than the channels which assigns high priority to the public institution, and (ii) the selecting means selects a channel belonging to W53 in preference to a channel belonging to W56.

According to the arrangement, since the channels of W53 have a lower possibility of mistaken detection of a radar, it is possible to avoid a situation in which a channel is unnecessarily switched due to mistaken detection of a radar.

It is desirable that the communication device communicates with the another communication device in an HT20 mode using the selected channel.

According to the arrangement, since the HT20 mode uses the smaller number of channels as compared with an HT40 mode using 2 channels, it is more likely that a channel that is less influenced by interference of adjacent channels and the identical channel is selected.

[Problem 3]

By the way, a general wireless LAN device can automatically select a channel used for Wi-Fi communication. For example, a wireless LAN device which supports communication using W52, W53, and W56 can automatically select an actually used channel from 19 channel in a case where communication is carried out according to IEEE802.11a.

In general, such a wireless LAN device randomly selects the actually used channel from the 19 channels. Therefore, there are cases where the wireless LAN device selects a channel of W53 or W56. In this case, however, the wireless LAN device cannot help switching a channel according to DFS (dynamic frequency selection) upon detection of a radar wave which interferes with Wi-Fi communication as described above. Switching the channel according to DFS results in temporary interruption of communication.

By the way, a radar is assumed to emit a radar wave of a predetermined frequency during a certain period of time unless there is a special reason to change the frequency.

According to the conventional arrangement, a channel used for Wi-Fi communication is randomly selected. Accordingly, in a case where the frequency of the radar wave belongs to the channel thus selected, it is sometimes necessary to carry out DFS immediately after start of Wi-Fi communication using the channel. This problem occurs also in a communication terminal disclosed in Japanese Patent Application Publication, Tokukai, No. 2009-246874 (Publication date: Oct. 22, 2009) which communication terminal switches a AP to be connected via Wi-Fi, on the basis of information accumulated from a network.

A monitor (more generally, communication device) of the present embodiment is accomplished in view of the above problem, and an object of the monitor of the present embodiment is to reduce a possibility that communication is temporarily interrupted due to DFS (more generally, forced switching of channels at start of use of a channel by a public institution) after selection of a channel of W53 or W56 (more generally, channel which assigns priority to the public institution) as compared with the conventional art.

In order to attain the above object, a communication device is a communication device which wirelessly communicates with another communication device and which includes: selecting means for selecting a channel used for the wireless communication from a predetermined group of channels including channels which assign priority to a public institution; determining means for determining, in a case where the channel selected by the selecting means is one of the channels which assign priority to the public institution, whether or not the public institution is emitting a radio wave of the channel; and storage means for storing, in a storage section, information indicating that the radio wave was emitted in the channel, in a case where the determining means determines that the public institution is emitting the radio wave of the channel, the selecting means selecting a channel for which the information is not stored in the storage section in preference to a channel for which the information is stored in the storage section.

According to the arrangement, the communication device can use, for the wireless communication, a channel which is not used by the public institution recently while avoiding a channel which is continuously used by the public institution. Accordingly, the communication device can reduce a possibility that communication is temporarily interrupted by forced switching of channels after selection of a channel which assigns priority to the public institution, as compared with the conventional art.

It is desirable that in a case where the storage means stores the information for all of the channels which assign priority to the public institution, the storage means deletes the information stored in the storage section. According to the arrangement, it is possible to produce a further effect: the display device can reduce the possibility that communication is temporarily interrupted by forced switching of channels, even after it is determined that the public institution has emitted a radio wave in all of the channels which assign priority to the public institution.

In a case where the determining means determines, in a state where the storage means stores the information for all of the channels which assign priority to the public institution except only 1 channel, that the public institution is emitting a radio wave of the only 1 channel, the storage means may delete the information stored in the storage section without storing, in the storage section, information indicating that a radio wave was emitted in the only 1 channel.

Note that it is desirable that the storage section is a non-volatile memory.

[Summary]

The present invention is not limited to the description of the embodiments above, but may be altered by a skilled person within the scope of the claims. An embodiment based on a proper combination of technical means disclosed in different embodiments is encompassed in the technical scope of the present invention.

The output system of the embodiment of the present invention is desirably arranged such that the output system has (i) a first mode in which the transmitting device receives content from an outside of the output system and wirelessly transfers the content to the output device and (ii) a second mode in which the transmitting device wirelessly transmits content stored in a recording medium to the output device; the determining means of the transmitting device is configured not to make the determination in the second mode, and the determining means of the output device is configured not to make the determination in the first mode; the notifying means is configured to give the predetermined notification to the output device in a case where it is determined that the buffer overflow has occurred predetermined times or more in the first mode; and the second executing means is configured to execute the predetermined error avoiding process in a case where it is determined that the buffer underrun has occurred predetermined times or more in the second mode.

According to the arrangement, only in the second mode, the predetermined error avoiding process is executed in a case where it is determined that the buffer underrun has occurred predetermined times or more. That is, in the first mode, the predetermined error avoiding process which should be executed upon detection of shortage of throughput is executed in a case where the transmitting device determines that buffer overflow has occurred predetermined times or more, but the predetermined error avoiding process which should be executed upon detection of shortage of throughput is not executed in a case where buffer underrun has occurred.

In the first mode, the transmitting device receives content from an outside of the output system. Accordingly, there can arise a problem outside the output system, such as failure to transmit content to the transmitting device. According to the output system of the embodiment of the present invention, it is possible to prevent a situation in which in a case where buffer underrun occurs due to a problem outside the output system, it is mistakenly detected as shortage of throughput in wireless transmission from the transmitting device to the output device and the predetermined error avoiding process which should be executed upon detection of shortage of throughput is mistakenly executed.

It is therefore possible to produce a further effect: the output system of the embodiment of the present invention is unlikely to cause the problem that the predetermined error avoiding process which should be executed upon detection of shortage of throughput is mistakenly executed because of mistaken detection of shortage of throughput.

The recording medium may be a recording medium provided in the transmitting device, but is not limited to this. In a case where the transmitting device is configured to detachably include an external recording medium, the recording medium may be an external recording medium. In a case where the transmitting device is configured to be connectable with an external device, the recording medium may be a recording medium of the external device. The first mode can be a mode in which the transmitting device wirelessly transfers, to the output device, content obtained by receiving a broadcast wave from an outside of the output system.

The output system of the embodiment of the present invention is desirably arranged such that the output device further includes: signal intensity measuring means for repeatedly measuring received signal strength of a carrier wave emitted from the transmitting device over a channel used for the transmission of the content; and radio interference determining means for determining that radio interference has occurred in the channel, in a case where the signal intensity measuring means measures received signal strength equal to or higher than a predetermined threshold value around the same time as when the number of times it is determined that the buffer underrun has occurred in the second mode reaches the predetermined times. The "around the same time" may be defined to mean that a time at which the number of times it is determined that the buffer underrun has occurred reached the predetermined number and a time at which the received signal strength equal to or higher than the predetermined threshold value was measured are identical when counted by minutes, or may be defined otherwise (e.g., defined to mean that a time interval between these two times is within a predetermined range).

The output system of the embodiment of the present invention is desirably arranged such that the transmitting device further includes: signal intensity measuring means for repeatedly measuring received signal strength of a carrier wave emitted from the output device over a channel used for the transmission of the content; and radio interference determining means for determining that radio interference has occurred in the channel, in a case where the signal intensity measuring means measures received signal strength equal to or higher than a predetermined threshold value around the same time as when the number of times it is determined that the buffer overflow has occurred in the second mode reaches the predetermined times. The "around the same time" may be defined to mean that a time at which the number of times it is determined that the buffer overflow has occurred reached the predetermined number and a time at which the received signal strength equal to or higher than the predetermined threshold value was measured are identical when counted by minutes, or may be defined otherwise (e.g., defined to mean that a time interval between these two times is within a predetermined range).

Shortage of throughput in wireless communication is caused, for example, by a decline in received signal strength which occurs due to an increase in distance between a transmission side and a reception side or radio interference which occurs in a channel used for the wireless communication. According to the above arrangements, it is possible to produce a further effect; the output system can accurately detect the latter one, that is, radio interference.

The output system of the embodiment of the present invention is desirably arranged such that, in the first mode, the notifying means gives the predetermined notification in a case where it is determined that the buffer overflow has occurred P (P is any integer which satisfies P≥1) or more times per unit time.

The output system of the embodiment of the present invention is desirably arranged such that, in the second mode, the second executing means executes the predetermined error avoiding process in a case where it is determined that the buffer underrun has occurred Q (Q is any integer which satisfies Q≥1) or more times per unit time.

According to the arrangements, it is possible to produce a further effect: the output system can cause the output device to execute a process which should be executed upon detection of shortage of throughput, only in a case where the shortage of throughput occurs not temporarily but constantly.

Note that the present invention can be realized also as a display system which functions as the output system, in which the transmitting device is a tuner device which receives video content via a broadcasting wave and wireless transfers the video content to the output device, and the output device is a monitor device which includes a display section as the output section and which receives the video content transferred by the tuner device and displays a video of the video content.

INDUSTRIAL APPLICABILITY

The output system of the present invention is suitably applicable to a portable TV in which a display section (display section) and a video receiving section (tuner section), which are separately provided, are connected wirelessly.

REFERENCE SIGNS LIST

1: Content display system (output system)
1a: Content display system
1b: Content display system (output system)
1c: Content display system (output system)
1d: Content display system (output system)
10: Monitor (display device, output device, communication device)
10a-10f: Monitor (display device)
10g: Sub-monitor (display device)
10h: Smartphone (display device)
11: CPU (radio interference determining means)
11a: UI screen display section (display control means)
11b: Content selecting section
11c: Video reception selecting section
11d: Content switching instructing section
11e: Channel switching instructing section (first executing means, second executing means, switching means)
11f: Receive buffer amount checking section (determining means)
11g: Signal intensity measuring section (signal intensity measuring means)
12a: Wireless LAN module
120a: Receive buffer (second buffer)
12b: HDMI receiving section
13: Switch
14: DRM decrypting section
14c: DTCP-IP decrypting section
14d: HDCP decrypting section
14e: Marlin decrypting section
15: DEMUX
16: Video decrypting section
16c: MPEG2 decrypting section
16d: H.264 decrypting section
17: Lookup table
18a: Video processing section
18b: Panel controller
19: Display
20: Set-top box (transmitting device, communication device)
20': Set-top box (communication device)
20a: Main TV (transmitting device)
21 CPU (radio interference determining means)

21a: Send buffer amount checking section (determining means)
21b: Radar wave detecting section (determining means)
21c: Signal intensity measuring section (signal intensity measuring means)
21d: Channel switching instructing section (selecting means, storage means)
21e: Ranking section (ranking means)
22a: Tuner
22b: Demodulating section
22c: Multi2 decrypting section
22d: DEMUX
23a: USB interface
23b: Unique DRM decrypting section
24a: HDMI receiving section
24c: H.264 encoding section
25: Wired LAN module
26: Switch
27: DRM encrypting section
27c: DTCP-IP encrypting section
27d: HDCP encrypting section
28: Wireless LAN module (notifying means, transmitting means)
281: Send buffer (first buffer)
282: TCP/IP buffer (first buffer)
283: TS buffer (first buffer)
30: Router
40a: BD recorder
40b: BD recorder
50: DTV/BS antenna
60: Media server
70: Web
80: USB-HDD (recording medium)

The invention claimed is:

1. An output system comprising:
a transmitting device; and
an output device,
the transmitting device wirelessly transmitting content to the output device, and the output device receiving and outputting the content, the transmitting device including: a first buffer in which the content that is being transmitted is buffered;
determining means for repeatedly determining whether or not buffer overflow has occurred in the first buffer; and
notifying means for giving a predetermined notification to the output device in a case where it is determined that the buffer overflow has occurred during the transmission of the content,
the output device including: a second buffer in which the content that is being received is buffered;
determining means for repeatedly determining whether or not buffer underrun has occurred in the second buffer during the reception of the content;
first executing means for executing a predetermined error avoiding process in response to the predetermined notification; and
second executing means for executing the predetermined error avoiding process in a case where it is determined that the buffer underrun has occurred;
wherein:
the output system has (i) a first mode in which the transmitting device receives content from an outside of the output system and wirelessly transfers the content to the output device and (ii) a second mode in which the transmitting device wirelessly transmits content stored in a recording medium to the output device;
the determining means of the transmitting device is configured not to make the determination in the second mode, and the determining means of the output device is configured not to make the determination in the first mode;
the notifying means is configured to give the predetermined notification to the output device in a case where it is determined that the buffer overflow has occurred predetermined times or more in the first mode; and
the second executing means is configured to execute the predetermined error avoiding process in a case where it is determined that the buffer underrun has occurred predetermined times or more in the second mode.

2. The output system according to claim 1, wherein:
the output device further includes:
signal intensity measuring means for repeatedly measuring received signal strength of a carrier wave emitted from the transmitting device over a channel used for the transmission of the content; and
radio interference determining means for determining that radio interference has occurred in the channel, in a case where the signal intensity measuring means measures received signal strength equal to or higher than a predetermined threshold value around a same time as when the number of times it is determined that the buffer underrun has occurred in the second mode reaches the predetermined times.

3. The output system according to claim 1, wherein:
the transmitting device further includes:
signal intensity measuring means for repeatedly measuring received signal strength of a carrier wave emitted from the output device over a channel used for the transmission of the content; and
radio interference determining means for determining that radio interference has occurred in the channel, in a case where the signal intensity measuring means measures received signal strength equal to or higher than a predetermined threshold value around a same time as when the number of times it is determined that the buffer overflow has occurred reaches the predetermined times.

4. The output system according to claim 1, wherein, in the first mode, the notifying means gives the predetermined notification in a case where it is determined that the buffer overflow has occurred P (P is any integer which satisfies P≥1) or more times per unit time.

5. The output system according to claim 1, wherein, in the second mode, the second executing means executes the predetermined error avoiding process in a case where it is determined that the buffer underrun has occurred Q (Q is any integer which satisfies Q≥1) or more times per unit time.

6. The output system according to claim 1, wherein the first mode is a mode in which the transmitting device wirelessly transfers, to the output device, content obtained by receiving a broadcasting wave from the outside of the output system.

7. A display system which functions as an output system as set forth in claim 1,
the transmitting device being a tuner device which receives video content via a broadcasting wave and wireless transfers the video content to the output device, and the output device being a monitor device which receives the video content transferred by the tuner device and displays video of the video content.

* * * * *